US012493036B2

(12) United States Patent
Ben David et al.

(10) Patent No.: US 12,493,036 B2
(45) Date of Patent: Dec. 9, 2025

(54) METHODS FOR IDENTIFYING ANTI CLOSTRIDIAL NEUROTOXIN COMPOUNDS

(71) Applicant: STATE OF ISRAEL, ISRAEL INSTITUTE OF BIOLOGICAL RESEARCH, Ness-Ziona (IL)

(72) Inventors: Alon Ben David, Ramat Yishay (IL); Ada Barnea, Holon (IL); Ran Zichel, Kfar Saba (IL)

(73) Assignee: State of Israel, Israel Institute for Biological Research, Ness-Ziona (IL)

( * ) Notice: Subject to any disclaimer, the term of this patent is extended or adjusted under 35 U.S.C. 154(b) by 811 days.

(21) Appl. No.: 17/758,379

(22) PCT Filed: Jan. 13, 2021

(86) PCT No.: PCT/IL2021/050039

§ 371 (c)(1),
(2) Date: Jul. 5, 2022

(87) PCT Pub. No.: WO2021/144793

PCT Pub. Date: Jul. 22, 2021

(65) Prior Publication Data

US 2023/0048462 A1 Feb. 16, 2023

(30) Foreign Application Priority Data

Jan. 13, 2020 (IL) ......................................... 272002

(51) Int. Cl.

| | |
|---|---|
| ***G01N 33/573*** | (2006.01) |
| ***C07K 14/33*** | (2006.01) |
| ***C12N 9/42*** | (2006.01) |
| ***C12N 9/52*** | (2006.01) |

(52) U.S. Cl.

CPC ........... *G01N 33/573* (2013.01); *C07K 14/33* (2013.01); *C12N 9/2434* (2013.01); *C12N 9/52* (2013.01); *C12Y 302/01023* (2013.01); *C07K 2319/61* (2013.01); *G01N 2333/33* (2013.01); *G01N 2500/02* (2013.01); *G01N 2500/20* (2013.01)

(58) Field of Classification Search

None

See application file for complete search history.

(56) References Cited

U.S. PATENT DOCUMENTS

| | | | |
|---|---|---|---|
| 6,667,158 B1 | 12/2003 | Bavari et al. |
| 8,476,024 B2 | 7/2013 | Mahrhold et al. |
| 2009/0252722 A1 | 10/2009 | Mahrhold et al. |

FOREIGN PATENT DOCUMENTS

| | | |
|---|---|---|
| WO | 02/25284 A2 | 3/2002 |
| WO | 2007/050390 A2 | 5/2007 |
| WO | 2010/039748 A2 | 4/2010 |
| WO | 2018/221892 A1 | 12/2018 |
| WO | 2019/162376 A1 | 8/2019 |

OTHER PUBLICATIONS

Baldwin et al., "Subunit Vaccine against the Seven Serotypes of Botulism", Infect Immun 2008, 76:1314-1318.

Ben David et al., "Small Molecule Receptor Binding Inhibitors with In Vivo Efficacy against Botulinum Neurotoxin Serotypes A and E", Int. J. Mol. Sci. 2021, 22, 8577.

Diamant et al., "Evaluating the Synergistic Neutralizing Effect of Anti-Botulinum Oligoclonal Antibody Preparations", PLoS One 2014, 9:e87089.

Dong et al., "SV2 Is the Protein Receptor for Botulinum Neurotoxin A", Science 2006, 312:592-596.

Dong et al., "Glycosylated SV2A and SV2B Mediate the Entry of Botulinum Neurotoxin E into Neurons", Mol Biol Cell 2008, vol. 19, issue 12, p. 5226-37.

Duplantier et al., "Searching for Therapeutics Against Botulinum Neurotoxins: A True Challenge for Drug Discovery", Curr Top Med Chem 2016, 16:2330-2349.

European Directorate for the Quality of Medicines and Healthcare, "Botulinum Antitoxin", 2011, p. 949, European pharmacopoeia 7ed. EDQM Council of Europe, Strasbourg, France.

Pirazzini et al., "Challenges in searching for therapeutics against Botulinum Neurotoxins," Expert Opin Drug Discov 2017, 12:497-510.

Zuverink et al., "A Heterologous Reporter Defines the Role of the Tetanus Toxin Interchain Disulfide in Light-Chain Translocation", ASM Journals—Infection and Immunity, Jul. 2015, pp. 2714-2724, vol. 83, No. 7. https://doi.org/10.1128/iai.00477-15.

*Primary Examiner* — Brian Gangle

(74) *Attorney, Agent, or Firm* — Vorys, Sater, Seymour and Pease, LLP; Anthony P. Venturino; Maryellen Feehery Hank

(57) ABSTRACT

The presently claimed subject matter concerns methods and kits for identifying agents that reduce binding of a clostridial neurotoxin to synaptic vesicle glycoprotein 2 (SV2).

20 Claims, 5 Drawing Sheets

Specification includes a Sequence Listing.

SEQUENCE LISTING

```
<160> NUMBER OF SEQ ID NOS: 33

<210> SEQ ID NO 1
<211> LENGTH: 1024
<212> TYPE: PRT
<213> ORGANISM: Escherichia coli

<400> SEQUENCE: 1

Met Thr Met Ile Thr Asp Ser Leu Ala Val Val Leu Gln Arg Arg Asp
1               5                   10                  15

Trp Glu Asn Pro Gly Val Thr Gln Leu Asn Arg Leu Ala Ala His Pro
            20                  25                  30

Pro Phe Ala Ser Trp Arg Asn Ser Glu Glu Ala Arg Thr Asp Arg Pro
        35                  40                  45

Ser Gln Gln Leu Arg Ser Leu Asn Gly Glu Trp Arg Phe Ala Trp Phe
    50                  55                  60

Pro Ala Pro Glu Ala Val Pro Glu Ser Trp Leu Glu Cys Asp Leu Pro
65                  70                  75                  80

Glu Ala Asp Thr Val Val Val Pro Ser Asn Trp Gln Met His Gly Tyr
                85                  90                  95

Asp Ala Pro Ile Tyr Thr Asn Val Thr Tyr Pro Ile Thr Val Asn Pro
            100                 105                 110

Pro Phe Val Pro Thr Glu Asn Pro Thr Gly Cys Tyr Ser Leu Thr Phe
        115                 120                 125

Asn Val Asp Glu Ser Trp Leu Gln Glu Gly Gln Thr Arg Ile Ile Phe
    130                 135                 140

Asp Gly Val Asn Ser Ala Phe His Leu Trp Cys Asn Gly Arg Trp Val
145                 150                 155                 160

Gly Tyr Gly Gln Asp Ser Arg Leu Pro Ser Glu Phe Asp Leu Ser Ala
                165                 170                 175

Phe Leu Arg Ala Gly Glu Asn Arg Leu Ala Val Met Val Leu Arg Trp
            180                 185                 190

Ser Asp Gly Ser Tyr Leu Glu Asp Gln Asp Met Trp Arg Met Ser Gly
        195                 200                 205

Ile Phe Arg Asp Val Ser Leu Leu His Lys Pro Thr Thr Gln Ile Ser
    210                 215                 220

Asp Phe His Val Ala Thr Arg Phe Asn Asp Asp Phe Ser Arg Ala Val
225                 230                 235                 240

Leu Glu Ala Glu Val Gln Met Cys Gly Glu Leu Arg Asp Tyr Leu Arg
                245                 250                 255

Val Thr Val Ser Leu Trp Gln Gly Glu Thr Gln Val Ala Ser Gly Thr
            260                 265                 270

Ala Pro Phe Gly Gly Glu Ile Ile Asp Glu Arg Gly Gly Tyr Ala Asp
        275                 280                 285
```

-continued

Arg Val Thr Leu Arg Leu Asn Val Glu Asn Pro Lys Leu Trp Ser Ala
    290                 295                 300

Glu Ile Pro Asn Leu Tyr Arg Ala Val Val Glu Leu His Thr Ala Asp
305                 310                 315                 320

Gly Thr Leu Ile Glu Ala Glu Ala Cys Asp Val Gly Phe Arg Glu Val
                325                 330                 335

Arg Ile Glu Asn Gly Leu Leu Leu Leu Asn Gly Lys Pro Leu Leu Ile
            340                 345                 350

Arg Gly Val Asn Arg His Glu His His Pro Leu His Gly Gln Val Met
        355                 360                 365

Asp Glu Gln Thr Met Val Gln Asp Ile Leu Leu Met Lys Gln Asn Asn
    370                 375                 380

Phe Asn Ala Val Arg Cys Ser His Tyr Pro Asn His Pro Leu Trp Tyr
385                 390                 395                 400

Thr Leu Cys Asp Arg Tyr Gly Leu Tyr Val Val Asp Glu Ala Asn Ile
                405                 410                 415

Glu Thr His Gly Met Val Pro Met Asn Arg Leu Thr Asp Asp Pro Arg
            420                 425                 430

Trp Leu Pro Ala Met Ser Glu Arg Val Thr Arg Met Val Gln Arg Asp
        435                 440                 445

Arg Asn His Pro Ser Val Ile Ile Trp Ser Leu Gly Asn Glu Ser Gly
    450                 455                 460

His Gly Ala Asn His Asp Ala Leu Tyr Arg Trp Ile Lys Ser Val Asp
465                 470                 475                 480

Pro Ser Arg Pro Val Gln Tyr Glu Gly Gly Gly Ala Asp Thr Thr Ala
                485                 490                 495

Thr Asp Ile Ile Cys Pro Met Tyr Ala Arg Val Asp Glu Asp Gln Pro
            500                 505                 510

Phe Pro Ala Val Pro Lys Trp Ser Ile Lys Lys Trp Leu Ser Leu Pro
        515                 520                 525

Gly Glu Thr Arg Pro Leu Ile Leu Cys Glu Tyr Ala His Ala Met Gly
    530                 535                 540

Asn Ser Leu Gly Gly Phe Ala Lys Tyr Trp Gln Ala Phe Arg Gln Tyr
545                 550                 555                 560

Pro Arg Leu Gln Gly Gly Phe Val Trp Asp Trp Val Asp Gln Ser Leu
                565                 570                 575

Ile Lys Tyr Asp Glu Asn Gly Asn Pro Trp Ser Ala Tyr Gly Gly Asp
            580                 585                 590

Phe Gly Asp Thr Pro Asn Asp Arg Gln Phe Cys Met Asn Gly Leu Val
        595                 600                 605

Phe Ala Asp Arg Thr Pro His Pro Ala Leu Thr Glu Ala Lys His Gln
    610                 615                 620

Gln Gln Phe Phe Gln Phe Arg Leu Ser Gly Gln Thr Ile Glu Val Thr
625                 630                 635                 640

Ser Glu Tyr Leu Phe Arg His Ser Asp Asn Glu Leu Leu His Trp Met
                645                 650                 655

Val Ala Leu Asp Gly Lys Pro Leu Ala Ser Gly Glu Val Pro Leu Asp
            660                 665                 670

Val Ala Pro Gln Gly Lys Gln Leu Ile Glu Leu Pro Glu Leu Pro Gln
        675                 680                 685

Pro Glu Ser Ala Gly Gln Leu Trp Leu Thr Val Arg Val Val Gln Pro
    690                 695                 700

Asn Ala Thr Ala Trp Ser Glu Ala Gly His Ile Ser Ala Trp Gln Gln
705 710 715 720

Trp Arg Leu Ala Glu Asn Leu Ser Val Thr Leu Pro Ala Ala Ser His
725 730 735

Ala Ile Pro His Leu Thr Thr Ser Glu Met Asp Phe Cys Ile Glu Leu
740 745 750

Gly Asn Lys Arg Trp Gln Phe Asn Arg Gln Ser Gly Phe Leu Ser Gln
755 760 765

Met Trp Ile Gly Asp Lys Lys Gln Leu Leu Thr Pro Leu Arg Asp Gln
770 775 780

Phe Thr Arg Ala Pro Leu Asp Asn Asp Ile Gly Val Ser Glu Ala Thr
785 790 795 800

Arg Ile Asp Pro Asn Ala Trp Val Glu Arg Trp Lys Ala Ala Gly His
805 810 815

Tyr Gln Ala Glu Ala Ala Leu Leu Gln Cys Thr Ala Asp Thr Leu Ala
820 825 830

Asp Ala Val Leu Ile Thr Thr Ala His Ala Trp Gln His Gln Gly Lys
835 840 845

Thr Leu Phe Ile Ser Arg Lys Thr Tyr Arg Ile Asp Gly Ser Gly Gln
850 855 860

Met Ala Ile Thr Val Asp Val Glu Val Ala Ser Asp Thr Pro His Pro
865 870 875 880

Ala Arg Ile Gly Leu Asn Cys Gln Leu Ala Gln Val Ala Glu Arg Val
885 890 895

Asn Trp Leu Gly Leu Gly Pro Gln Glu Asn Tyr Pro Asp Arg Leu Thr
900 905 910

Ala Ala Cys Phe Asp Arg Trp Asp Leu Pro Leu Ser Asp Met Tyr Thr
915 920 925

Pro Tyr Val Phe Pro Ser Glu Asn Gly Leu Arg Cys Gly Thr Arg Glu
930 935 940

Leu Asn Tyr Gly Pro His Gln Trp Arg Gly Asp Phe Gln Phe Asn Ile
945 950 955 960

Ser Arg Tyr Ser Gln Gln Gln Leu Met Glu Thr Ser His Arg His Leu
965 970 975

Leu His Ala Glu Glu Gly Thr Trp Leu Asn Ile Asp Gly Phe His Met
980 985 990

Gly Ile Gly Gly Asp Asp Ser Trp Ser Pro Ser Val Ser Ala Glu Phe
995 1000 1005

Gln Leu Ser Ala Gly Arg Tyr His Tyr Gln Leu Val Trp Cys Gln
1010 1015 1020

Lys

<210> SEQ ID NO 2
<211> LENGTH: 425
<212> TYPE: PRT
<213> ORGANISM: Clostridium botulinum

<400> SEQUENCE: 2

Asn Ile Ile Asn Thr Ser Ile Leu Asn Leu Arg Tyr Glu Ser Asn His
1 5 10 15

Leu Ile Asp Leu Ser Arg Tyr Ala Ser Lys Ile Asn Ile Gly Ser Lys
20 25 30

Val Asn Phe Asp Pro Ile Asp Lys Asn Gln Ile Gln Leu Phe Asn Leu
35 40 45

```
Glu Ser Ser Lys Ile Glu Val Ile Leu Lys Asn Ala Ile Val Tyr Asn
    50                  55                  60

Ser Met Tyr Glu Asn Phe Ser Thr Ser Phe Trp Ile Arg Ile Pro Lys
65                  70                  75                  80

Tyr Phe Asn Ser Ile Ser Leu Asn Asn Glu Tyr Thr Ile Ile Asn Cys
                85                  90                  95

Met Glu Asn Asn Ser Gly Trp Lys Val Ser Leu Asn Tyr Gly Glu Ile
            100                 105                 110

Ile Trp Thr Leu Gln Asp Thr Gln Glu Ile Lys Gln Arg Val Val Phe
        115                 120                 125

Lys Tyr Ser Gln Met Ile Asn Ile Ser Asp Tyr Ile Asn Arg Trp Ile
    130                 135                 140

Phe Val Thr Ile Thr Asn Asn Arg Leu Asn Asn Ser Lys Ile Tyr Ile
145                 150                 155                 160

Asn Gly Arg Leu Ile Asp Gln Lys Pro Ile Ser Asn Leu Gly Asn Ile
                165                 170                 175

His Ala Ser Asn Asn Ile Met Phe Lys Leu Asp Gly Cys Arg Asp Thr
            180                 185                 190

His Arg Tyr Ile Trp Ile Lys Tyr Phe Asn Leu Phe Asp Lys Glu Leu
        195                 200                 205

Asn Glu Lys Glu Ile Lys Asp Leu Tyr Asp Asn Gln Ser Asn Ser Gly
    210                 215                 220

Ile Leu Lys Asp Phe Trp Gly Asp Tyr Leu Gln Tyr Asp Lys Pro Tyr
225                 230                 235                 240

Tyr Met Leu Asn Leu Tyr Asp Pro Asn Lys Tyr Val Asp Val Asn Asn
                245                 250                 255

Val Gly Ile Arg Gly Tyr Met Tyr Leu Lys Gly Pro Arg Gly Ser Val
            260                 265                 270

Met Thr Thr Asn Ile Tyr Leu Asn Ser Ser Leu Tyr Arg Gly Thr Lys
        275                 280                 285

Phe Ile Ile Lys Lys Tyr Ala Ser Gly Asn Lys Asp Asn Ile Val Arg
    290                 295                 300

Asn Asn Asp Arg Val Tyr Ile Asn Val Val Val Lys Asn Lys Glu Tyr
305                 310                 315                 320

Arg Leu Ala Thr Asn Ala Ser Gln Ala Gly Val Glu Lys Ile Leu Ser
                325                 330                 335

Ala Leu Glu Ile Pro Asp Val Gly Asn Leu Ser Gln Val Val Val Met
            340                 345                 350

Lys Ser Lys Asn Asp Gln Gly Ile Thr Asn Lys Cys Lys Met Asn Leu
        355                 360                 365

Gln Asp Asn Asn Gly Asn Asp Ile Gly Phe Ile Gly Phe His Gln Phe
    370                 375                 380

Asn Asn Ile Ala Lys Leu Val Ala Ser Asn Trp Tyr Asn Arg Gln Ile
385                 390                 395                 400

Glu Arg Ser Ser Arg Thr Leu Gly Cys Ser Trp Glu Phe Ile Pro Val
                405                 410                 415

Asp Asp Gly Trp Gly Glu Arg Pro Leu
            420                 425
```

<210> SEQ ID NO 3
<211> LENGTH: 15
<212> TYPE: PRT
<213> ORGANISM: Artificial Sequence
<220> FEATURE:
<223> OTHER INFORMATION: Linker 1

<400> SEQUENCE: 3

```
Gly Gly Gly Gly Ser Gly Gly Gly Gly Ser Gly Gly Gly Gly Ser
1               5                   10                  15
```

<210> SEQ ID NO 4
<211> LENGTH: 6
<212> TYPE: PRT
<213> ORGANISM: Artificial Sequence
<220> FEATURE:
<223> OTHER INFORMATION: 6His tag

<400> SEQUENCE: 4

```
His His His His His His
1               5
```

<210> SEQ ID NO 5
<211> LENGTH: 1472
<212> TYPE: PRT
<213> ORGANISM: Artificial Sequence
<220> FEATURE:
<223> OTHER INFORMATION: beta-gal-HC/A fusion protein construct

<400> SEQUENCE: 5

```
Met Lys Thr Met Ile Thr Asp Ser Leu Ala Val Val Leu Gln Arg Arg
1               5                   10                  15

Asp Trp Glu Asn Pro Gly Val Thr Gln Leu Asn Arg Leu Ala Ala His
            20                  25                  30

Pro Pro Phe Ala Ser Trp Arg Asn Ser Glu Glu Ala Arg Thr Asp Arg
        35                  40                  45

Pro Ser Gln Gln Leu Arg Ser Leu Asn Gly Glu Trp Arg Phe Ala Trp
    50                  55                  60

Phe Pro Ala Pro Glu Ala Val Pro Glu Ser Trp Leu Glu Cys Asp Leu
65                  70                  75                  80

Pro Glu Ala Asp Thr Val Val Val Pro Ser Asn Trp Gln Met His Gly
                85                  90                  95

Tyr Asp Ala Pro Ile Tyr Thr Asn Val Thr Tyr Pro Ile Thr Val Asn
            100                 105                 110

Pro Pro Phe Val Pro Thr Glu Asn Pro Thr Gly Cys Tyr Ser Leu Thr
        115                 120                 125

Phe Asn Val Asp Glu Ser Trp Leu Gln Glu Gly Gln Thr Arg Ile Ile
    130                 135                 140

Phe Asp Gly Val Asn Ser Ala Phe His Leu Trp Cys Asn Gly Arg Trp
145                 150                 155                 160

Val Gly Tyr Gly Gln Asp Ser Arg Leu Pro Ser Glu Phe Asp Leu Ser
                165                 170                 175

Ala Phe Leu Arg Ala Gly Glu Asn Arg Leu Ala Val Met Val Leu Arg
            180                 185                 190

Trp Ser Asp Gly Ser Tyr Leu Glu Asp Gln Asp Met Trp Arg Met Ser
        195                 200                 205

Gly Ile Phe Arg Asp Val Ser Leu Leu His Lys Pro Thr Thr Gln Ile
    210                 215                 220

Ser Asp Phe His Val Ala Thr Arg Phe Asn Asp Asp Phe Ser Arg Ala
225                 230                 235                 240

Val Leu Glu Ala Glu Val Gln Met Cys Gly Glu Leu Arg Asp Tyr Leu
                245                 250                 255

Arg Val Thr Val Ser Leu Trp Gln Gly Glu Thr Gln Val Ala Ser Gly
            260                 265                 270
```

Thr Ala Pro Phe Gly Gly Glu Ile Ile Asp Glu Arg Gly Gly Tyr Ala
275 280 285

Asp Arg Val Thr Leu Arg Leu Asn Val Glu Asn Pro Lys Leu Trp Ser
290 295 300

Ala Glu Ile Pro Asn Leu Tyr Arg Ala Val Val Glu Leu His Thr Ala
305 310 315 320

Asp Gly Thr Leu Ile Glu Ala Glu Ala Cys Asp Val Gly Phe Arg Glu
325 330 335

Val Arg Ile Glu Asn Gly Leu Leu Leu Leu Asn Gly Lys Pro Leu Leu
340 345 350

Ile Arg Gly Val Asn Arg His Glu His His Pro Leu His Gly Gln Val
355 360 365

Met Asp Glu Gln Thr Met Val Gln Asp Ile Leu Leu Met Lys Gln Asn
370 375 380

Asn Phe Asn Ala Val Arg Cys Ser His Tyr Pro Asn His Pro Leu Trp
385 390 395 400

Tyr Thr Leu Cys Asp Arg Tyr Gly Leu Tyr Val Val Asp Glu Ala Asn
405 410 415

Ile Glu Thr His Gly Met Val Pro Met Asn Arg Leu Thr Asp Asp Pro
420 425 430

Arg Trp Leu Pro Ala Met Ser Glu Arg Val Thr Arg Met Val Gln Arg
435 440 445

Asp Arg Asn His Pro Ser Val Ile Ile Trp Ser Leu Gly Asn Glu Ser
450 455 460

Gly His Gly Ala Asn His Asp Ala Leu Tyr Arg Trp Ile Lys Ser Val
465 470 475 480

Asp Pro Ser Arg Pro Val Gln Tyr Glu Gly Gly Gly Ala Asp Thr Thr
485 490 495

Ala Thr Asp Ile Ile Cys Pro Met Tyr Ala Arg Val Asp Glu Asp Gln
500 505 510

Pro Phe Pro Ala Val Pro Lys Trp Ser Ile Lys Lys Trp Leu Ser Leu
515 520 525

Pro Gly Glu Thr Arg Pro Leu Ile Leu Cys Glu Tyr Ala His Ala Met
530 535 540

Gly Asn Ser Leu Gly Gly Phe Ala Lys Tyr Trp Gln Ala Phe Arg Gln
545 550 555 560

Tyr Pro Arg Leu Gln Gly Gly Phe Val Trp Asp Trp Val Asp Gln Ser
565 570 575

Leu Ile Lys Tyr Asp Glu Asn Gly Asn Pro Trp Ser Ala Tyr Gly Gly
580 585 590

Asp Phe Gly Asp Thr Pro Asn Asp Arg Gln Phe Cys Met Asn Gly Leu
595 600 605

Val Phe Ala Asp Arg Thr Pro His Pro Ala Leu Thr Glu Ala Lys His
610 615 620

Gln Gln Gln Phe Phe Gln Phe Arg Leu Ser Gly Gln Thr Ile Glu Val
625 630 635 640

Thr Ser Glu Tyr Leu Phe Arg His Ser Asp Asn Glu Leu Leu His Trp
645 650 655

Met Val Ala Leu Asp Gly Lys Pro Leu Ala Ser Gly Glu Val Pro Leu
660 665 670

Asp Val Ala Pro Gln Gly Lys Gln Leu Ile Glu Leu Pro Glu Leu Pro
675 680 685

```
Gln Pro Glu Ser Ala Gly Gln Leu Trp Leu Thr Val Arg Val Val Gln
    690                 695                 700

Pro Asn Ala Thr Ala Trp Ser Glu Ala Gly His Ile Ser Ala Trp Gln
705                 710                 715                 720

Gln Trp Arg Leu Ala Glu Asn Leu Ser Val Thr Leu Pro Ala Ala Ser
                725                 730                 735

His Ala Ile Pro His Leu Thr Thr Ser Glu Met Asp Phe Cys Ile Glu
            740                 745                 750

Leu Gly Asn Lys Arg Trp Gln Phe Asn Arg Gln Ser Gly Phe Leu Ser
        755                 760                 765

Gln Met Trp Ile Gly Asp Lys Lys Gln Leu Leu Thr Pro Leu Arg Asp
    770                 775                 780

Gln Phe Thr Arg Ala Pro Leu Asp Asn Asp Ile Gly Val Ser Glu Ala
785                 790                 795                 800

Thr Arg Ile Asp Pro Asn Ala Trp Val Glu Arg Trp Lys Ala Ala Gly
                805                 810                 815

His Tyr Gln Ala Glu Ala Ala Leu Leu Gln Cys Thr Ala Asp Thr Leu
            820                 825                 830

Ala Asp Ala Val Leu Ile Thr Thr Ala His Ala Trp Gln His Gln Gly
        835                 840                 845

Lys Thr Leu Phe Ile Ser Arg Lys Thr Tyr Arg Ile Asp Gly Ser Gly
    850                 855                 860

Gln Met Ala Ile Thr Val Asp Val Glu Val Ala Ser Asp Thr Pro His
865                 870                 875                 880

Pro Ala Arg Ile Gly Leu Asn Cys Gln Leu Ala Gln Val Ala Glu Arg
                885                 890                 895

Val Asn Trp Leu Gly Leu Gly Pro Gln Glu Asn Tyr Pro Asp Arg Leu
            900                 905                 910

Thr Ala Ala Cys Phe Asp Arg Trp Asp Leu Pro Leu Ser Asp Met Tyr
        915                 920                 925

Thr Pro Tyr Val Phe Pro Ser Glu Asn Gly Leu Arg Cys Gly Thr Arg
    930                 935                 940

Glu Leu Asn Tyr Gly Pro His Gln Trp Arg Gly Asp Phe Gln Phe Asn
945                 950                 955                 960

Ile Ser Arg Tyr Ser Gln Gln Gln Leu Met Glu Thr Ser His Arg His
                965                 970                 975

Leu Leu His Ala Glu Glu Gly Thr Trp Leu Asn Ile Asp Gly Phe His
            980                 985                 990

Met Gly Ile Gly Gly Asp Asp Ser  Trp Ser Pro Ser Val  Ser Ala Glu
        995                 1000                1005

Phe Gln  Leu Ser Ala Gly Arg  Tyr His Tyr Gln Leu  Val Trp Cys
    1010                1015                1020

Gln Lys  Gly Gly Gly Gly Ser  Gly Gly Gly Gly Ser  Gly Gly Gly
    1025                1030                1035

Gly Ser  Met Asn Ile Ile Asn  Thr Ser Ile Leu Asn  Leu Arg Tyr
    1040                1045                1050

Glu Ser  Asn His Leu Ile Asp  Leu Ser Arg Tyr Ala  Ser Lys Ile
    1055                1060                1065

Asn Ile  Gly Ser Lys Val Asn  Phe Asp Pro Ile Asp  Lys Asn Gln
    1070                1075                1080

Ile Gln  Leu Phe Asn Leu Glu  Ser Ser Lys Ile Glu  Val Ile Leu
    1085                1090                1095

Lys Asn  Ala Ile Val Tyr Asn  Ser Met Tyr Glu Asn  Phe Ser Thr
```

```
    1100                1105                1110

Ser Phe  Trp Ile Arg Ile Pro  Lys Tyr Phe Asn Ser  Ile Ser Leu
    1115                1120                1125

Asn Asn  Glu Tyr Thr Ile Ile  Asn Cys Met Glu Asn  Asn Ser Gly
    1130                1135                1140

Trp Lys  Val Ser Leu Asn Tyr  Gly Glu Ile Ile Trp  Thr Leu Gln
    1145                1150                1155

Asp Thr  Gln Glu Ile Lys Gln  Arg Val Val Phe Lys  Tyr Ser Gln
    1160                1165                1170

Met Ile  Asn Ile Ser Asp Tyr  Ile Asn Arg Trp Ile  Phe Val Thr
    1175                1180                1185

Ile Thr  Asn Asn Arg Leu Asn  Asn Ser Lys Ile Tyr  Ile Asn Gly
    1190                1195                1200

Arg Leu  Ile Asp Gln Lys Pro  Ile Ser Asn Leu Gly  Asn Ile His
    1205                1210                1215

Ala Ser  Asn Asn Ile Met Phe  Lys Leu Asp Gly Cys  Arg Asp Thr
    1220                1225                1230

His Arg  Tyr Ile Trp Ile Lys  Tyr Phe Asn Leu Phe  Asp Lys Glu
    1235                1240                1245

Leu Asn  Glu Lys Glu Ile Lys  Asp Leu Tyr Asp Asn  Gln Ser Asn
    1250                1255                1260

Ser Gly  Ile Leu Lys Asp Phe  Trp Gly Asp Tyr Leu  Gln Tyr Asp
    1265                1270                1275

Lys Pro  Tyr Tyr Met Leu Asn  Leu Tyr Asp Pro Asn  Lys Tyr Val
    1280                1285                1290

Asp Val  Asn Asn Val Gly Ile  Arg Gly Tyr Met Tyr  Leu Lys Gly
    1295                1300                1305

Pro Arg  Gly Ser Val Met Thr  Thr Asn Ile Tyr Leu  Asn Ser Ser
    1310                1315                1320

Leu Tyr  Arg Gly Thr Lys Phe  Ile Ile Lys Lys Tyr  Ala Ser Gly
    1325                1330                1335

Asn Lys  Asp Asn Ile Val Arg  Asn Asn Asp Arg Val  Tyr Ile Asn
    1340                1345                1350

Val Val  Val Lys Asn Lys Glu  Tyr Arg Leu Ala Thr  Asn Ala Ser
    1355                1360                1365

Gln Ala  Gly Val Glu Lys Ile  Leu Ser Ala Leu Glu  Ile Pro Asp
    1370                1375                1380

Val Gly  Asn Leu Ser Gln Val  Val Val Met Lys Ser  Lys Asn Asp
    1385                1390                1395

Gln Gly  Ile Thr Asn Lys Cys  Lys Met Asn Leu Gln  Asp Asn Asn
    1400                1405                1410

Gly Asn  Asp Ile Gly Phe Ile  Gly Phe His Gln Phe  Asn Asn Ile
    1415                1420                1425

Ala Lys  Leu Val Ala Ser Asn  Trp Tyr Asn Arg Gln  Ile Glu Arg
    1430                1435                1440

Ser Ser  Arg Thr Leu Gly Cys  Ser Trp Glu Phe Ile  Pro Val Asp
    1445                1450                1455

Asp Gly  Trp Gly Glu Arg Pro  Leu His His His His  His His
    1460                1465                1470
```

<210> SEQ ID NO 6
<211> LENGTH: 3075
<212> TYPE: DNA
<213> ORGANISM: Escherichia coli

<400> SEQUENCE: 6
atgaccatga ttacggattc actggccgtc gttttacaac gtcgtgactg ggaaaaccct 60
ggcgttaccc aacttaatcg ccttgcagca catccccctt tcgccagctg gcgtaatagc 120
gaagaggccc gcaccgatcg cccttcccaa cagttgcgca gcctgaatgg cgaatggcgc 180
tttgcctggt ttccggcacc agaagcggtg ccggaaagct ggctggagtg cgatcttcct 240
gaggccgata ctgtcgtcgt cccctcaaac tggcagatgc acggttacga tgcgcccatc 300
tacaccaacg tgacctatcc cattacggtc aatccgccgt ttgttcccac ggagaatccg 360
acgggttgtt actcgctcac atttaatgtt gatgaaagct ggctacagga aggccagacg 420
cgaattattt ttgatggcgt taactcggcg tttcatctgt ggtgcaacgg gcgctgggtc 480
ggttacggcc aggacagtcg tttgccgtct gaatttgacc tgagcgcatt tttacgcgcc 540
ggagaaaacc gcctcgcggt gatggtgctg cgctggagtg acggcagtta tctggaagat 600
caggatatgt ggcggatgag cggcattttc cgtgacgtct cgttgctgca taaaccgact 660
acacaaatca gcgatttcca tgttgccact cgctttaatg atgatttcag ccgcgctgta 720
ctggaggctg aagttcagat gtgcggcgag ttgcgtgact acctacgggt aacagtttct 780
ttatggcagg gtgaaacgca ggtcgccagc ggcaccgcgc ctttcggcgg tgaaattatc 840
gatgagcgtg gtggttatgc cgatcgcgtc acactacgtc tgaacgtcga aaacccgaaa 900
ctgtggagcg ccgaaatccc gaatctctat cgtgcggtgg ttgaactgca caccgccgac 960
ggcacgctga ttgaagcaga agcctgcgat gtcggtttcc gcgaggtgcg gattgaaaat 1020
ggtctgctgc tgctgaacgg caagccgttg ctgattcgag gcgttaaccg tcacgagcat 1080
catcctctgc atggtcaggt catggatgag cagacgatgg tgcaggatat cctgctgatg 1140
aagcagaaca actttaacgc cgtgcgctgt tcgcattatc cgaaccatcc gctgtggtac 1200
acgctgtgcg accgctacgg cctgtatgtg gtggatgaag ccaatattga aacccacggc 1260
atggtgccaa tgaatcgtct gaccgatgat ccgcgctggc taccggcgat gagcgaacgc 1320
gtaacgcgaa tggtgcagcg cgatcgtaat cacccgagtg tgatcatctg gtcgctgggg 1380
aatgaatcag gccacggcgc taatcacgac gcgctgtatc gctggatcaa atctgtcgat 1440
ccttcccgcc cggtgcagta tgaaggcggc ggagccgaca ccacggccac cgatattatt 1500
tgcccgatgt acgcgcgcgt ggatgaagac cagcccttcc cggctgtgcc gaaatggtcc 1560
atcaaaaaat ggctttcgct acctggagag acgcgcccgc tgatcctttg cgaatacgcc 1620
cacgcgatgg gtaacagtct tggcggtttc gctaaatact ggcaggcgtt tcgtcagtat 1680
ccccgtttac agggcggctt cgtctgggac tgggtggatc agtcgctgat taaatatgat 1740
gaaaacggca acccgtggtc ggcttacggc ggtgattttg gcgatacgcc gaacgatcgc 1800
cagttctgta tgaacggtct ggtctttgcc gaccgcacgc cgcatccagc gctgacggaa 1860
gcaaaacacc agcagcagtt tttccagttc cgtttatccg ggcaaaccat cgaagtgacc 1920
agcgaatacc tgttccgtca tagcgataac gagctcctgc actggatggt ggcgctggat 1980
ggtaagccgc tggcaagcgg tgaagtgcct ctggatgtcg ctccacaagg taaacagttg 2040
attgaactgc ctgaactacc gcagccggag agcgccgggc aactctggct cacagtacgc 2100
gtagtgcaac cgaacgcgac cgcatggtca gaagccggac acatcagcgc ctggcagcag 2160
tggcgtctgg ctgaaaacct cagcgtgaca ctccccgccg cgtcccacgc catcccgcat 2220
ctgaccacca gcgaaatgga tttttgcatc gagctgggta ataagcgttg gcaatttaac 2280

```
cgccagtcag gctttctttc acagatgtgg attggcgata aaaaacaact gctgacgccg   2340

ctgcgcgatc agttcacccg tgcaccgctg gataacgaca ttggcgtaag tgaagcgacc   2400

cgcattgacc ctaacgcctg ggtcgaacgc tggaaggcgg cgggccatta ccaggccgaa   2460

gcagcgttgt tgcagtgcac ggcagataca cttgctgatg cggtgctgat tacgaccgct   2520

cacgcgtggc agcatcaggg gaaaacctta tttatcagcc ggaaaaccta ccggattgat   2580

ggtagtggtc aaatggcgat taccgttgat gttgaagtgg cgagcgatac accgcatccg   2640

gcgcggattg gcctgaactg ccagctggcg caggtagcag agcgggtaaa ctggctcgga   2700

ttagggccgc aagaaaacta tcccgaccgc cttactgccg cctgttttga ccgctgggat   2760

ctgccattgt cagacatgta taccccgtac gtcttcccga gcgaaaacgg tctgcgctgc   2820

gggacgcgcg aattgaatta tggcccacac cagtggcgcg gcgacttcca gttcaacatc   2880

agccgctaca gtcaacagca actgatggaa accagccatc gccatctgct gcacgcggaa   2940

gaaggcacat ggctgaatat cgacggtttc catatgggga ttggtggcga cgactcctgg   3000

agcccgtcag tatcggcgga attccagctg agcgccggtc gctaccatta ccagttggtc   3060

tggtgtcaaa aataa                                                    3075
```

```
<210> SEQ ID NO 7
<211> LENGTH: 3078
<212> TYPE: DNA
<213> ORGANISM: Artificial Sequence
<220> FEATURE:
<223> OTHER INFORMATION: Optimized nucleic acid sequence encoding
      E.coli beta-gal

<400> SEQUENCE: 7
```

```
catatgaaaa ccatgattac ggatagcctg gccgtggttc tgcaacgtcg cgactgggaa     60

aatccgggtg tgacccagct gaaccgtctg gccgcacatc cgccgtttgc tagttggcgc    120

aactccgaag aagcgcgtac ggatcgcccg agccagcaac tgcgttctct gaatggcgaa    180

tggcgctttg cctggtttcc ggccccggaa gccgttccgg aaagctggct ggaatgcgat    240

ctgccggaag ctgacaccgt cgtggttccg tctaactggc agatgcatgg ttatgatgcg    300

ccgatctaca ccaatgtgac gtatccgatt acggtgaacc cgccgttcgt tccgaccgaa    360

aatccgacgg gctgctatag cctgaccttt aatgttgatg aatcttggct gcaggaaggt    420

caaacgcgta ttatcttcga cggcgttaac agtgcctttc acctgtggtg taatggtcgt    480

tgggtcggtt acggccagga ttcacgcctg ccgtcggaat ttgacctgtc cgcttttctg    540

cgtgcgggcg aaaaccgcct ggcagttatg gtcctgcgct ggtcagatgg ttcgtatctg    600

gaagatcagg acatgtggcg tatgtcaggc atcttccgcg atgtgtcgct gctgcataaa    660

ccgaccacgc agatttcaga ctttcacgtt gcgacccgtt tcaatgatga cttttcgcgc    720

gccgtcctgg aagcagaagt gcagatgtgc ggtgaactgc gtgattatct gcgcgtgacg    780

gtttcactgt ggcagggtga aacccaggtg gctagcggca cggccccgtt tggcggtgaa    840

attatcgatg aacgtggcgg ttacgcggac cgtgtgaccc tgcgtctgaa cgttgaaaat    900

ccgaaactgt ggagcgcaga aattccgaac ctgtatcgcg ctgtcgtgga actgcatacc    960

gcggatggta cgctgatcga agcagaagct tgtgacgttg gcttccgtga agtccgcatt   1020

gaaaatggtc tgctgctgct gaacggcaaa ccgctgctga tccgtggtgt gaatcgccat   1080

gaacatcacc cgctgcacgg ccaggtgatg gatgaacaga cgatggtgca agacattctg   1140

ctgatgaaac agaacaattt taacgcggtt cgttgcagtc attacccgaa tcacccgctg   1200
```

tggtataccc tgtgtgatcg ctatggtctg tacgttgtcg acgaagcgaa catcgaaacc 1260
cacggcatgg tgccgatgaa tcgtctgacc gatgacccgc gctggctgcc ggcaatgagc 1320
gaacgtgtta cccgcatggt ccagcgtgat cgcaaccacc cgagtgttat tatctggtcc 1380
ctgggcaatg aatcaggtca tggcgccaac cacgatgcac tgtaccgttg gattaaaagc 1440
gtcgacccgt ctcgcccggt gcagtatgaa ggcggtggcg ctgataccac cgccaccgac 1500
attatctgcc cgatgtacgc tcgtgttgat gaagaccagc cgtttccggc ggtcccgaaa 1560
tggtcaatca aaaaatggct gagcctgccg ggtgaaaccc gtccgctgat cctgtgtgaa 1620
tatgcgcatg cgatgggcaa cagcctgggt ggcttcgcca aatactggca ggcatttcgt 1680
caatatccgc gcctgcaagg tggcttcgtg tgggattggg ttgaccagag tctgattaaa 1740
tacgatgaaa acggtaatcc gtggtccgcg tatggcggcg attttggcga caccccgaat 1800
gatcgtcagt tctgcatgaa cggtctggtg tttgccgacc gtaccccgca tccggcactg 1860
accgaagcaa aacaccagca acagtttttc cagttccgtc tgtctggcca aaccattgaa 1920
gtgacgagcg aatacctgtt tcgccattct gataacgaac tgctgcactg gatggttgcc 1980
ctggacggta aaccgctggc atcaggcgaa gtcccgctgg atgtggctcc gcagggtaaa 2040
caactgattg aactgccgga actgccgcag ccggaaagcg caggccaact gtggctgacc 2100
gtgcgtgtgg ttcagccgaa cgcaacggct tggagcgaag ctggtcatat ctctgcgtgg 2160
caacagtggc gcctggccga aaatctgagt gttaccctgc cggcagcttc ccatgcaatc 2220
ccgcacctga ccacgagcga aatggatttc tgtattgaac tgggcaataa acgttggcag 2280
ttcaaccgcc aaagtggttt tctgtcccag atgtggattg gcgataaaaa acaactgctg 2340
accccgctgc gtgaccagtt tacccgtgcc ccgctggata acgacatcgg tgtgtctgaa 2400
gctacccgta ttgatccgaa tgcgtgggtt gaacgctgga aagcggccgg ccattaccag 2460
gccgaagcag ctctgctgca atgtaccgca gataccctgg ccgatgcggt gctgattacc 2520
acggcacatg cttggcagca ccaaggtaaa accctgttta tcagccgtaa aacgtatcgc 2580
attgatggtt ctggccagat ggcgattacc gtcgatgtgg aagttgcaag cgacacgccg 2640
cacccggcac gtattggtct gaattgtcag ctggcacaag ttgctgaacg tgtcaactgg 2700
ctgggtctgg gtccgcagga aaattatccg gatcgtctga ccgccgcatg ctttgatcgt 2760
tgggacctgc cgctgagcga tatgtatacc ccgtacgtgt ttccgtctga aaacggtctg 2820
cgttgtggca cgcgcgaact gaattacggt ccgcatcagt ggcgtggcga ttttcaattc 2880
aacattagcc gctattctca acagcaactg atggaaacca gccatcgtca cctgctgcat 2940
gcggaagaag gtacgtggct gaatatcgat ggtttccaca tgggcattgg tggcgatgac 3000
agctggtctc cgagtgtttc cgccgaattt cagctgtctg caggccgcta tcattaccag 3060
ctggtctggt gtcaaaaa 3078

<210> SEQ ID NO 8
<211> LENGTH: 1296
<212> TYPE: DNA
<213> ORGANISM: Artificial Sequence
<220> FEATURE:
<223> OTHER INFORMATION: BoNT/A HC fragment

<400> SEQUENCE: 8
aacattatca ataccagtat cctgaatctg cgttacgaat ccaaccacct gattgatctg 60
tcacgctatg cctcgaaaat caacatcggt tcaaaagtga acttcgatcc gatcgacaaa 120
aatcagattc aactgtttaa cctggaaagc tctaaaattg aagtcatcct gaaaaacgcg 180

```
attgtgtata attccatgta cgaaaacttc tcaacctcgt tttggattcg tatcccgaaa    240

tactttaaca gcatctctct gaacaacgaa tacacgatca tcaactgcat ggaaaacaat    300

agtggttgga aagtgtccct gaactatggc gaaattatct ggaccctgca ggatacgcaa    360

gaaattaaac aacgtgtcgt gttcaaatac agtcagatga tcaacatctc cgattacatc    420

aaccgttgga tctttgttac cattacgaac aatcgcctga acaacagcaa aatctacatc    480

aacggtcgcc tgatcgatca gaaaccgatt tcaaacctgg gcaatatcca tgcgtcgaac    540

aatattatgt tcaaactgga tggctgtcgt gacacccacc gctacatttg gatcaaatac    600

ttcaacctgt ttgataaaga actgaacgaa aaagaaatca aagatctgta tgacaaccag    660

agtaattccg gtattctgaa agatttttgg ggcgactatc tgcagtacga taaaccgtat    720

tacatgctga atctgtacga tccgaacaaa tatgtcgacg tgaacaatgt cggtattcgt    780

ggctatatgt acctgaaagg tccgcgcggc agcgtgatga ccacgaacat ctacctgaat    840

agttccctgt accgtggcac caaattcatc atcaaaaaat acgcctctgg caacaaagat    900

aatatcgttc gtaacaatga ccgcgtctac atcaacgttg tcgtgaaaaa caaagaatac    960

cgcctggcga ccaacgccag tcaggcaggt gtcgaaaaaa tcctgtccgc gctggaaatt   1020

ccggatgtgg gcaacctgtc acaagttgtc gtgatgaaat cgaaaaatga tcagggtatt   1080

accaataaat gcaaaatgaa cctgcaggat aacaatggca atgacattgg ttttatcggc   1140

ttccatcagt ttaacaatat cgctaaactg gtggcgagta actggtataa tcgtcagatt   1200

gaacgttcat cgcgcaccct gggctgttcc tgggaattta tcccggttga tgacggttgg   1260

ggcgaacgcc cgctgcatca ccatcaccat cactaa                             1296
```

<210> SEQ ID NO 9
<211> LENGTH: 4428
<212> TYPE: DNA
<213> ORGANISM: Artificial Sequence
<220> FEATURE:
<223> OTHER INFORMATION: beta-gal-HC/A fusion protein construct

<400> SEQUENCE: 9

```
catatgaaaa ccatgattac ggatagcctg gccgtggttc tgcaacgtcg cgactgggaa     60

aatccgggtg tgacccagct gaaccgtctg gccgcacatc cgccgtttgc tagttggcgc    120

aactccgaag aagcgcgtac ggatcgcccg agccagcaac tgcgttctct gaatggcgaa    180

tggcgctttg cctggtttcc ggccccggaa gccgttccgg aaagctggct ggaatgcgat    240

ctgccggaag ctgacaccgt cgtggttccg tctaactggc agatgcatgg ttatgatgcg    300

ccgatctaca ccaatgtgac gtatccgatt acggtgaacc cgccgttcgt tccgaccgaa    360

aatccgacgg gctgctatag cctgaccttt aatgttgatg aatcttggct gcaggaaggt    420

caaacgcgta ttatcttcga cggcgttaac agtgcctttc acctgtggtg taatggtcgt    480

tgggtcggtt acggccagga ttcacgcctg ccgtcggaat ttgacctgtc cgcttttctg    540

cgtgcgggcg aaaaccgcct ggcagttatg gtcctgcgct ggtcagatgg ttcgtatctg    600

gaagatcagg acatgtggcg tatgtcaggc atcttccgcg atgtgtcgct gctgcataaa    660

ccgaccacgc agatttcaga ctttcacgtt gcgacccgtt tcaatgatga cttttcgcgc    720

gccgtcctgg aagcagaagt gcagatgtgc ggtgaactgc gtgattatct gcgcgtgacg    780

gtttcactgt ggcagggtga aacccaggtg gctagcggca cggccccgtt tggcggtgaa    840

attatcgatg aacgtggcgg ttacgcggac cgtgtgaccc tgcgtctgaa cgttgaaaat    900
```

```
ccgaaactgt ggagcgcaga aattccgaac ctgtatcgcg ctgtcgtgga actgcatacc    960
gcggatggta cgctgatcga agcagaagct tgtgacgttg gcttccgtga agtccgcatt   1020
gaaaatggtc tgctgctgct gaacggcaaa ccgctgctga tccgtggtgt gaatcgccat   1080
gaacatcacc cgctgcacgg ccaggtgatg gatgaacaga cgatggtgca agacattctg   1140
ctgatgaaac agaacaattt taacgcggtt cgttgcagtc attacccgaa tcacccgctg   1200
tggtataccc tgtgtgatcg ctatggtctg tacgttgtcg acgaagcgaa catcgaaacc   1260
cacggcatgg tgccgatgaa tcgtctgacc gatgacccgc gctggctgcc ggcaatgagc   1320
gaacgtgtta cccgcatggt ccagcgtgat cgcaaccacc cgagtgttat tatctggtcc   1380
ctgggcaatg aatcaggtca tggcgccaac cacgatgcac tgtaccgttg gattaaaagc   1440
gtcgacccgt ctcgcccggt gcagtatgaa ggcggtggcg ctgataccac cgccaccgac   1500
attatctgcc cgatgtacgc tcgtgttgat gaagaccagc cgtttccggc ggtcccgaaa   1560
tggtcaatca aaaaatggct gagcctgccg ggtgaaaccc gtccgctgat cctgtgtgaa   1620
tatgcgcatg cgatgggcaa cagcctgggt ggcttcgcca aatactggca ggcatttcgt   1680
caatatccgc gcctgcaagg tggcttcgtg tgggattggg ttgaccagag tctgattaaa   1740
tacgatgaaa acggtaatcc gtggtccgcg tatggcggcg attttggcga caccccgaat   1800
gatcgtcagt tctgcatgaa cggtctggtg tttgccgacc gtaccccgca tccggcactg   1860
accgaagcaa aacaccagca acagtttttc cagttccgtc tgtctggcca aaccattgaa   1920
gtgacgagcg aatacctgtt tcgccattct gataacgaac tgctgcactg gatggttgcc   1980
ctggacggta aaccgctggc atcaggcgaa gtcccgctgg atgtggctcc gcagggtaaa   2040
caactgattg aactgccgga actgccgcag ccggaaagcg caggccaact gtggctgacc   2100
gtgcgtgtgg ttcagccgaa cgcaacggct tggagcgaag ctggtcatat ctctgcgtgg   2160
caacagtggc gcctggccga aaatctgagt gttaccctgc cggcagcttc ccatgcaatc   2220
ccgcacctga ccacgagcga aatggatttc tgtattgaac tgggcaataa acgttggcag   2280
ttcaaccgcc aaagtggttt tctgtcccag atgtggattg gcgataaaaa acaactgctg   2340
accccgctgc gtgaccagtt tacccgtgcc ccgctggata acgacatcgg tgtgtctgaa   2400
gctacccgta ttgatccgaa tgcgtgggtt gaacgctgga aagcggccgg ccattaccag   2460
gccgaagcag ctctgctgca atgtaccgca gataccctgg ccgatgcggt gctgattacc   2520
acggcacatg cttggcagca ccaaggtaaa accctgttta tcagccgtaa aacgtatcgc   2580
attgatggtt ctggccagat ggcgattacc gtcgatgtgg aagttgcaag cgacacgccg   2640
cacccggcac gtattggtct gaattgtcag ctggcacaag ttgctgaacg tgtcaactgg   2700
ctgggtctgg gtccgcagga aaattatccg gatcgtctga ccgccgcatg ctttgatcgt   2760
tgggacctgc cgctgagcga tatgtatacc ccgtacgtgt ttccgtctga aaacggtctg   2820
cgttgtggca cgcgcgaact gaattacggt ccgcatcagt ggcgtggcga ttttcaattc   2880
aacattagcc gctattctca acagcaactg atggaaacca gccatcgtca cctgctgcat   2940
gcggaagaag gtacgtggct gaatatcgat ggtttccaca tgggcattgg tggcgatgac   3000
agctggtctc cgagtgtttc cgccgaattt cagctgtctg caggccgcta tcattaccag   3060
ctggtctggt gtcaaaaagg tggcggtggc tcgggtggcg gtggcagcgg tggcggtggc   3120
tctatgaaca ttatcaatac cagtatcctg aatctgcgtt acgaatccaa ccacctgatt   3180
gatctgtcac gctatgcctc gaaaatcaac atcggttcaa aagtgaactt cgatccgatc   3240
gacaaaaatc agattcaact gtttaacctg gaaagctcta aaattgaagt catcctgaaa   3300
```

aacgcgattg tgtataattc catgtacgaa aacttctcaa cctcgttttg gattcgtatc 3360
ccgaaatact ttaacagcat ctctctgaac aacgaataca cgatcatcaa ctgcatggaa 3420
aacaatagtg gttggaaagt gtccctgaac tatggcgaaa ttatctggac cctgcaggat 3480
acgcaagaaa ttaaacaacg tgtcgtgttc aaatacagtc agatgatcaa catctccgat 3540
tacatcaacc gttggatctt tgttaccatt acgaacaatc gcctgaacaa cagcaaaatc 3600
tacatcaacg gtcgcctgat cgatcagaaa ccgatttcaa acctgggcaa tatccatgcg 3660
tcgaacaata ttatgttcaa actggatggc tgtcgtgaca cccaccgcta catttggatc 3720
aaatacttca acctgtttga taaagaactg aacgaaaaag aaatcaaaga tctgtatgac 3780
aaccagagta attccggtat tctgaaagat ttttggggcg actatctgca gtacgataaa 3840
ccgtattaca tgctgaatct gtacgatccg aacaaatatg tcgacgtgaa caatgtcggt 3900
attcgtggct atatgtacct gaaaggtccg cgcggcagcg tgatgaccac gaacatctac 3960
ctgaatagtt ccctgtaccg tggcaccaaa ttcatcatca aaaaatacgc ctctggcaac 4020
aaagataata tcgttcgtaa caatgaccgc gtctacatca acgttgtcgt gaaaaacaaa 4080
gaataccgcc tggcgaccaa cgccagtcag gcaggtgtcg aaaaaatcct gtccgcgctg 4140
gaaattccgg atgtgggcaa cctgtcacaa gttgtcgtga tgaaatcgaa aaatgatcag 4200
ggtattacca ataaatgcaa aatgaacctg caggataaca atggcaatga cattggtttt 4260
atcggcttcc atcagtttaa caatatcgct aaactggtgg cgagtaactg gtataatcgt 4320
cagattgaac gttcatcgcg caccctgggc tgttcctggg aatttatccc ggttgatgac 4380
ggttggggcg aacgcccgct gcatcaccat caccatcact aaggatcc 4428

<210> SEQ ID NO 10
<211> LENGTH: 381
<212> TYPE: DNA
<213> ORGANISM: Mus musculus

<400> SEQUENCE: 10
ttccctgatg tcattaaaca tctccagtct gatgagtatg cactgctaac taggaatgtg 60
caaaaggata aatatgcaaa cttcagcatt aactttacca tggagaacca gatccacact 120
ggaatggaat acgagaacgg cagattcctc ggagtcaagt tcaaatcggt aaccttcaaa 180
gattcagtgt ttaagtcctg cacctttgac gacgtgacct cagtcaacac ctacttcaag 240
aactgcacgt ttattgatac ccttttttgat aacacagatt ttgagcccta taaattcata 300
gacagtgaat ttcagaactg ctcatttctt cacaataaga cggggtgcca gattactttt 360
gatgacgact atagtgccta c 381

<210> SEQ ID NO 11
<211> LENGTH: 783
<212> TYPE: DNA
<213> ORGANISM: Schistosoma japonicum

<400> SEQUENCE: 11
atgtcgccga tcctgggcta ctggaaaatc aaaggcctgg tgcaaccgac ccgtctgctg 60
ctggaatacc tggaagaaaa atacgaagaa catctgtatg aacgtgatga aggcgacaaa 120
tggcgcaaca aaaaattcga actgggtctg gaatttccga atctgccgta ttacatcgat 180
ggcgacgtga aactgaccca gagcatggct attatccgtt acattgcgga taaacacaac 240
atgctgggcg gttgcccgaa agaacgcgcc gaaatctcta tgctggaagg cgcagtgctg 300

```
gatattcgtt atggtgttag tcgcattgcg tactccaaag atttcgaaac cctgaaagtt    360

gactttctga gcaaactgcc ggaaatgctg aaaatgttcg aagatcgtct gtgtcataaa    420

acctatctga atggtgatca tgtcacgcac ccggacttta tgctgtatga tgccctggac    480

gtggttctgt acatggaccc gatgtgcctg gacgccttcc cgaaactggt gtgttttaaa    540

aaacgcattg aagcaatccc gcaaatcgat aaatacctga aaagctctaa atacattgcg    600

tggccgctgc agggttggca agccaccttt ggcggtggcg atcacccgcc gaaaagtgac    660

ggtagtacgt ccggttcagg ctcggcgggt ctggttccgc gtggctccac cgcaatcggt    720

atgaaagaaa cggcggcggc aaaattcgaa cgccagcaca tggatagccc ggacctgggc    780

acc                                                                  783
```

<210> SEQ ID NO 12
<211> LENGTH: 261
<212> TYPE: PRT
<213> ORGANISM: Schistosoma japonicum

<400> SEQUENCE: 12

```
Met Ser Pro Ile Leu Gly Tyr Trp Lys Ile Lys Gly Leu Val Gln Pro
1               5                   10                  15

Thr Arg Leu Leu Leu Glu Tyr Leu Glu Glu Lys Tyr Glu Glu His Leu
            20                  25                  30

Tyr Glu Arg Asp Glu Gly Asp Lys Trp Arg Asn Lys Lys Phe Glu Leu
        35                  40                  45

Gly Leu Glu Phe Pro Asn Leu Pro Tyr Tyr Ile Asp Gly Asp Val Lys
    50                  55                  60

Leu Thr Gln Ser Met Ala Ile Ile Arg Tyr Ile Ala Asp Lys His Asn
65                  70                  75                  80

Met Leu Gly Gly Cys Pro Lys Glu Arg Ala Glu Ile Ser Met Leu Glu
                85                  90                  95

Gly Ala Val Leu Asp Ile Arg Tyr Gly Val Ser Arg Ile Ala Tyr Ser
            100                 105                 110

Lys Asp Phe Glu Thr Leu Lys Val Asp Phe Leu Ser Lys Leu Pro Glu
        115                 120                 125

Met Leu Lys Met Phe Glu Asp Arg Leu Cys His Lys Thr Tyr Leu Asn
    130                 135                 140

Gly Asp His Val Thr His Pro Asp Phe Met Leu Tyr Asp Ala Leu Asp
145                 150                 155                 160

Val Val Leu Tyr Met Asp Pro Met Cys Leu Asp Ala Phe Pro Lys Leu
                165                 170                 175

Val Cys Phe Lys Lys Arg Ile Glu Ala Ile Pro Gln Ile Asp Lys Tyr
            180                 185                 190

Leu Lys Ser Ser Lys Tyr Ile Ala Trp Pro Leu Gln Gly Trp Gln Ala
        195                 200                 205

Thr Phe Gly Gly Gly Asp His Pro Pro Lys Ser Asp Gly Ser Thr Ser
    210                 215                 220

Gly Ser Gly Ser Ala Gly Leu Val Pro Arg Gly Ser Thr Ala Ile Gly
225                 230                 235                 240

Met Lys Glu Thr Ala Ala Ala Lys Phe Glu Arg Gln His Met Asp Ser
                245                 250                 255

Pro Asp Leu Gly Thr
            260
```

<210> SEQ ID NO 13

<211> LENGTH: 127
<212> TYPE: PRT
<213> ORGANISM: Mus musculus

<400> SEQUENCE: 13

```
Phe Pro Asp Val Ile Lys His Leu Gln Ser Asp Glu Tyr Ala Leu Leu
1               5                   10                  15

Thr Arg Asn Val Gln Lys Asp Lys Tyr Ala Asn Phe Ser Ile Asn Phe
            20                  25                  30

Thr Met Glu Asn Gln Ile His Thr Gly Met Glu Tyr Glu Asn Gly Arg
        35                  40                  45

Phe Leu Gly Val Lys Phe Lys Ser Val Thr Phe Lys Asp Ser Val Phe
    50                  55                  60

Lys Ser Cys Thr Phe Asp Asp Val Thr Ser Val Asn Thr Tyr Phe Lys
65                  70                  75                  80

Asn Cys Thr Phe Ile Asp Thr Leu Phe Asp Asn Thr Asp Phe Glu Pro
                85                  90                  95

Tyr Lys Phe Ile Asp Ser Glu Phe Gln Asn Cys Ser Phe Leu His Asn
            100                 105                 110

Lys Thr Gly Cys Gln Ile Thr Phe Asp Asp Asp Tyr Ser Ala Tyr
        115                 120                 125
```

<210> SEQ ID NO 14
<211> LENGTH: 1176
<212> TYPE: DNA
<213> ORGANISM: Artificial Sequence
<220> FEATURE:
<223> OTHER INFORMATION: fusion receptor protein GST-SV2C

<400> SEQUENCE: 14

```
catatgtcgc cgatcctggg ctactggaaa atcaaaggcc tggtgcaacc gacccgtctg     60

ctgctggaat acctggaaga aaaatacgaa gaacatctgt atgaacgtga tgaaggcgac    120

aaatggcgca acaaaaaatt cgaactgggt ctggaatttc cgaatctgcc gtattacatc    180

gatggcgacg tgaaactgac ccagagcatg gctattatcc gttacattgc ggataaacac    240

aacatgctgg gcggttgccc gaaagaacgc gccgaaatct ctatgctgga aggcgcagtg    300

ctggatattc gttatggtgt tagtcgcatt gcgtactcca aagatttcga aaccctgaaa    360

gttgactttc tgagcaaact gccggaaatg ctgaaaatgt tcgaagatcg tctgtgtcat    420

aaaacctatc tgaatggtga tcatgtcacg cacccggact ttatgctgta tgatgccctg    480

gacgtggttc tgtacatgga cccgatgtgc ctggacgcct tcccgaaact ggtgtgtttt    540

aaaaaacgca ttgaagcaat cccgcaaatc gataaatacc tgaaaagctc taaatacatt    600

gcgtggccgc tgcagggttg gcaagccacc tttggcggtg gcgatcaccc gccgaaaagt    660

gacggtagta cgtccggttc aggctcggcg ggtctggttc cgcgtggctc caccgcaatc    720

ggtatgaaag aaacggcggc ggcaaaattc gaacgccagc acatggatag cccggacctg    780

ggcacctttc cggatgtcat taaacacctg cagtctgacg aatatgctct gctgacgcgt    840

aacgtgcaaa aagataaata cgcgaacttt agcatcaatt tcacgatgga aaaccaaatt    900

catacgggta tggaatatga aaatggtcgc tttctgggcg ttaaattcaa atcagtcacc    960

ttcaaagata gcgttttcaa atcttgcacg tttgatgacg tcacctcggt gaacacgtac   1020

ttcaaaaact gtaccttcat cgatacgctg ttcgataaca ccgactttga accgtacaaa   1080

ttcatcgact cagaatttca gaactgctcg ttcctgcaca ataaaacggg ctgccagatt   1140

acctttgacg atgattactc cgcatactaa ggatcc                             1176
```

<210> SEQ ID NO 15
<211> LENGTH: 388
<212> TYPE: PRT
<213> ORGANISM: Artificial Sequence
<220> FEATURE:
<223> OTHER INFORMATION: fusion receptor protein GST-SV2C

<400> SEQUENCE: 15

```
Met Ser Pro Ile Leu Gly Tyr Trp Lys Ile Lys Gly Leu Val Gln Pro
1               5                   10                  15

Thr Arg Leu Leu Leu Glu Tyr Leu Glu Glu Lys Tyr Glu Glu His Leu
            20                  25                  30

Tyr Glu Arg Asp Glu Gly Asp Lys Trp Arg Asn Lys Lys Phe Glu Leu
        35                  40                  45

Gly Leu Glu Phe Pro Asn Leu Pro Tyr Tyr Ile Asp Gly Asp Val Lys
    50                  55                  60

Leu Thr Gln Ser Met Ala Ile Ile Arg Tyr Ile Ala Asp Lys His Asn
65                  70                  75                  80

Met Leu Gly Gly Cys Pro Lys Glu Arg Ala Glu Ile Ser Met Leu Glu
                85                  90                  95

Gly Ala Val Leu Asp Ile Arg Tyr Gly Val Ser Arg Ile Ala Tyr Ser
            100                 105                 110

Lys Asp Phe Glu Thr Leu Lys Val Asp Phe Leu Ser Lys Leu Pro Glu
        115                 120                 125

Met Leu Lys Met Phe Glu Asp Arg Leu Cys His Lys Thr Tyr Leu Asn
    130                 135                 140

Gly Asp His Val Thr His Pro Asp Phe Met Leu Tyr Asp Ala Leu Asp
145                 150                 155                 160

Val Val Leu Tyr Met Asp Pro Met Cys Leu Asp Ala Phe Pro Lys Leu
                165                 170                 175

Val Cys Phe Lys Lys Arg Ile Glu Ala Ile Pro Gln Ile Asp Lys Tyr
            180                 185                 190

Leu Lys Ser Ser Lys Tyr Ile Ala Trp Pro Leu Gln Gly Trp Gln Ala
        195                 200                 205

Thr Phe Gly Gly Gly Asp His Pro Pro Lys Ser Asp Gly Ser Thr Ser
    210                 215                 220

Gly Ser Gly Ser Ala Gly Leu Val Pro Arg Gly Ser Thr Ala Ile Gly
225                 230                 235                 240

Met Lys Glu Thr Ala Ala Ala Lys Phe Glu Arg Gln His Met Asp Ser
                245                 250                 255

Pro Asp Leu Gly Thr Phe Pro Asp Val Ile Lys His Leu Gln Ser Asp
            260                 265                 270

Glu Tyr Ala Leu Leu Thr Arg Asn Val Gln Lys Asp Lys Tyr Ala Asn
        275                 280                 285

Phe Ser Ile Asn Phe Thr Met Glu Asn Gln Ile His Thr Gly Met Glu
    290                 295                 300

Tyr Glu Asn Gly Arg Phe Leu Gly Val Lys Phe Lys Ser Val Thr Phe
305                 310                 315                 320

Lys Asp Ser Val Phe Lys Ser Cys Thr Phe Asp Asp Val Thr Ser Val
                325                 330                 335

Asn Thr Tyr Phe Lys Asn Cys Thr Phe Ile Asp Thr Leu Phe Asp Asn
            340                 345                 350

Thr Asp Phe Glu Pro Tyr Lys Phe Ile Asp Ser Glu Phe Gln Asn Cys
        355                 360                 365
```

```
Ser Phe Leu His Asn Lys Thr Gly Cys Gln Ile Thr Phe Asp Asp Asp
    370                 375                 380

Tyr Ser Ala Tyr
385


<210> SEQ ID NO 16
<211> LENGTH: 432
<212> TYPE: PRT
<213> ORGANISM: Clostridium botulinum

<400> SEQUENCE: 16

Ile Leu Asn Asn Ile Ile Leu Asn Leu Arg Tyr Lys Asp Asn Asn Leu
1               5                   10                  15

Ile Asp Leu Ser Gly Tyr Gly Ala Lys Val Glu Val Tyr Asp Gly Val
            20                  25                  30

Glu Leu Asn Asp Lys Asn Gln Phe Lys Leu Thr Ser Ser Ala Asn Ser
        35                  40                  45

Lys Ile Arg Val Thr Gln Asn Gln Asn Ile Ile Phe Asn Ser Val Phe
    50                  55                  60

Leu Asp Phe Ser Val Ser Phe Trp Ile Arg Ile Pro Lys Tyr Lys Asn
65                  70                  75                  80

Asp Gly Ile Gln Asn Tyr Ile His Asn Glu Tyr Thr Ile Ile Asn Cys
                85                  90                  95

Met Lys Asn Asn Ser Gly Trp Lys Ile Ser Ile Arg Gly Asn Arg Ile
            100                 105                 110

Ile Trp Thr Leu Ile Asp Ile Asn Gly Lys Thr Lys Ser Val Phe Phe
        115                 120                 125

Glu Tyr Asn Ile Arg Glu Asp Ile Ser Glu Tyr Ile Asn Arg Trp Phe
    130                 135                 140

Phe Val Thr Ile Thr Asn Asn Leu Asn Asn Ala Lys Ile Tyr Ile Asn
145                 150                 155                 160

Gly Lys Leu Glu Ser Asn Thr Asp Ile Lys Asp Ile Arg Glu Val Ile
                165                 170                 175

Ala Asn Gly Glu Ile Ile Phe Lys Leu Asp Gly Asp Ile Asp Arg Thr
            180                 185                 190

Gln Phe Ile Trp Met Lys Tyr Phe Ser Ile Phe Asn Thr Glu Leu Ser
        195                 200                 205

Gln Ser Asn Ile Glu Glu Arg Tyr Lys Ile Gln Ser Tyr Ser Glu Tyr
    210                 215                 220

Leu Lys Asp Phe Trp Gly Asn Pro Leu Met Tyr Asn Lys Glu Tyr Tyr
225                 230                 235                 240

Met Phe Asn Ala Gly Asn Lys Asn Ser Tyr Ile Lys Leu Lys Lys Asp
                245                 250                 255

Ser Pro Val Gly Glu Ile Leu Thr Arg Ser Lys Tyr Asn Gln Asn Ser
            260                 265                 270

Lys Tyr Ile Asn Tyr Arg Asp Leu Tyr Ile Gly Glu Lys Phe Ile Ile
        275                 280                 285

Arg Arg Lys Ser Asn Ser Gln Ser Ile Asn Asp Asp Ile Val Arg Lys
    290                 295                 300

Glu Asp Tyr Ile Tyr Leu Asp Phe Phe Asn Leu Asn Gln Glu Trp Arg
305                 310                 315                 320

Val Tyr Thr Tyr Lys Tyr Phe Lys Lys Glu Glu Glu Lys Leu Phe Leu
                325                 330                 335

Ala Pro Ile Ser Asp Ser Asp Glu Phe Tyr Asn Thr Ile Gln Ile Lys
```

```
            340                 345                 350

Glu Tyr Asp Glu Gln Pro Thr Tyr Ser Cys Gln Leu Leu Phe Lys Lys
        355                 360                 365

Asp Glu Glu Ser Thr Asp Glu Ile Gly Leu Ile Gly Ile His Arg Phe
    370                 375                 380

Tyr Glu Ser Gly Ile Val Phe Glu Glu Tyr Lys Asp Tyr Phe Cys Ile
385                 390                 395                 400

Ser Lys Trp Tyr Leu Lys Glu Val Lys Arg Lys Pro Tyr Asn Leu Lys
                405                 410                 415

Leu Gly Cys Asn Trp Gln Phe Ile Pro Lys Asp Glu Gly Trp Thr Glu
            420                 425                 430


<210> SEQ ID NO 17
<211> LENGTH: 1408
<212> TYPE: DNA
<213> ORGANISM: Clostridium botulinum

<400> SEQUENCE: 17

attttaaata atattatctt aaatttaaga tataaggata ataatttaat agatttatca     60

ggatatgggg caaaggtaga ggtatatgat ggagtcgagc ttaatgataa aaatcaattt    120

aaattaacta gttcagcaaa tagtaagatt agagtgactc aaaatcagaa tatcatattt    180

aatagtgtgt tccttgattt tagcgttagc ttttggataa gaatacctaa atataagaat    240

gatggtatac aaaattatat tcataatgaa tatacaataa ttaattgtat gaaaaataat    300

tcgggctgga aaatatctat taggggtaat aggataatat ggactttaat tgatataaat    360

ggaaaaacca aatcggtatt ttttgaatat aacataagag aagatatatc agagtatata    420

aatagatggt tttttgtaac tattactaat aatttgaata acgctaaaat ttatattaat    480

ggtaagctag aatcaaatac agatattaaa gatataagag aagttattgc taatggtgaa    540

ataatattta aattagatgg tgatatagat agaacacaat ttatttggat gaaatatttc    600

agtattttta atacggaatt aagtcaatca aatattgaag aaagatataa aattcaatca    660

tatagcgaat atttaaaaga tttttgggga aatcctttaa tgtacaataa agaatattat    720

atgtttaatg cggggaataa aaattcatat attaaactaa agaaagattc acctgtaggt    780

gaaattttaa cacgtagcaa atataatcaa aattctaaat atataaatta tagagattta    840

tatattggag aaaaatttat tataagaaga aagtcaaatt ctcaatctat aaatgatgat    900

atagttagaa aagaagatta tatatatcta gattttttta atttaaatca agagtggaga    960

gtatatacct ataaatattt taagaaagag gaagaaaaat tgtttttagc tcctataagt   1020

gattctgatg agttttacaa tactatacaa ataaaagaat atgatgaaca gccaacatat   1080

agttgtcagt tgctttttaa aaaagatgaa gaaagtactg atgagatagg attgattggt   1140

attcatcgtt tctacgaatc tggaattgta tttgaagagt ataaagatta tttttgtata   1200

agtaaatggt acttaaaaga ggtaaaaagg aaaccatata atttaaaatt gggatgtaat   1260

tggcagttta ttcctaaaga tgaagggtgg actgaataat ataactatat gctcagcaaa   1320

cctattttat ataagaaaag tttaagttta taaaatctta agtttaagga tgtagctaaa   1380

ttttgaatat tagataaact acatgttt                                      1408


<210> SEQ ID NO 18
<211> LENGTH: 449
<212> TYPE: PRT
<213> ORGANISM: Clostridium botulinum
```

<400> SEQUENCE: 18

```
Thr Ile Pro Phe Asn Ile Phe Ser Tyr Thr Asn Asn Ser Leu Leu Lys
1               5                   10                  15

Asp Ile Ile Asn Glu Tyr Phe Asn Asn Ile Asn Asp Ser Lys Ile Leu
            20                  25                  30

Ser Leu Gln Asn Arg Lys Asn Thr Leu Val Asp Thr Ser Gly Tyr Asn
        35                  40                  45

Ala Glu Val Ser Glu Glu Gly Asp Val Gln Leu Asn Pro Ile Phe Pro
    50                  55                  60

Phe Asp Phe Lys Leu Gly Ser Ser Gly Glu Asp Arg Gly Lys Val Ile
65                  70                  75                  80

Val Thr Gln Asn Glu Asn Ile Val Tyr Asn Ser Met Tyr Glu Ser Phe
                85                  90                  95

Ser Ile Ser Phe Trp Ile Arg Ile Asn Lys Trp Val Ser Asn Leu Pro
            100                 105                 110

Gly Tyr Thr Ile Ile Asp Ser Val Lys Asn Asn Ser Gly Trp Ser Ile
        115                 120                 125

Gly Ile Ile Ser Asn Phe Leu Val Phe Thr Leu Lys Gln Asn Glu Asp
    130                 135                 140

Ser Glu Gln Ser Ile Asn Phe Ser Tyr Asp Ile Ser Asn Asn Ala Pro
145                 150                 155                 160

Gly Tyr Asn Lys Trp Phe Phe Val Thr Val Thr Asn Asn Met Met Gly
                165                 170                 175

Asn Met Lys Ile Tyr Ile Asn Gly Lys Leu Ile Asp Thr Ile Lys Val
            180                 185                 190

Lys Glu Leu Thr Gly Ile Asn Phe Ser Lys Thr Ile Thr Phe Glu Ile
        195                 200                 205

Asn Lys Ile Pro Asp Thr Gly Leu Ile Thr Ser Asp Ser Asp Asn Ile
    210                 215                 220

Asn Met Trp Ile Arg Asp Phe Tyr Ile Phe Ala Lys Glu Leu Asp Gly
225                 230                 235                 240

Lys Asp Ile Asn Ile Leu Phe Asn Ser Leu Gln Tyr Thr Asn Val Val
                245                 250                 255

Lys Asp Tyr Trp Gly Asn Asp Leu Arg Tyr Asn Lys Glu Tyr Tyr Met
            260                 265                 270

Val Asn Ile Asp Tyr Leu Asn Arg Tyr Met Tyr Ala Asn Ser Arg Gln
        275                 280                 285

Ile Val Phe Asn Thr Arg Arg Asn Asn Asn Asp Phe Asn Glu Gly Tyr
    290                 295                 300

Lys Ile Ile Ile Lys Arg Ile Arg Gly Asn Thr Asn Asp Thr Arg Val
305                 310                 315                 320

Arg Gly Gly Asp Ile Leu Tyr Phe Asp Met Thr Ile Asn Asn Lys Ala
                325                 330                 335

Tyr Asn Leu Phe Met Lys Asn Glu Thr Met Tyr Ala Asp Asn His Ser
            340                 345                 350

Thr Glu Asp Ile Tyr Ala Ile Gly Leu Arg Glu Gln Thr Lys Asp Ile
        355                 360                 365

Asn Asp Asn Ile Ile Phe Gln Ile Gln Pro Met Asn Asn Thr Tyr Tyr
    370                 375                 380

Tyr Ala Ser Gln Ile Phe Lys Ser Asn Phe Asn Gly Glu Asn Ile Ser
385                 390                 395                 400

Gly Ile Cys Ser Ile Gly Thr Tyr Arg Phe Arg Leu Gly Gly Asp Trp
                405                 410                 415
```

Tyr Arg His Asn Tyr Leu Val Pro Thr Val Lys Gln Gly Asn Tyr Ala
420 425 430

Ser Leu Leu Glu Ser Thr Ser Thr His Trp Gly Phe Val Pro Val Ser
435 440 445

Glu

<210> SEQ ID NO 19
<211> LENGTH: 1347
<212> TYPE: DNA
<213> ORGANISM: Clostridium botulinum

<400> SEQUENCE: 19
acaataccct ttaatatttt ttcatatact aataattctt tattaaaaga tataattaat 60
gaatatttca ataatattaa tgattcaaaa attttgagcc tacaaaacag aaaaaatact 120
ttagtggata catcaggata taatgcagaa gtgagtgaag aaggcgatgt tcagcttaat 180
ccaatatttc catttgactt taaattaggt agttcagggg aggatagagg taaagttata 240
gtaacccaga atgaaaatat tgtatataat tctatgtatg aaagttttag cattagtttt 300
tggattagaa taaataaatg ggtaagtaat ttacctggat atactataat tgatagtgtt 360
aaaaataact caggttggag tataggtatt attagtaatt ttttagtatt tactttaaaa 420
caaaatgaag atagtgaaca aagtataaat tttagttatg atatatcaaa taatgctcct 480
ggatacaata aatggttttt tgtaactgtt actaacaata tgatgggaaa tatgaagatt 540
tatataaatg gaaaattaat agatactata aaagttaaag aactaactgg aattaatttt 600
agcaaaacta taacatttga aataaataaa attccagata ccggtttgat tacttcagat 660
tctgataaca tcaatatgtg gataagagat ttttatatat ttgctaaaga attagatggt 720
aaagatatta atatattatt taatagcttg caatatacta atgttgtaaa agattattgg 780
ggaaatgatt taagatataa taaagaatat tatatggtta atatagatta tttaaataga 840
tatatgtatg cgaactcacg acaaattgtt tttaatacac gtagaaataa taatgacttc 900
aatgaaggat ataaaattat aataaaaaga atcagaggaa atacaaatga tactagagta 960
cgaggaggag atattttata ttttgatatg acaattaata acaaagcata taatttgttt 1020
atgaagaatg aaactatgta tgcagataat catagtactg aagatatata tgctataggt 1080
ttaagagaac aaacaaagga tataaatgat aatattatat ttcaaataca accaatgaat 1140
aatacttatt attacgcatc tcaaatattt aaatcaaatt ttaatggaga aaatatttct 1200
ggaatatgtt caataggtac ttatcgtttt agacttggag gtgattggta tagacacaat 1260
tatttggtgc ctactgtgaa gcaaggaaat tatgcttcat tattagaatc aacatcaact 1320
cattggggtt ttgtacctgt aagtgaa 1347

<210> SEQ ID NO 20
<211> LENGTH: 416
<212> TYPE: PRT
<213> ORGANISM: Clostridium botulinum

<400> SEQUENCE: 20

Phe Asn Ser Ile Asn Asp Ser Lys Ile Leu Ser Leu Gln Asn Lys Lys
1 5 10 15

Asn Ala Leu Val Asp Thr Ser Gly Tyr Asn Ala Glu Val Arg Val Gly
20 25 30

Asp Asn Val Gln Leu Asn Thr Ile Tyr Thr Asn Asp Phe Lys Leu Ser
35 40 45

```
Ser Ser Gly Asp Lys Ile Ile Val Asn Leu Asn Asn Asn Ile Leu Tyr
    50                  55                  60

Ser Ala Ile Tyr Glu Asn Ser Ser Val Ser Phe Trp Ile Lys Ile Ser
65                  70                  75                  80

Lys Asp Leu Thr Asn Ser His Asn Glu Tyr Thr Ile Ile Asn Ser Ile
                85                  90                  95

Glu Gln Asn Ser Gly Trp Lys Leu Cys Ile Arg Asn Gly Asn Ile Glu
            100                 105                 110

Trp Ile Leu Gln Asp Val Asn Arg Lys Tyr Lys Ser Leu Ile Phe Asp
        115                 120                 125

Tyr Ser Glu Ser Leu Ser His Thr Gly Tyr Thr Asn Lys Trp Phe Phe
    130                 135                 140

Val Thr Ile Thr Asn Asn Ile Met Gly Tyr Met Lys Leu Tyr Ile Asn
145                 150                 155                 160

Gly Glu Leu Lys Gln Ser Gln Lys Ile Glu Asp Leu Asp Glu Val Lys
                165                 170                 175

Leu Asp Lys Thr Ile Val Phe Gly Ile Asp Glu Asn Ile Asp Glu Asn
            180                 185                 190

Gln Met Leu Trp Ile Arg Asp Phe Asn Ile Phe Ser Lys Glu Leu Ser
        195                 200                 205

Asn Glu Asp Ile Asn Ile Val Tyr Glu Gly Gln Ile Leu Arg Asn Val
    210                 215                 220

Ile Lys Asp Tyr Trp Gly Asn Pro Leu Lys Phe Asp Thr Glu Tyr Tyr
225                 230                 235                 240

Ile Ile Asn Asp Asn Tyr Ile Asp Arg Tyr Ile Ala Pro Glu Ser Asn
                245                 250                 255

Val Leu Val Leu Val Gln Tyr Pro Asp Arg Ser Lys Leu Tyr Thr Gly
            260                 265                 270

Asn Pro Ile Thr Ile Lys Ser Val Ser Asp Lys Asn Pro Tyr Ser Arg
        275                 280                 285

Ile Leu Asn Gly Asp Asn Ile Ile Leu His Met Leu Tyr Asn Ser Arg
    290                 295                 300

Lys Tyr Met Ile Ile Arg Asp Thr Asp Thr Ile Tyr Ala Thr Gln Gly
305                 310                 315                 320

Gly Glu Cys Ser Gln Asn Cys Val Tyr Ala Leu Lys Leu Gln Ser Asn
                325                 330                 335

Leu Gly Asn Tyr Gly Ile Gly Ile Phe Ser Ile Lys Asn Ile Val Ser
            340                 345                 350

Lys Asn Lys Tyr Cys Ser Gln Ile Phe Ser Ser Phe Arg Glu Asn Thr
        355                 360                 365

Met Leu Leu Ala Asp Ile Tyr Lys Pro Trp Arg Phe Ser Phe Lys Asn
    370                 375                 380

Ala Tyr Thr Pro Val Ala Val Thr Asn Tyr Glu Thr Lys Leu Leu Ser
385                 390                 395                 400

Thr Ser Ser Phe Trp Lys Phe Ile Ser Arg Asp Pro Gly Trp Val Glu
                405                 410                 415
```

<210> SEQ ID NO 21
<211> LENGTH: 1248
<212> TYPE: DNA
<213> ORGANISM: Clostridium botulinum

<400> SEQUENCE: 21

```
ttcaatagta ttaatgattc aaaaattttg agcttacaaa acaaaaaaaa tgctttagtg     60
```

```
gatacatcag gatataatgc agaagtgagg gtaggagata atgttcaact taatacgata    120

tatacaaatg actttaaatt aagtagttca ggagataaaa ttatagtaaa tttaaataat    180

aatattttat atagcgctat ttatgagaac tctagtgtta gtttttggat taagatatct    240

aaagatttaa ctaattctca taatgaatat acaataatta acagtataga acaaaattct    300

gggtggaaat tatgtattag gaatggcaat atagaatgga ttttacaaga tgttaataga    360

aagtataaaa gtttaatttt tgattatagt gaatcattaa gtcatacagg atatacaaat    420

aaatggtttt ttgttactat aactaataat ataatggggt atatgaaact ttatataaat    480

ggagaattaa agcagagtca aaaaattgaa gatttagatg aggttaagtt agataaaacc    540

atagtatttg gaatagatga gaatatagat gagaatcaga tgctttggat tagagatttt    600

aatatttttt ctaaagaatt aagtaatgaa gatattaata ttgtatatga gggacaaata    660

ttaagaaatg ttattaaaga ttattgggga aatcctttga agtttgatac agaatattat    720

attattaatg ataattatat agataggtat atagcacctg aaagtaatgt acttgtactt    780

gttcagtatc cagatagatc taaattatat actggaaatc ctattactat taaatcagta    840

tctgataaga atccttatag tagaatttta aatggagata atataattct tcatatgtta    900

tataatagta ggaaatatat gataataaga gatactgata caatatatgc aacacaagga    960

ggagagtgtt cacaaaattg tgtatatgca ttaaaattac agagtaattt aggtaattat   1020

ggtataggta tatttagtat aaaaaatatt gtatctaaaa ataaatattg tagtcaaatt   1080

ttctctagtt ttagggaaaa tacaatgctt ctagcagata tatataaacc ttggagattt   1140

tcttttaaaa atgcatacac gccagttgca gtaactaatt atgaaacaaa actattatca   1200

acttcatctt tttggaaatt tatttctagg gatccaggat gggtagag                 1248
```

```
<210> SEQ ID NO 22
<211> LENGTH: 408
<212> TYPE: PRT
<213> ORGANISM: Clostridium botulinum

<400> SEQUENCE: 22

Lys Arg Ile Lys Ser Ser Ser Val Leu Asn Met Arg Tyr Lys Asn Asp
1               5                   10                  15

Lys Tyr Val Asp Thr Ser Gly Tyr Asp Ser Asn Ile Asn Ile Asn Gly
            20                  25                  30

Asp Val Tyr Lys Tyr Pro Thr Asn Lys Asn Gln Phe Gly Ile Tyr Asn
        35                  40                  45

Asp Lys Leu Ser Glu Val Asn Ile Ser Gln Asn Asp Tyr Ile Ile Tyr
    50                  55                  60

Asp Asn Lys Tyr Lys Asn Phe Ser Ile Ser Phe Trp Val Arg Ile Pro
65                  70                  75                  80

Asn Tyr Asp Asn Lys Ile Val Asn Val Asn Asn Glu Tyr Thr Ile Ile
                85                  90                  95

Asn Cys Met Arg Asp Asn Asn Ser Gly Trp Lys Val Ser Leu Asn His
            100                 105                 110

Asn Glu Ile Ile Trp Thr Leu Gln Asp Asn Ala Gly Ile Asn Gln Lys
        115                 120                 125

Leu Ala Phe Asn Tyr Gly Asn Ala Asn Gly Ile Ser Asp Tyr Ile Asn
    130                 135                 140

Lys Trp Ile Phe Val Thr Ile Thr Asn Asp Arg Leu Gly Asp Ser Lys
145                 150                 155                 160
```

```
Leu Tyr Ile Asn Gly Asn Leu Ile Asp Gln Lys Ser Ile Leu Asn Leu
                165                 170                 175

Gly Asn Ile His Val Ser Asp Asn Ile Leu Phe Lys Ile Val Asn Cys
            180                 185                 190

Ser Tyr Thr Arg Tyr Ile Gly Ile Arg Tyr Phe Asn Ile Phe Asp Lys
        195                 200                 205

Glu Leu Asp Glu Thr Glu Ile Gln Thr Leu Tyr Ser Asn Glu Pro Asn
    210                 215                 220

Thr Asn Ile Leu Lys Asp Phe Trp Gly Asn Tyr Leu Leu Tyr Asp Lys
225                 230                 235                 240

Glu Tyr Tyr Leu Leu Asn Val Leu Lys Pro Asn Asn Phe Ile Asp Arg
                245                 250                 255

Arg Lys Asp Ser Thr Leu Ser Ile Asn Asn Ile Arg Ser Thr Ile Leu
            260                 265                 270

Leu Ala Asn Arg Leu Tyr Ser Gly Ile Lys Val Lys Ile Gln Arg Val
        275                 280                 285

Asn Asn Ser Ser Thr Asn Asp Asn Leu Val Arg Lys Asn Asp Gln Val
    290                 295                 300

Tyr Ile Asn Phe Val Ala Ser Lys Thr His Leu Phe Pro Leu Tyr Ala
305                 310                 315                 320

Asp Thr Ala Thr Thr Asn Lys Glu Lys Thr Ile Lys Ile Ser Ser Ser
                325                 330                 335

Gly Asn Arg Phe Asn Gln Val Val Val Met Asn Ser Val Gly Asn Asn
            340                 345                 350

Cys Thr Met Asn Phe Lys Asn Asn Asn Gly Asn Asn Ile Gly Leu Leu
        355                 360                 365

Gly Phe Lys Ala Asp Thr Val Val Ala Ser Thr Trp Tyr Tyr Thr His
    370                 375                 380

Met Arg Asp His Thr Asn Ser Asn Gly Cys Phe Trp Asn Phe Ile Ser
385                 390                 395                 400

Glu Glu His Gly Trp Gln Glu Lys
                405
```

<210> SEQ ID NO 23
<211> LENGTH: 1271
<212> TYPE: DNA
<213> ORGANISM: Clostridium botulinum

<400> SEQUENCE: 23

```
aagagaatta aaagtagttc agttttaaat atgagatata aaaatgataa atacgtagat      60

acttcaggat atgattcaaa tataaatatt aatggagatg tatataaata tccaactaat     120

aaaaatcaat ttggaatata taatgataaa cttagtgaag ttaatatatc tcaaaatgat     180

tacattatat atgataataa atataaaaat tttagtatta gtttttgggt aagaattcct     240

aactatgata ataagatagt aaatgttaat aatgaataca ctataataaa ttgtatgaga     300

gataataatt caggatggaa agtatctctt aatcataatg aaataatttg gacattgcaa     360

gataatgcag gaattaatca aaaattagca tttaactatg gtaacgcaaa tggtatttct     420

gattatataa ataagtggat ttttgtaact ataactaatg atagattagg agattctaaa     480

ctttatatta atggaaattt aatagatcaa aaatcaattt taaatttagg taatattcat     540

gttagtgaca atatattatt taaaatagtt aattgtagtt atacaagata tattggtatt     600

agatatttta atatttttga taaagaatta gatgaaacag aaattcaaac tttatatagc     660

aatgaaccta atacaaatat tttgaaggat ttttggggaa attatttgct ttatgacaaa     720
```

gaatactatt tattaaatgt gttaaaacca aataacttta ttgataggag aaaagattct 780
actttaagca ttaataatat aagaagcact attcttttag ctaatagatt atatagtgga 840
ataaaagtta aaatacaaag agttaatact agtagtacta acgataatct tgttagaaag 900
aatgatcagg tatatattaa ttttgtagcc agcaaaactc acttatttcc attatatgct 960
gatacagcta ccacaaataa agagaaaaca ataaaaatat catcatctgg caatagattt 1020
aatcaagtag tagttatgaa ttcagtagga aataattgta caatgaattt taaaaataat 1080
aatggaaata atattgggtt gttaggtttc aaggcagata ctgtagttgc tagtacttgg 1140
tattatacac atatgagaga tcatacaaac agcaatggat gtttttggaa ctttatttct 1200
gaagaacatg gatggcaaga aaaataaaaa ttagattaaa cggctaaagt cataaattcc 1260
aaaggactta g 1271

<210> SEQ ID NO 24
<211> LENGTH: 419
<212> TYPE: PRT
<213> ORGANISM: Clostridium botulinum

<400> SEQUENCE: 24

Asn Lys Leu Tyr Lys Lys Ile Lys Asp Asn Ser Ile Leu Asp Met Arg
1               5                   10                  15

Tyr Glu Asn Asn Lys Phe Ile Asp Ile Ser Gly Tyr Gly Ser Asn Ile
            20                  25                  30

Ser Ile Asn Gly Asp Val Tyr Ile Tyr Ser Thr Asn Arg Asn Gln Phe
        35                  40                  45

Gly Ile Tyr Ser Ser Lys Pro Ser Glu Val Asn Ile Ala Gln Asn Asn
    50                  55                  60

Asp Ile Ile Tyr Asn Gly Arg Tyr Gln Asn Phe Ser Ile Ser Phe Trp
65                  70                  75                  80

Val Arg Ile Pro Lys Tyr Phe Asn Lys Val Asn Leu Asn Asn Glu Tyr
                85                  90                  95

Thr Ile Ile Asp Cys Ile Arg Asn Asn Asn Ser Gly Trp Lys Ile Ser
            100                 105                 110

Leu Asn Tyr Asn Lys Ile Ile Trp Thr Leu Gln Asp Thr Ala Gly Asn
        115                 120                 125

Asn Gln Lys Leu Val Phe Asn Tyr Thr Gln Met Ile Ser Ile Ser Asp
    130                 135                 140

Tyr Ile Asn Lys Trp Ile Phe Val Thr Ile Thr Asn Asn Arg Leu Gly
145                 150                 155                 160

Asn Ser Arg Ile Tyr Ile Asn Gly Asn Leu Ile Asp Glu Lys Ser Ile
                165                 170                 175

Ser Asn Leu Gly Asp Ile His Val Ser Asp Asn Ile Leu Phe Lys Ile
            180                 185                 190

Val Gly Cys Asn Asp Thr Arg Tyr Val Gly Ile Arg Tyr Phe Lys Val
        195                 200                 205

Phe Asp Thr Glu Leu Gly Lys Thr Glu Ile Glu Thr Leu Tyr Ser Asp
    210                 215                 220

Glu Pro Asp Pro Ser Ile Leu Lys Asp Phe Trp Gly Asn Tyr Leu Leu
225                 230                 235                 240

Tyr Asn Lys Arg Tyr Tyr Leu Leu Asn Leu Leu Arg Thr Asp Lys Ser
                245                 250                 255

Ile Thr Gln Asn Ser Asn Phe Leu Asn Ile Asn Gln Gln Arg Gly Val
            260                 265                 270

```
Tyr Gln Lys Pro Asn Ile Phe Ser Asn Thr Arg Leu Tyr Thr Gly Val
        275                 280                 285

Glu Val Ile Ile Arg Lys Asn Gly Ser Thr Asp Ile Ser Asn Thr Asp
    290                 295                 300

Asn Phe Val Arg Lys Asn Asp Leu Ala Tyr Ile Asn Val Val Asp Arg
305                 310                 315                 320

Asp Val Glu Tyr Arg Leu Tyr Ala Asp Ile Ser Ile Ala Lys Pro Glu
                325                 330                 335

Lys Ile Ile Lys Leu Ile Arg Thr Ser Asn Ser Asn Asn Ser Leu Gly
            340                 345                 350

Gln Ile Ile Val Met Asp Ser Ile Gly Asn Asn Cys Thr Met Asn Phe
        355                 360                 365

Gln Asn Asn Asn Gly Gly Asn Ile Gly Leu Leu Gly Phe His Ser Asn
    370                 375                 380

Asn Leu Val Ala Ser Ser Trp Tyr Tyr Asn Asn Ile Arg Lys Asn Thr
385                 390                 395                 400

Ser Ser Asn Gly Cys Phe Trp Ser Phe Ile Ser Lys Glu His Gly Trp
                405                 410                 415

Gln Glu Asn


<210> SEQ ID NO 25
<211> LENGTH: 1257
<212> TYPE: DNA
<213> ORGANISM: Clostridium botulinum

<400> SEQUENCE: 25

aataaattat ataaaaaaat taaagataac tctattttag atatgcgata tgaaaataat      60

aaatttatag atatctctgg atatggttca aatataagca ttaatggaga tgtatatatt     120

tattcaacaa atagaaatca atttggaata tatagtagta agcctagtga agttaatata     180

gctcaaaata atgatattat atacaatggt agatatcaaa attttagtat tagtttctgg     240

gtaaggattc ctaaatactt caataaagtg aatcttaata atgaatatac tataatagat     300

tgtataagga ataataattc aggatggaaa atatcactta attataataa aataatttgg     360

actttacaag atactgctgg aaataatcaa aaactagttt ttaattatac acaaatgatt     420

agtatatctg attatataaa taaatggatt tttgtaacta ttactaataa tagattaggc     480

aattctagaa tttacatcaa tggaaattta atagatgaaa aatcaatttc gaatttaggt     540

gatattcatg ttagtgataa tatattattt aaaattgttg gttgtaatga tacaagatat     600

gttggtataa gatattttaa agtttttgat acggaattag gtaaaacaga aattgagact     660

ttatatagtg atgagccaga tccaagtatc ttaaaagact tttggggaaa ttatttgtta     720

tataataaaa gatattattt attgaattta ctaagaacag ataagtctat tactcagaat     780

tcaaactttc taaatattaa tcaacaaaga ggtgtttatc agaaaccaaa tatttttttcc    840

aacactagat tatatacagg agtagaagtt attataagaa aaaatggatc tacagatata     900

tctaatacag ataattttgt tagaaaaaat gatctggcat atattaatgt agtagatcgt     960

gatgtagaat atcggctata tgctgatata tcaattgcaa aaccagagaa aataataaaa    1020

ttaataagaa catctaattc aaacaatagc ttaggtcaaa ttatagttat ggattcaata    1080

ggaaataatt gcacaatgaa ttttcaaaac aataatgggg gcaatatagg attactaggt    1140

tttcattcaa ataatttggt tgctagtagt tggtattata acaatatacg aaaaaatact    1200

agcagtaatg gatgcttttg gagttttatt tctaaagagc atggatggca agaaaac       1257
```

```
<210> SEQ ID NO 26
<211> LENGTH: 438
<212> TYPE: PRT
<213> ORGANISM: Clostridium botulinum

<400> SEQUENCE: 26

Asn Tyr Ile Ser Asn Ile Ser Ser Asn Ala Ile Leu Ser Leu Ser Tyr
1               5                   10                  15

Arg Gly Gly Arg Leu Ile Asp Ser Ser Gly Tyr Gly Ala Thr Met Asn
            20                  25                  30

Val Gly Ser Asp Val Ile Phe Asn Asp Ile Gly Asn Gly Gln Phe Lys
        35                  40                  45

Leu Asn Asn Ser Glu Asn Ser Asn Ile Thr Ala His Gln Ser Lys Phe
    50                  55                  60

Val Val Tyr Asp Ser Met Phe Asp Asn Phe Ser Ile Asn Phe Trp Val
65                  70                  75                  80

Arg Thr Pro Lys Tyr Asn Asn Asn Asp Ile Gln Thr Tyr Leu Gln Asn
                85                  90                  95

Glu Tyr Thr Ile Ile Ser Cys Ile Lys Asn Asp Ser Gly Trp Lys Val
            100                 105                 110

Ser Ile Lys Gly Asn Arg Ile Ile Trp Thr Leu Ile Asp Val Asn Ala
        115                 120                 125

Lys Ser Lys Ser Ile Phe Phe Glu Tyr Ser Ile Lys Asp Asn Ile Ser
    130                 135                 140

Asp Tyr Ile Asn Lys Trp Phe Ser Ile Thr Ile Thr Asn Asp Arg Leu
145                 150                 155                 160

Gly Asn Ala Asn Ile Tyr Ile Asn Gly Ser Leu Lys Lys Ser Glu Lys
                165                 170                 175

Ile Leu Asn Leu Asp Arg Ile Asn Ser Ser Asn Asp Ile Asp Phe Lys
            180                 185                 190

Leu Ile Asn Cys Thr Asp Thr Thr Lys Phe Val Trp Ile Lys Asp Phe
        195                 200                 205

Asn Ile Phe Gly Arg Glu Leu Asn Ala Thr Glu Val Ser Ser Leu Tyr
    210                 215                 220

Trp Ile Gln Ser Ser Thr Asn Thr Leu Lys Asp Phe Trp Gly Asn Pro
225                 230                 235                 240

Leu Arg Tyr Asp Thr Gln Tyr Tyr Leu Phe Asn Gln Gly Met Gln Asn
                245                 250                 255

Ile Tyr Ile Lys Tyr Phe Ser Lys Ala Ser Met Gly Glu Thr Ala Pro
            260                 265                 270

Arg Thr Asn Phe Asn Asn Ala Ala Ile Asn Tyr Gln Asn Leu Tyr Leu
        275                 280                 285

Gly Leu Arg Phe Ile Ile Lys Lys Ala Ser Asn Ser Arg Asn Ile Asn
    290                 295                 300

Asn Asp Asn Ile Val Arg Glu Gly Asp Tyr Ile Tyr Leu Asn Ile Asp
305                 310                 315                 320

Asn Ile Ser Asp Glu Ser Tyr Arg Val Tyr Val Leu Val Asn Ser Lys
                325                 330                 335

Glu Ile Gln Thr Gln Leu Phe Leu Ala Pro Ile Asn Asp Asp Pro Thr
            340                 345                 350

Phe Tyr Asp Val Leu Gln Ile Lys Lys Tyr Tyr Glu Lys Thr Thr Tyr
        355                 360                 365

Asn Cys Gln Ile Leu Cys Glu Lys Asp Thr Lys Thr Phe Gly Leu Phe
```

370 375 380

Gly Ile Gly Lys Phe Val Lys Asp Tyr Gly Tyr Val Trp Asp Thr Tyr
385 390 395 400

Asp Asn Tyr Phe Cys Ile Ser Gln Trp Tyr Leu Arg Arg Ile Ser Glu
405 410 415

Asn Ile Asn Lys Leu Arg Leu Gly Cys Asn Trp Gln Phe Ile Pro Val
420 425 430

Asp Glu Gly Trp Thr Glu
435

<210> SEQ ID NO 27
<211> LENGTH: 1314
<212> TYPE: DNA
<213> ORGANISM: Clostridium botulinum

<400> SEQUENCE: 27
aattatatta gtaatattag tagtaatgct attttaagtt taagttatag aggtgggcgt 60
ttaatagatt catctggata tggtgcaact atgaatgtag gttcagatgt tatctttaat 120
gatataggaa atggtcaatt taaattaaat aattctgaaa atagtaatat tacggcacat 180
caaagtaaat tcgttgtata tgatagtatg tttgataatt ttagcattaa cttttgggta 240
aggactccta aatataataa taatgatata caaacttatc ttcaaaatga gtatacaata 300
attagttgta taaaaaatga ctcaggatgg aaagtatcta ttaagggaaa tagaataata 360
tggacattaa tagatgttaa tgcaaaatct aaatcaatat ttttcgaata tagtataaaa 420
gataatatat cagattatat aaataaatgg ttttccataa ctattactaa tgatagatta 480
ggtaacgcaa atatttatat aaatggaagt ttgaaaaaaa gtgaaaaaat tttaaactta 540
gatagaatta attctagtaa tgatatagac ttcaaattaa ttaattgtac agatactact 600
aaatttgttt ggattaagga ttttaatatt tttggtagag aattaaatgc tacagaagta 660
tcttcactat attggattca atcatctaca aatactttaa aagatttttg ggggaatcct 720
ttaagatacg atacacaata ctatctgttt aatcaaggta tgcaaaatat ctatataaag 780
tattttagta aagcttctat gggggaaact gcaccacgta caaactttaa taatgcagca 840
ataaattatc aaaatttata tcttggttta cgatttatta taaaaaaagc atcaaattct 900
cggaatataa ataatgataa tatagtcaga gaaggagatt atatatatct taatattgat 960
aatatttctg atgaatctta cagagtatat gttttggtga attctaaaga aattcaaact 1020
caattatttt tagcacccat aaatgatgat cctacgttct atgatgtact acaaataaaa 1080
aaatattatg aaaaaacaac atataattgt cagatacttt gcgaaaaaga tactaaaaca 1140
tttgggctgt ttggaattgg taaatttgtt aaagattatg gatatgtttg ggatacctat 1200
gataattatt tttgcataag tcagtggtat ctcagaagaa tatctgaaaa tataaataaa 1260
ttaaggttgg gatgtaattg gcaattcatt cccgtggatg aaggatggac agaa 1314

<210> SEQ ID NO 28
<211> LENGTH: 742
<212> TYPE: PRT
<213> ORGANISM: Mus musculus

<400> SEQUENCE: 28

Met Glu Glu Gly Phe Arg Asp Arg Ala Ala Phe Ile Arg Gly Ala Lys
1 5 10 15

Asp Ile Ala Lys Glu Val Lys Lys His Ala Ala Lys Lys Val Val Lys
20 25 30

```
Gly Leu Asp Arg Val Gln Asp Glu Tyr Ser Arg Arg Ser Tyr Ser Arg
        35                  40                  45

Phe Glu Glu Glu Asp Asp Asp Asp Asp Phe Pro Ala Pro Ala Asp Gly
    50                  55                  60

Tyr Tyr Arg Gly Glu Gly Ala Gln Asp Glu Glu Glu Gly Gly Ala Ser
65                  70                  75                  80

Ser Asp Ala Thr Glu Gly His Asp Glu Asp Asp Glu Ile Tyr Glu Gly
                85                  90                  95

Glu Tyr Gln Gly Ile Pro Arg Ala Glu Ser Gly Gly Lys Gly Glu Arg
            100                 105                 110

Met Ala Asp Gly Ala Pro Leu Ala Gly Val Arg Gly Gly Leu Ser Asp
        115                 120                 125

Gly Glu Gly Pro Pro Gly Gly Arg Gly Glu Ala Gln Arg Arg Lys Asp
    130                 135                 140

Arg Glu Glu Leu Ala Gln Gln Tyr Glu Thr Ile Leu Arg Glu Cys Gly
145                 150                 155                 160

His Gly Arg Phe Gln Trp Thr Leu Tyr Phe Val Leu Gly Leu Ala Leu
                165                 170                 175

Met Ala Asp Gly Val Glu Val Phe Val Val Gly Phe Val Leu Pro Ser
            180                 185                 190

Ala Glu Lys Asp Met Cys Leu Ser Asp Ser Asn Lys Gly Met Leu Gly
        195                 200                 205

Leu Ile Val Tyr Leu Gly Met Met Val Gly Ala Phe Leu Trp Gly Gly
    210                 215                 220

Leu Ala Asp Arg Leu Gly Arg Arg Gln Cys Leu Leu Ile Ser Leu Ser
225                 230                 235                 240

Val Asn Ser Val Phe Ala Phe Phe Ser Ser Phe Val Gln Gly Tyr Gly
                245                 250                 255

Thr Phe Leu Phe Cys Arg Leu Leu Ser Gly Val Gly Ile Gly Gly Ser
            260                 265                 270

Ile Pro Ile Val Phe Ser Tyr Phe Ser Glu Phe Leu Ala Gln Glu Lys
        275                 280                 285

Arg Gly Glu His Leu Ser Trp Leu Cys Met Phe Trp Met Ile Gly Gly
    290                 295                 300

Val Tyr Ala Ala Ala Met Ala Trp Ala Ile Ile Pro His Tyr Gly Trp
305                 310                 315                 320

Ser Phe Gln Met Gly Ser Ala Tyr Gln Phe His Ser Trp Arg Val Phe
                325                 330                 335

Val Leu Val Cys Ala Phe Pro Ser Val Phe Ala Ile Gly Ala Leu Thr
            340                 345                 350

Thr Gln Pro Glu Ser Pro Arg Phe Phe Leu Glu Asn Gly Lys His Asp
        355                 360                 365

Glu Ala Trp Met Val Leu Lys Gln Val His Asp Thr Asn Met Arg Ala
    370                 375                 380

Lys Gly His Pro Glu Arg Val Phe Ser Val Thr His Ile Lys Thr Ile
385                 390                 395                 400

His Gln Glu Asp Glu Leu Ile Glu Ile Gln Ser Asp Thr Gly Thr Trp
                405                 410                 415

Tyr Gln Arg Trp Gly Val Arg Ala Leu Ser Leu Gly Gly Gln Val Trp
            420                 425                 430

Gly Asn Phe Leu Ser Cys Phe Ser Pro Glu Tyr Arg Arg Ile Thr Leu
        435                 440                 445
```

```
Met Met Met Gly Val Trp Phe Thr Met Ser Phe Ser Tyr Tyr Gly Leu
    450                 455                 460

Thr Val Trp Phe Pro Asp Met Ile Arg His Leu Gln Ala Val Asp Tyr
465                 470                 475                 480

Ala Ala Arg Thr Lys Val Phe Pro Gly Glu Arg Val Glu His Val Thr
                485                 490                 495

Phe Asn Phe Thr Leu Glu Asn Gln Ile His Arg Gly Gly Gln Tyr Phe
            500                 505                 510

Asn Asp Lys Phe Ile Gly Leu Arg Leu Lys Ser Val Ser Phe Glu Asp
        515                 520                 525

Ser Leu Phe Glu Glu Cys Tyr Phe Glu Asp Val Thr Ser Ser Asn Thr
    530                 535                 540

Phe Phe Arg Asn Cys Thr Phe Ile Asn Thr Val Phe Tyr Asn Thr Asp
545                 550                 555                 560

Leu Phe Glu Tyr Lys Phe Val Asn Ser Arg Leu Val Asn Ser Thr Phe
                565                 570                 575

Leu His Asn Lys Glu Gly Cys Pro Leu Asp Val Thr Gly Thr Gly Glu
            580                 585                 590

Gly Ala Tyr Met Val Tyr Phe Val Ser Phe Leu Gly Thr Leu Ala Val
        595                 600                 605

Leu Pro Gly Asn Ile Val Ser Ala Leu Leu Met Asp Lys Ile Gly Arg
    610                 615                 620

Leu Arg Met Leu Ala Gly Ser Ser Val Leu Ser Cys Val Ser Cys Phe
625                 630                 635                 640

Phe Leu Ser Phe Gly Asn Ser Glu Ser Ala Met Ile Ala Leu Leu Cys
                645                 650                 655

Leu Phe Gly Gly Val Ser Ile Ala Ser Trp Asn Ala Leu Asp Val Leu
            660                 665                 670

Thr Val Glu Leu Tyr Pro Ser Asp Lys Arg Thr Thr Ala Phe Gly Phe
        675                 680                 685

Leu Asn Ala Leu Cys Lys Leu Ala Ala Val Leu Gly Ile Ser Ile Phe
    690                 695                 700

Thr Ser Phe Val Gly Ile Thr Lys Ala Ala Pro Ile Leu Phe Ala Ser
705                 710                 715                 720

Ala Ala Leu Ala Leu Gly Ser Ser Leu Ala Leu Lys Leu Pro Glu Thr
                725                 730                 735

Arg Gly Gln Val Leu Gln
            740
```

<210> SEQ ID NO 29
<211> LENGTH: 683
<212> TYPE: PRT
<213> ORGANISM: Mus musculus

<400> SEQUENCE: 29

```
Met Asp Asp Tyr Arg Tyr Arg Asp Asn Tyr Glu Gly Tyr Ala Pro Ser
1               5                   10                  15

Asp Gly Tyr Tyr Arg Ser Asn Glu Gln Asn Gln Glu Glu Asp Ala Gln
            20                  25                  30

Ser Asp Val Thr Glu Gly His Asp Glu Glu Asp Glu Ile Tyr Glu Gly
        35                  40                  45

Glu Tyr Gln Gly Ile Pro His Pro Asp Asp Val Lys Ser Lys Gln Thr
    50                  55                  60

Lys Met Ala Pro Ser Arg Ala Asp Gly Leu Gly Gly Gln Ala Asp Leu
65                  70                  75                  80
```

```
Met Ala Glu Arg Met Glu Asp Glu Glu Glu Leu Ala His Gln Tyr Glu
                85                  90                  95

Thr Ile Ile Asp Glu Cys Gly His Gly Arg Phe Gln Trp Thr Leu Phe
            100                 105                 110

Phe Val Leu Gly Leu Ala Leu Met Ala Asp Gly Val Glu Ile Phe Val
        115                 120                 125

Val Ser Phe Ala Leu Pro Ser Ala Glu Lys Asp Met Cys Leu Ser Ser
    130                 135                 140

Ser Lys Lys Gly Met Leu Gly Leu Ile Val Tyr Leu Gly Met Met Ala
145                 150                 155                 160

Gly Ala Phe Ile Leu Gly Gly Leu Ala Asp Lys Leu Gly Arg Lys Lys
                165                 170                 175

Val Leu Ser Met Ser Leu Ala Ile Asn Ala Ser Phe Ala Ser Leu Ser
            180                 185                 190

Ser Phe Val Gln Gly Tyr Gly Ala Phe Leu Phe Cys Arg Leu Ile Ser
        195                 200                 205

Gly Ile Gly Ile Gly Gly Ser Leu Pro Ile Val Phe Ala Tyr Phe Ser
    210                 215                 220

Glu Phe Leu Ser Arg Glu Lys Arg Gly Glu His Leu Ser Trp Leu Gly
225                 230                 235                 240

Ile Phe Trp Met Thr Gly Gly Ile Tyr Ala Ser Ala Met Ala Trp Ser
                245                 250                 255

Ile Ile Pro His Tyr Gly Trp Gly Phe Ser Met Gly Thr Asn Tyr His
            260                 265                 270

Phe His Ser Trp Arg Val Phe Val Ile Val Cys Ala Leu Pro Ala Thr
        275                 280                 285

Val Ser Met Val Ala Leu Lys Phe Met Pro Glu Ser Pro Arg Phe Leu
    290                 295                 300

Leu Glu Met Gly Lys His Asp Glu Ala Trp Met Ile Leu Lys Gln Val
305                 310                 315                 320

His Asp Thr Asn Met Arg Ala Lys Gly Thr Pro Glu Lys Val Phe Thr
                325                 330                 335

Val Ser His Ile Lys Thr Pro Lys Gln Met Asp Glu Phe Ile Glu Ile
            340                 345                 350

Gln Ser Ser Thr Gly Thr Trp Tyr Gln Arg Trp Leu Val Arg Phe Met
        355                 360                 365

Thr Ile Phe Lys Gln Val Trp Asp Asn Ala Leu Tyr Cys Val Met Gly
    370                 375                 380

Pro Tyr Arg Met Asn Thr Leu Ile Leu Ala Val Val Trp Phe Thr Met
385                 390                 395                 400

Ala Leu Ser Tyr Tyr Gly Leu Thr Val Trp Phe Pro Asp Met Ile Arg
                405                 410                 415

Tyr Phe Gln Asp Glu Glu Tyr Lys Ser Lys Met Lys Val Phe Phe Gly
            420                 425                 430

Glu His Val His Gly Ala Thr Ile Asn Phe Thr Met Glu Asn Gln Ile
        435                 440                 445

His Gln His Gly Lys Leu Val Asn Asp Lys Phe Ile Lys Met Tyr Phe
    450                 455                 460

Lys His Val Leu Phe Glu Asp Thr Phe Phe Asp Lys Cys Tyr Phe Glu
465                 470                 475                 480

Asp Val Thr Ser Thr Asp Thr Tyr Phe Lys Asn Cys Thr Ile Glu Ser
                485                 490                 495
```

```
Thr Thr Phe Tyr Asn Thr Asp Leu Tyr Lys His Lys Phe Ile Asn Cys
            500                 505                 510

Arg Phe Ile Asn Ser Thr Phe Leu Glu Gln Lys Glu Gly Cys His Met
        515                 520                 525

Asp Phe Glu Glu Asp Asn Asp Phe Leu Ile Tyr Leu Val Ser Phe Leu
    530                 535                 540

Gly Ser Leu Ser Val Leu Pro Gly Asn Ile Ile Ser Ala Leu Leu Met
545                 550                 555                 560

Asp Arg Ile Gly Arg Leu Lys Met Ile Gly Gly Ser Met Leu Ile Ser
                565                 570                 575

Ala Val Cys Cys Phe Phe Leu Phe Phe Gly Asn Ser Glu Ser Ala Met
            580                 585                 590

Ile Gly Trp Gln Cys Leu Phe Cys Gly Thr Ser Ile Ala Ala Trp Asn
        595                 600                 605

Ala Leu Asp Val Ile Thr Val Glu Leu Tyr Pro Thr Asn Gln Arg Ala
    610                 615                 620

Thr Ala Phe Gly Ile Leu Asn Gly Leu Cys Lys Phe Gly Ala Ile Leu
625                 630                 635                 640

Gly Asn Thr Ile Phe Ala Ser Phe Val Gly Ile Thr Lys Val Val Pro
                645                 650                 655

Ile Leu Leu Ala Ala Ala Ser Leu Val Gly Gly Gly Leu Ile Ala Leu
            660                 665                 670

Arg Leu Pro Glu Thr Arg Glu Gln Val Leu Met
        675                 680


<210> SEQ ID NO 30
<211> LENGTH: 667
<212> TYPE: PRT
<213> ORGANISM: Mus musculus

<400> SEQUENCE: 30

Met Glu Asp Ser Tyr Lys Asp Arg Thr Ser Leu Met Lys Gly Ala Lys
1               5                   10                  15

Asp Ile Ala Lys Glu Val Lys Lys Gln Thr Val Lys Lys Val Asn Gln
            20                  25                  30

Ala Val Asp Arg Ala Gln Asp Glu Tyr Thr Gln Arg Ser Tyr Ser Arg
        35                  40                  45

Phe Gln Asp Glu Glu Asp Asp Asp Asp Tyr Tyr Pro Pro Gly Glu Thr
    50                  55                  60

Tyr Ser Gly Glu Val Asn Asp Asp Glu Gly Ser Ser Glu Ala Thr Glu
65                  70                  75                  80

Gly His Asp Glu Glu Asp Glu Ile Tyr Glu Gly Glu Tyr Gln Gly Ile
                85                  90                  95

Pro Ser Thr Asn Gln Gly Lys Asp Ser Ile Val Ser Val Gly Gln Pro
            100                 105                 110

Lys Gly Asp Glu Tyr Lys Asp Arg Arg Glu Leu Glu Ser Glu Arg Arg
        115                 120                 125

Ala Asp Glu Glu Glu Leu Ala Gln Gln Tyr Glu Leu Ile Ile Gln Glu
    130                 135                 140

Cys Gly His Gly Arg Phe Gln Trp Ala Leu Phe Phe Val Leu Gly Met
145                 150                 155                 160

Ala Leu Met Ala Asp Gly Val Glu Val Phe Val Val Gly Phe Val Leu
                165                 170                 175

Pro Ser Ala Glu Thr Asp Leu Cys Ile Pro Asn Ser Gly Ser Gly Trp
            180                 185                 190
```

-continued

```
Leu Gly Ser Ile Val Tyr Leu Gly Met Met Val Gly Ala Phe Phe Trp
        195                 200                 205

Gly Gly Leu Ala Asp Lys Val Gly Arg Lys Gln Ser Leu Leu Ile Cys
    210                 215                 220

Met Ser Val Asn Gly Phe Phe Ala Phe Leu Ser Ser Phe Val Gln Gly
225                 230                 235                 240

Tyr Gly Phe Phe Leu Val Cys Arg Leu Leu Ser Gly Phe Gly Ile Gly
                245                 250                 255

Gly Ala Ile Pro Thr Val Phe Ser Tyr Phe Ala Glu Val Leu Ala Arg
            260                 265                 270

Glu Lys Arg Gly Glu His Leu Ser Trp Leu Cys Met Phe Trp Met Ile
        275                 280                 285

Gly Gly Ile Tyr Ala Ser Ala Met Ala Trp Ala Ile Ile Pro His Tyr
    290                 295                 300

Gly Trp Ser Phe Ser Met Gly Ser Ala Tyr Gln Phe His Ser Trp Arg
305                 310                 315                 320

Val Phe Val Ile Val Cys Ala Leu Pro Cys Val Ser Ser Val Val Ala
                325                 330                 335

Leu Thr Phe Met Pro Glu Ser Pro Arg Phe Leu Leu Glu Val Gly Lys
            340                 345                 350

His Asp Glu Ala Trp Met Ile Leu Lys Leu Ile His Asp Thr Asn Met
        355                 360                 365

Arg Ala Arg Gly Gln Pro Glu Lys Val Phe Thr Val Asn Lys Ile Lys
    370                 375                 380

Thr Pro Lys Gln Ile Asp Glu Leu Ile Glu Ile Glu Ser Asp Thr Gly
385                 390                 395                 400

Thr Trp Tyr Arg Arg Cys Phe Val Arg Ile Arg Thr Glu Leu Tyr Gly
                405                 410                 415

Ile Trp Leu Thr Phe Met Arg Cys Phe Asn Tyr Pro Val Arg Glu Asn
            420                 425                 430

Thr Ile Lys Leu Thr Ile Val Trp Phe Thr Leu Ser Phe Gly Tyr Tyr
        435                 440                 445

Gly Leu Ser Val Trp Phe Pro Asp Val Ile Lys His Leu Gln Ser Asp
    450                 455                 460

Glu Tyr Ala Leu Leu Thr Arg Asn Val Gln Lys Asp Lys Tyr Ala Asn
465                 470                 475                 480

Phe Ser Ile Asn Phe Thr Met Glu Asn Gln Ile His Thr Gly Met Glu
                485                 490                 495

Tyr Glu Asn Gly Arg Phe Leu Gly Val Lys Phe Lys Ser Val Thr Phe
            500                 505                 510

Lys Asp Ser Val Phe Lys Ser Cys Thr Phe Asp Asp Val Thr Ser Val
        515                 520                 525

Asn Thr Tyr Phe Lys Asn Cys Thr Phe Ile Asp Thr Leu Phe Asp Asn
    530                 535                 540

Thr Asp Phe Glu Pro Tyr Lys Phe Ile Asp Ser Glu Phe Gln Asn Cys
545                 550                 555                 560

Ser Phe Leu His Asn Lys Thr Gly Cys Gln Ile Thr Phe Asp Asp Asp
                565                 570                 575

Tyr Ser Ala Tyr Trp Ile Tyr Phe Val Asn Phe Leu Gly Thr Leu Ala
            580                 585                 590

Val Leu Pro Gly Asn Ile Val Ser Ala Leu Leu Met Asp Arg Ile Gly
        595                 600                 605
```

-continued

```
Arg Leu Thr Met Leu Gly Gly Ser Met Val Leu Ser Gly Ile Ser Cys
    610                 615                 620

Phe Phe Leu Trp Phe Gly Thr Ser Glu Ser Met Met Ile Gly Met Leu
625                 630                 635                 640

Cys Leu Tyr Asn Gly Leu Thr Ile Ser Ala Trp Asn Ser Leu Asp Val
                645                 650                 655

Val Thr Val Glu Leu Tyr Pro Thr Asp Arg Arg
            660                 665


<210> SEQ ID NO 31
<211> LENGTH: 20
<212> TYPE: PRT
<213> ORGANISM: Artificial Sequence
<220> FEATURE:
<223> OTHER INFORMATION: Linker 2

<400> SEQUENCE: 31

Gly Gly Gly Gly Ser Gly Gly Gly Gly Ser Gly Gly Gly Gly Ser Gly
1               5                   10                  15

Gly Gly Gly Ser
            20


<210> SEQ ID NO 32
<211> LENGTH: 5
<212> TYPE: PRT
<213> ORGANISM: Artificial Sequence
<220> FEATURE:
<223> OTHER INFORMATION: Linker 3

<400> SEQUENCE: 32

Glu Ala Ala Ala Lys
1               5


<210> SEQ ID NO 33
<211> LENGTH: 46
<212> TYPE: PRT
<213> ORGANISM: Artificial Sequence
<220> FEATURE:
<223> OTHER INFORMATION: Linker 4

<400> SEQUENCE: 33

Ala Glu Ala Ala Ala Lys Glu Ala Ala Ala Lys Glu Ala Ala Ala Lys
1               5                   10                  15

Glu Ala Ala Ala Lys Ala Leu Glu Ala Glu Ala Ala Ala Lys Glu Ala
            20                  25                  30

Ala Ala Lys Glu Ala Ala Ala Lys Glu Ala Ala Ala Lys Ala
        35                  40                  45
```

METHODS FOR IDENTIFYING ANTI CLOSTRIDIAL NEUROTOXIN COMPOUNDS

SEQUENCE LISTING

The Sequence Listing submitted in text format (.txt) filed on Jul. 2, 2022, named "SequenceListing.txt", created on Jun. 30, 2022 (102 KB), is incorporated herein by reference.

TECHNOLOGICAL FIELD

The present disclosure generally relates to screening methods for identifying compounds useful as anti-clostridial neurotoxin agents. Specifically disclosed are polypeptide and nucleic acid constructs and methods for detecting agents that inhibit the binding of clostridial neurotoxins to their cellular receptor.

BACKGROUND ART

References considered to be relevant as background to the presently disclosed subject matter are listed below:

[1] Duplantier, A. J., et al. 2016. Searching for Therapeutics Against Botulinum Neurotoxins: A True Challenge for Drug Discovery. Curr Top Med Chem 16:2330-2349.

[2] Pirazzini, M. and Rossetto, O. 2017. Challenges in searching for therapeutics against Botulinum Neurotoxins. Expert Opin Drug Discov 12:497-510.

[3] WO 2007/050390.

[4] U.S. Pat. No. 8,476,024.

[5] WO 2010/039748.

[6] Dong, M., et al. 2006. SV2 is the protein receptor for botulinum neurotoxin A. Science 312:592-596.

[7] Baldwin, M. R., et al. 2008. Subunit vaccine against the seven serotypes of botulism. Infect Immun 76:1314-1318.

[8] European Directorate for the Quality of Medicines and Healthcare. 2011. Botulinum antitoxin, p 949, European pharmacopoeia led. EDQM Council of Europe, Strasbourg, France.

[9] Dong, M., et al. 2008. Glycosylated SV2A and SV2B mediate the entry of botulinum neurotoxin E into neurons. Mol Biol Cell, Vol. 19, issue 12, p. 5226-37.

[10] Diamant, E. et al. 2014. Evaluating the synergistic neutralizing effect of anti-botulinum oligoclonal antibody preparations. PLoS One 9:e87089.

Acknowledgement of the above references herein is not to be inferred as meaning that these are in any way relevant to the patentability of the presently disclosed subject matter.

BACKGROUND

Clostridial neurotoxins (for example Botulinum neurotoxins, BoNTs and tetanus toxin) are among the most poisonous substances in nature. Botulinum neurotoxins are produced by the gram-positive spore-forming bacterium *Clostridium botulinum*. There are eight serotypes of BoNTs designated A-H, and antibodies raised against one serotype can neutralize only the toxic effects of the BoNT serotype against which it was raised and not that of the other serotypes.

All BoNT serotypes share a common architecture that consists of the following three domains responsible for the different steps in the intoxication mechanism: 1. The receptor binding domain (also known as the $H_C$-fragment); 2. The translocation domain; and 3. The catalytic domain. Following exposure of a subject to BoNTs, the BoNTs bind specific receptors on motor neurons and disable the ability of the cells to transmit the neurotransmitter acetyl choline to muscle cells. This results in flaccid muscle paralysis and can lead to respiratory failure and eventually to death.

Currently, the only approved therapy for botulinum intoxication is antitoxin, an antibody preparation originating from vaccinated horses, which has the capacity to neutralize the botulinum toxin at the bloodstream. Although effective, antitoxin therapy suffers from several drawbacks. First, the administration of a large dose of foreign protein, namely, an equine (horse-derived) antibody, can cause severe side effects, including an anaphylactic shock. In addition, due to secondary immunologic reactions against the equine antibodies, the antitoxin can be administered only for a single intoxication event per patient. Second, antitoxin therapy is very expensive due to the requirement for horses and for restricted safety facilities dictated by an activity involving the hazardous neurotoxin. Third, antibodies are thermolabile and require a so called "cold chain delivery", which limits antitoxin distribution.

Due to at least the above reasons, there is a motivation for developing next generation therapy for botulinum intoxication (botulism) based on small molecules that inhibit the neurotoxin. The production costs of small molecules are relatively low. In addition, the immune system does not react against small molecules, and therefore such therapy is safer than an antitoxin therapy and can be administered repeatedly and even in a prophylactic manner. Furthermore, small molecules are generally stable and do not require a cold chain delivery.

Small molecules can target each one of the neurotoxin domains that are responsible for the different intoxication steps i.e.: receptor binding, toxin translocation, and enzymatic cleavage of the cytoplasmic SNARE (soluble N-ethylmaleimide-sensitive factor attachment protein receptor) proteins. Many efforts are being presently made for finding small molecule inhibitors that target the catalytic domain of the toxin that will inactivate intracellular toxin (1, 2). The effect of small molecules on the catalytic domain can be evaluated by measuring the enzymatic activity of the catalytic domain on synthetic substrates, in the presence of potential inhibitors. Indeed, many small molecules were found to inhibit the catalytic domain of BoNTs, with dissociation constants in the nanomolar range (1, 2). However, only a limited therapeutic effect was reported thus far in vivo for catalytic domain inhibitors, due to their limited cell entry.

Targeting the receptor binding domain of botulinum neurotoxins is an additional approach for generating therapy for botulism, as the receptor binding domain may be encountered by inhibitors while in the blood stream and thus the inhibitors are not required to enter the cells. The publications WO 2007/050390 and U.S. Pat. No. 8,476,024 relate inter alia to methods for identifying inhibitors of Botulinum neurotoxin A (BoNT/A) binding to the synaptic vesicle glycoprotein 2C (SV2C), the receptor for botulinum neurotoxin A. Methods for identifying inhibitors of Botulinum neurotoxin serotypes other than BoNT/A have also been reported (5).

GENERAL DESCRIPTION

In a first aspect the present disclosure provides a method for identifying an agent that reduces binding of a clostridial neurotoxin to synaptic vesicle glycoprotein 2 (SV2), wherein said method comprises the following steps:

(a) bringing into contact a first fusion protein, said first fusion protein comprising a receptor binding domain of Botulinum neurotoxin (BoNT Hc fragment) fused to a reporter protein, with a second protein, said second protein comprising the fourth luminal loop of the synaptic vesicle glycoprotein 2 (SV2) or a fragment thereof optionally fused to an expression facilitating domain;

(b) measuring the binding of said first fusion protein to said second protein in the presence of a sample; and (c) comparing the measured binding to the binding performed in a control measurement in the absence of said sample, wherein a lower binding than that of the control measurement indicates that said agent reduces binding of said clostridial neurotoxin to SV2.

In some embodiments the method according to the present disclosure is wherein the agent is a small molecule.

In other embodiments the method according to the present disclosure is wherein the agent is a polypeptide.

In further embodiments the method according to the present disclosure is wherein the agent is an antibody.

In specific embodiments the method according to the present disclosure is wherein the first fusion protein further comprises a linker situated between said reporter protein and said BoNT Hc fragment.

In other specific embodiments the method according to the present disclosure is wherein said first fusion protein further comprises at least one heterologous amino acid sequence at its N- and/or C-terminus. In still further embodiments the method according to the present disclosure is wherein said first fusion protein comprises a His tag sequence at its C-terminus.

In some embodiments the method according to the present disclosure is wherein the reporter protein is situated N-terminal to said BoNT $H_C$ fragment. In specific embodiments the method according to the present disclosure is wherein said reporter protein is a beta-galactosidase domain.

In other specific embodiments the method according to the present disclosure is wherein said first fusion protein comprises a receptor binding domain of at least one of Botulinum neurotoxin A (BoNT/A $H_C$ fragment), or Botulinum neurotoxin E (BoNT/E Hc fragment), or Botulinum neurotoxin D (BoNT/D $H_C$ fragment) or Botulinum neurotoxin F (BoNT/F $H_C$ fragment) or tetanus neurotoxin.

In other embodiments the method according to the present disclosure is wherein the first fusion protein comprises a receptor binding domain of Botulinum neurotoxin A (BoNT/A $H_C$ fragment).

In further embodiments the method according to the present disclosure is wherein said clostridial neurotoxin is a botulinum neurotoxin or a tetanus neurotoxin.

In further embodiments the method according to the present disclosure is wherein the synaptic vesicle glycoprotein 2 is synaptic vesicle glycoprotein 2C (SV2C).

In some embodiments the method according to the present disclosure is wherein said expression facilitating domain is a glutathione-s-transferase (GST).

In other embodiments the method according to the present disclosure is wherein the method is for identifying an agent that reduces binding of BoNT/A to the BoNT receptor SV2C.

In further embodiments the method according to the present disclosure is wherein the first fusion protein comprises a receptor binding domain of Botulinum neurotoxin A (BoNT/A Hc fragment) having an amino acid sequence which is at least 70% identical to the sequence denoted by SEQ ID NO. 2 and a reporter protein which is a beta-galactosidase domain having an amino acid sequence which is at least 70% identical to the sequence denoted by SEQ ID NO. 1.

In still further embodiments the method according to the present disclosure is wherein the first fusion protein comprises a receptor binding domain of Botulinum neurotoxin A (BoNT/A $H_C$ fragment) having the amino acid sequence denoted by SEQ ID NO. 2 and a reporter protein which is a beta-galactosidase domain having the amino acid sequence denoted by SEQ ID NO. 1.

In specific embodiments thereof the present disclosure encompasses a method wherein the first fusion protein comprises from an amino-terminal position to a carboxyl-terminal position a reporter protein which is a beta-galactosidase domain having the amino acid sequence denoted by SEQ ID NO. 1, a linker having the amino acid sequence denoted by SEQ ID NO. 3, a receptor binding domain of Botulinum neurotoxin A (BoNT/A $H_C$ fragment) having the amino acid sequence denoted by SEQ ID NO. 2 and a His tag having the amino acid sequence denoted by SEQ ID NO. 4.

In some embodiments the method according to the present disclosure is wherein the first fusion protein comprises an amino acid sequence which is at least 70% identical to the sequence denoted by SEQ ID NO. 5. In other embodiments the method according to the present disclosure is wherein the first fusion protein comprises or consists of the amino acid sequence denoted by SEQ ID NO. 5.

In other embodiments the method according to the present disclosure is wherein the second protein comprises the fourth luminal loop of the BoNT receptor SV2C having the amino acid sequence denoted by SEQ ID NO. 13. In further embodiments the method according to the present disclosure is wherein the second protein is a fusion protein comprising an amino acid sequence which is at least 70% identical to the sequence denoted by SEQ ID NO. 15. In still further embodiments the method according to the present disclosure is wherein said second protein is a fusion protein comprising or consisting of the amino acid sequence denoted by SEQ ID NO. 15.

In some embodiments the method according to the present disclosure is wherein at least one of the first fusion protein or the second protein is immobilized onto a solid surface.

In specific embodiments the method according to the present disclosure is wherein the second protein is immobilized onto a solid surface.

In other specific embodiments the method according to the present disclosure is wherein the step of measuring the binding comprises adding at least one substrate of the reporter protein of said first fusion protein.

In further specific embodiments the method according to the present disclosure is wherein the reporter protein is beta-galactosidase domain and said at least one substrate is 4-methylumbellyferyl-galactopyranoside (4-MUG), ortho-nitrophenyl-galactopyranoside (oNPG), fluorescein Di-β-D-Galactopyranoside or naphthofluorescein di-(beta-D-galactopyranoside).

By another one of its aspects the present disclosure provides a method for identifying at least one agent that reduces binding of Botulinum neurotoxin A (BoNT/A) to the synaptic vesicle glycoprotein 2C (SV2C), wherein said method comprises the following steps:

(a) contacting a first fusion protein, said first fusion protein comprising BoNT/A Hc fragment and a beta-galactosidase domain with at least one sample, thereby obtaining a mixture;

(b) contacting said mixture obtained in step (a) with a second protein optionally attached to a surface, said second protein being a fusion protein comprising the fourth luminal loop of the synaptic vesicle glycoprotein 2C (SV2C) and a glutathione-s-transferase domain (GST);

(c) adding at least one substrate of the beta-galactosidase domain of said first fusion protein; and (d) determining the signal;

wherein a signal lower than a threshold signal indicates that said agent reduces binding of BoNT/A to SV2C.

In some embodiments the method according to the present disclosure further comprising at least one washing step with a wash solution between steps (a) and (b) and/or steps (b) and (c). In other embodiments the method according to the present disclosure further comprising adding a stop solution after step (c). In further embodiments the method according to the present disclosure is wherein the first fusion protein is contacted with the at least one sample for one hour at room temperature.

In specific embodiments the method according to the present disclosure is wherein the second protein is contacted with the mixture obtained in step (a) for one hour at 37° C.

In further specific embodiments the method according to the present disclosure is wherein the method is used for high-throughput screening (HTS).

It is to be understood that said sample referred to above is a sample that potentially comprises said agent.

In specific embodiments the method according to the present disclosure is wherein the sample is a biological sample obtained from a subject and wherein the agent is an antibody.

By another one of its aspects the present disclosure provides a kit comprising:

(a) a first fusion protein, said first fusion protein comprising a receptor binding domain of Botulinum neurotoxin (BoNT Hc fragment) fused to a reporter protein or a composition comprising said first fusion protein and a suitable carrier or excipient;

(b) a second protein, said second protein comprising the fourth luminal loop of the synaptic vesicle glycoprotein 2 (SV2) or fragment thereof optionally fused to an expression facilitating domain or a composition comprising said second protein and a suitable carrier or excipient; optionally, said second protein is attached to a solid surface; and optionally (c) instructions for use.

In some embodiments the kit according to the present disclosure is wherein the reporter protein is a beta-galactosidase domain. In other embodiments the kit according to the present disclosure further comprises at least one substrate for said beta-galactosidase domain.

In other embodiments the kit according to the present disclosure is wherein the first fusion protein comprises a receptor binding domain of Botulinum neurotoxin A (BoNT/A $H_C$ fragment).

In further embodiments the kit according to the present disclosure is wherein the second protein comprises a BoNT receptor which is synaptic vesicle glycoprotein 2C (SV2C).

In specific embodiments the kit according to the present disclosure is wherein the expression facilitating domain is a glutathione-s-transferase (GST).

In further specific embodiments the kit according to the present disclosure is wherein the first fusion protein comprises an amino acid sequence which is at least 70% identical to the sequence denoted by SEQ ID NO. 5. In still further specific embodiments, the kit according to the present disclosure is wherein the first fusion protein comprises or consists of the amino acid sequence as denoted by SEQ ID NO. 5.

In some embodiments the kit according to the present disclosure is wherein the second protein comprises the fourth luminal loop of SV2C having the amino acid sequence denoted by SEQ ID NO. 13.

In other embodiments the kit according to the present disclosure is wherein the second protein is a fusion protein comprising an amino acid sequence which is at least 70% identical to the sequence denoted by SEQ ID NO. 15. In further embodiments the kit according to the present disclosure is wherein the second protein is a fusion protein comprising or consisting of the amino acid sequence denoted by SEQ ID NO. 15.

In specific embodiments the kit according to the present disclosure is wherein the at least one substrate is 4-methylumbellyferyl-galactopyranoside (4-MUG), ortho-nitrophenyl-galactopyranoside (oNPG), fluorescein Di-β-D-Galactopyranoside or naphthofluorescein di-(beta-D-galactopyranoside).

In another one of its aspects the present disclosure provides an isolated fusion protein comprising the receptor binding domain of Botulinum neurotoxin (BoNT Hc fragment) and a reporter protein, or tetanus neurotoxin.

In certain embodiments the isolated fusion protein according to the present disclosure comprises the receptor binding domain of at least one of Botulinum neurotoxin A (BoNT/A Hc fragment), or Botulinum neurotoxin E (BoNT/E $H_C$ fragment), or Botulinum neurotoxin D (BoNT/D Hc fragment) or Botulinum neurotoxin F (BoNT/F $H_C$ fragment).

In some embodiments the isolated fusion protein according to the present disclosure comprises the receptor binding domain of Botulinum neurotoxin A (BoNT/A Hc fragment).

In other embodiments the isolated fusion protein according to the present disclosure is wherein the reporter protein is a beta-galactosidase domain. In specific embodiments the isolated fusion protein according to the present disclosure is wherein said beta-galactosidase domain is situated N-terminal to said BoNT/A $H_C$ fragment.

In further specific embodiments the isolated fusion protein according to the present disclosure further comprises a linker situated between said beta-galactosidase domain and said BoNT/A $H_C$ fragment.

In some embodiments the isolated fusion protein according to the present disclosure further comprises at least one heterologous amino acid sequence at its N- and/or C-terminus.

In other embodiments the isolated fusion protein according to the present disclosure comprises a His tag sequence at its C-terminus.

In further embodiments the isolated fusion protein according to the present disclosure comprises the BoNT/A Hc fragment having an amino acid sequence which is at least 70% identical to the sequence denoted by SEQ ID NO. 2 and wherein said reporter protein is a beta-galactosidase domain having the amino acid sequence which is at least 70% identical to the sequence denoted by SEQ ID NO. 1.

In still further embodiments the isolated fusion protein according to the present disclosure comprises the BoNT/A Hc fragment having the amino acid sequence denoted by SEQ ID NO. 2 and wherein said reporter protein is a beta-galactosidase domain has the amino acid sequence denoted by SEQ ID NO. 1.

In specific embodiments the isolated fusion protein according to the present disclosure comprises from an amino-terminal position to a carboxyl-terminal position a beta-galactosidase domain having the amino acid sequence denoted by SEQ ID NO. 1, a linker having the amino acid denoted by SEQ ID NO. 3, a receptor binding domain of Botulinum neurotoxin A (BoNT/A Hc fragment) having the amino acid sequence denoted by SEQ ID NO. 2 and a His tag having the amino acid sequence denoted by SEQ ID NO. 4.

In specific embodiments the isolated fusion protein according to the present disclosure comprises an amino acid sequence which is at least 70% identical to the sequence denoted by SEQ ID NO. 5. In still further specific embodiments, the isolated fusion protein according to the present disclosure comprises or consists of the amino acid sequence denoted by SEQ ID NO. 5.

By another one of its aspects the present disclosure provides an isolated nucleic acid sequence encoding the fusion protein as defined herein. The present disclosure further provides a vector comprising the nucleic acid sequence as herein defined, and a host cell comprising the vector as herein defined.

The present disclosure further provides a composition comprising the isolated fusion protein as defined in the present disclosure and a suitable carrier or excipient.

BRIEF DESCRIPTION OF THE DRAWINGS

For better understanding the subject matter that is disclosed herein and to exemplify how it may be carried out in practice, embodiments will now be described, by way of non-limiting example only, with reference to the accompanying drawings, in which:

FIG. 4A shows a correlation graph between the neutralizing antibody concentration (NAC, IU/ml) of 20 plasma samples determined using the in vivo pharmacopoeial mouse neutralization assay and the in-vitro ß-gal-$H_C$/A-GST-SV2C binding assay. FIG. 4B shows a correlation graph between the neutralizing antibody concentration (NAC) of 20 plasma samples determined using the in vivo pharmacopoeial mouse neutralization assay (IU/ml) and the ELISA (Enzyme-linked immunosorbent assay) titers of the samples.

FIG. 5A is a bar graph showing the inhibitory effect (% inhibition) of Mouse anti Hc/A fragment monoclonal antibodies (A-1-A-8) on binding between the receptor binding domain of BoNT/A to its receptor SV2C. Anti-ToxB (anti-BoNT/B), Anti-ToxE (anti-BoNT/E) and anti-Anthrax protective antigen (PA) antibodies served as control. FIG. 5B is a schematic illustration of monoclonal antibody binding to the Hc domain of BoNT/A, thereby inhibiting the binding thereof to its receptor SV2C.

DETAILED DESCRIPTION OF EMBODIMENTS

Figure 1:
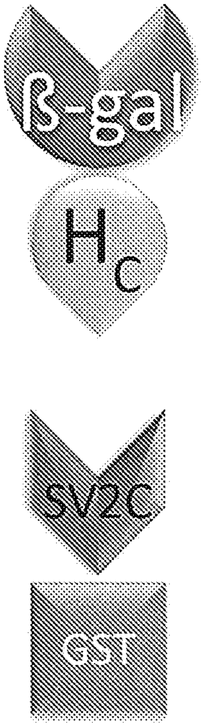
FIG. 1: A schematic representation showing the polypeptide construct ß-gal-$H_C$ (ß-gal, beta-galactosidase; $H_C$, the receptor binding domain of botulinum neurotoxin) and a polypeptide construct comprising the synaptic vesicle protein C (SV2C) fused to glutathione-s-transferase (GST).

The present disclosure is based on the development of a screening method for identifying agents that inhibit the binding of Botulinum neurotoxin A (BoNT/A) to its receptor, the synaptic vesicle protein SV2C. The method is generally based on the design of a chimeric protein construct comprising the receptor binding domain of BoNT/A (also referred herein as the Hc-fragment) fused to the reporter enzyme beta-galactosidase from *Escherichia coli* and on an additional protein construct comprising SV2C, thereby allowing high throughput screening (HTS) of a compound library.

Generally, high throughput screening (HTS) of a compound library is an important tool for discovery of new drugs for a desired activity and can be accomplished only if an efficient, sensitive, and specific assay is available. Currently, there are no HTS assays to assist in screening for inhibitors of Botulinum neurotoxin (BoNT) binding to their receptors. Assays based on the enzymatic activity of BoNT could have been potentially used to detect inhibitors of the receptor-bound toxin. However, such assays are either inadequate for HTS (as they require detection of the specific endoproteinase activity of BoNT using mass spectrometry (Endopep-MS)), or suffer from a limited sensitivity, and most importantly, such assays obligate safety restrictions and are associated with high costs due to the involvement of the hazardous toxin.

Alternatively, assays designed for monitoring receptor binding can be based on the receptor-binding domain of the toxin only. Since the receptor-binding domain of the toxin (the Hc fragment) is non-toxic, special safety restrictions are not required and such an assay can potentially be conducted at any laboratory. However, the absence of the catalytic domain prevents facile detection of receptor-bound $H_C$ fragment.

For overcoming this obstacle, the assay can be based on an enzyme-linked immunosorbent assay (ELISA) format, in which receptor-bound $H_C$-fragment is identified with specific antibodies, which are in turn recognized by secondary antibodies that are conjugated to peroxidase or alkaline phosphates. Addition of chromogenic substrate results in a signal whose intensity is proportional to the amount of receptor-bound Hc-fragment. Nevertheless, such an assay requires multiple steps and is time consuming. In addition, this type of an assay will not allow examination of antitoxin antibodies preparations since the $H_C$-fragment will already be blocked by the tested antibodies and therefore will not be available for the identifying antibody. Furthermore, it may suffer from low sensitivity due to non-specific interaction of the antibodies.

For overcoming all of the above-mentioned obstacles and limitations the inventors have designed, as detailed below, a chimeric protein construct comprising the receptor binding domain of BoNT/A (also termed herein the $H_C$-fragment) fused to the reporter enzyme beta-galactosidase from *Escherichia coli*. The codon usage of both proteins was optimized for expression and a flexible linker with the sequence $(GGGGS)_3$ (SEQ ID NO. 3) was positioned as a connector between the $H_C$-fragment and beta-galactosidase proteins. In addition, the inventors have used a receptor construct based on the synaptic vesicle protein (SV2C) conjugated to a Glutathione S-Transferase (GST) protein to facilitate expression of the SV2C. Detection of receptor-bound $H_C$ fragment is accomplished with the addition of the chromogenic substrate ortho-nitrophenyl-ß-galactoside (oNPG) or the fluorogenic substrate 4-methylumbelliferyl-ß-galactoside (4-MUG) that provides even a higher sensitivity. This assay includes a small number of steps and presents a high sensitivity (~2fM of the chimeric protein), making it suitable for HTS. Since the chimeric protein comprising the $H_C$ fragment is non-toxic the assay can be conducted in fact in any laboratory, without requiring special equipment or taking any special safety measures and restrictions.

In addition to screening of small molecule inhibitors, the assay can be used to evaluate the capacity of an anti-BoNT/A antibody preparation to prevent binding of the Hc fragment to the receptor.

As shown in the Examples below, by using the chimeric protein assay the inventors were able to screen a compound library in an HTS approach and discover several compounds that inhibited BoNT/A binding to its receptor SV2C. Three of the compounds also demonstrated a therapeutic effect in-vivo.

Furthermore, the assay was used to evaluate the potency of botulinum antitoxin preparations to neutralize botulinum toxin.

Therefore, in one of its aspects, the present invention provides a method for identifying an agent that reduces binding of a clostridial neurotoxin to synaptic vesicle glycoprotein 2 (SV2), wherein said method comprises the following steps:

(a) bringing into contact a first fusion protein, said first fusion protein comprising a receptor binding domain of Botulinum neurotoxin (BoNT $H_C$ fragment) fused to a reporter protein, with a second protein, said second protein comprising the fourth luminal loop of the synaptic vesicle glycoprotein 2 (SV2) or a fragment thereof optionally fused to an expression facilitating domain;

(b) measuring the binding of said first fusion protein to said second protein in the presence of a sample potentially comprising said agent; and (c) comparing the measured binding to the binding performed in a control measurement in the absence of said sample, wherein a lower binding than that of the control measurement indicates that said agent reduces binding of said clostridial neurotoxin to SV2.

In other words, the present invention provides a method for identifying an agent that reduces the binding of any clostridial neurotoxin to its receptor, namely to synaptic vesicle glycoprotein 2 (SV2).

Clostridial neurotoxins are bacterial proteins produced by clostridia, a genus of Gram-positive bacteria, which includes several human pathogens, among these the causative agents of botulism and tetanus. *Clostridium* species inhabit soils and the intestinal tract of animals, including humans. *Clostridium* include around 100 species, inter alia, *Clostridium botulinum* which can produce botulinum toxin in food or wounds and can cause botulism; *Clostridium perfringens* which causes a wide range of symptoms, from food poisoning to cellulitis, fasciitis, and gas gangrene; *Clostridium tetani* which can produce tetanus neurotoxin and causes tetanus or the exotoxin tetanolysin, a hemolysin that causes destruction of tissues; and *Clostridium sordellii* that can cause a fatal infection in exceptionally rare cases after medical abortions.

In certain embodiments the present invention relates to a clostridial neurotoxin which is a Botulinum neurotoxin, a tetanus neurotoxin, or a combination thereof.

Botulinum neurotoxins (BoNTs) as known in the art and as used herein are bacterial proteins that cause the life-threatening disease botulism and are designated by the Centers for Disease Control and Prevention (CDC) "category A" agents. Eight antigenically distinct serotypes (designated A to H) are produced by several anaerobic species: *Clostridium botulinum, Clostridium butyricum, Clostridium baratii* and *Clostridium argentinense*. BoNTs A, B, E, and rarely, F serotypes are primarily related to human illness. The neurotoxin is a di-chain polypeptide consisting of a 100-kDa heavy chain (HC) joined by a disulfide bond to a 50-kDa light chain (LC). All BoNT serotypes exert similar mechanisms of action on their target nerve cells, namely: initial binding of the C-terminal portion of the HC through ganglioside and protein receptors on the presynaptic cell surface, followed by internalization and translocation within the nerve ending, mediated by the N-terminal portion of the HC. Inside the nerve terminus, the neurotoxin LC, cleaves the soluble N-ethylmaleimide-sensitive factor attachment protein receptor (SNARE), which involved in the fusion and release of acetylcholine. As a result, acetylcholine transmission across neuromuscular junctions is blocked and symmetric descending flaccid paralysis occurs.

In some specific embodiments the present invention relates to Botulinum neurotoxin produced by *Clostridium botulinum*. In other embodiments the present invention relates to Botulinum neurotoxin A, B, C, D, E, F, G and H and to any combination thereof.

In specific embodiments the present invention relates to each one of Botulinum neurotoxin A, E, D and F.

In still further embodiments the present invention relates to Botulinum neurotoxin A.

As detailed above BoNTs are composed of a 150-kDa protein consisting of a 100-kDa heavy chain (HC) joined by a disulfide bond to a 50-kDa light chain (LC). The C-terminal half of the heavy chain (referred to herein as the "Hc fragment") functions in binding of the toxin to specific receptors and the N-terminal half of the heavy chain mediates the translocation of the light chain into the cytoplasm of the neuron.

Therefore, as used herein the term "receptor binding domain of Botulinum neurotoxin" (also referred to herein as "BoNT Hc fragment") refers to the C-terminal region of BoNT heavy chain which functions in binding to the receptor synaptic vesicle glycoprotein 2 (SV2). The present invention further encompasses any fragment of the receptor binding domain of Botulinum neurotoxin which maintains its binding to the receptor thereof. The preparation of a receptor binding domain of Botulinum neurotoxin or any fragment thereof is known to a person of skill in the art.

In some embodiments the present invention relates to each one of the receptor binding domains of Botulinum neurotoxin A, E, D and F.

As non-limiting examples, the amino acid sequence of the receptor binding domain of *C. botulinum* Botulinum neurotoxin A (*C. botulinum* BoNT/A He fragment) is denoted herein by SEQ ID NO. 2 and the nucleic acid sequence encoding it is denoted herein by SEQ ID NO. 8.

Following are further non-limiting examples of amino acid and nucleic acid sequences of other botulinum neurotoxin receptor binding domains. The amino acid sequence of

*C. botulinum* B (gene bank code M81186, amino acids 860-1291) is denoted herein by SEQ ID NO. 16 and the nucleic acid sequence encoding thereof is denoted herein by SEQ ID NO. 17. The amino acid sequence of *C. botulinum* C (gene bank code AB745658.1, amino acids 843-1291) is denoted herein by SEQ ID NO. 18 and the nucleic acid sequence encoding thereof is denoted herein by SEQ ID NO. 19. The amino acid sequence of *C. botulinum* D (gene bank code X54254.1, amino acids 861-1276) is denoted herein by SEQ ID NO. 20 and the nucleic acid sequence encoding thereof is denoted herein by SEQ ID NO. 21. The amino acid sequence of *C. botulinum* E (gene bank code X62683.1, amino acids 845-1252) is denoted herein by SEQ ID NO. 22 and the nucleic acid sequence encoding thereof is denoted herein by SEQ ID NO. 23. Furthermore, the amino acid sequence of *C. botulinum* F (gene bank code GU213203.1, amino acids 860-1278) is denoted herein by SEQ ID NO. 24 and the nucleic acid sequence encoding thereof is denoted herein by SEQ ID NO. 25. In addition, the amino acid sequence of *C. botulinum* G (gene bank code X74162.1, amino acids 860-1297) is denoted herein by SEQ ID NO. 26 and the nucleic acid sequence encoding thereof is denoted herein by SEQ ID NO. 27. The above sequences denoted herein by SEQ ID NO. 16 to SEQ ID NO. 27 are listed in Table 7 below.

In specific embodiments the present invention relates to the receptor binding domain of Botulinum neurotoxin A.

In further specific embodiments the present invention relates to the receptor binding domain of Botulinum neurotoxin A BoNT/A having the amino acid sequence which is at least 70% identical to the amino acid sequence denoted by SEQ ID NO. 2.

By the term "sequence which is at least 70% identical to a sequence" it is meant that the sequence referred to is at least 70%, 75%, 80%, 85%, 90%, 95%, 96%, 97%, 98%, 99% or 100% identical to the sequence indicated as a reference sequence.

Thus, in still further specific embodiments the present invention relates to the receptor binding domain of Botulinum neurotoxin A BoNT/A having the amino acid sequence which is at least 70%, 75%, 80%, 85%, 90%, 95%, 96%, 97%, 98%, 99% or 100% identical to the amino acid sequence denoted by SEQ ID NO. 2.

As detailed above, the present invention provides a method for identifying an agent that reduces binding of a clostridial neurotoxin to synaptic vesicle glycoprotein 2 (SV2). The "receptor synaptic vesicle glycoprotein 2", also referred to herein as "SV2" as known in the art is a family of transporter-like proteins located in synaptic neurotransmitter-containing vesicles. The three SV2 genes in mammals encode three isoforms, namely SV2A, SV2B and SV2C.

SV2s are membrane proteins, found in synaptic and endocrine secretory vesicles of vertebrates. The proteins have 12 putative transmembrane domains, and five loops are directed towards the vesicle lumen. Dong et. al. (6) demonstrated that BoNT/A binds the fourth luminal loop of the synaptic vesicle glycoprotein 2C with the highest affinity. Specifically, the binding site of BoNT/A was shown to be located on amino acids 529-566 of SV2C.

BoNT/E uses the fourth luminal loop of SV2 as the protein receptor as well. The isoforms SV2A and SV2B are the preferred target for BoNT/E, which was shown to be dependent on the glycosylation of N573 in SV2A for its biological activity (9). Additionally, it is believed that SV2s are the protein receptor for BoNT/D, BoNT/F, and tetanus toxin.

The present invention provides a method for identifying an agent that reduces binding of any clostridial neurotoxin to any type of the synaptic vesicle glycoprotein 2 (SV2) receptor. In specific embodiments, the present invention relates inter alia to the synaptic vesicle glycoprotein 2 (SV2) types SV2A, SV2B and SV2C.

By way of example, the amino acid sequence of the synaptic vesicle glycoprotein 2 type A (SV2A, *Mus musculus*, NCBI Reference Sequence: NP_071313.1) is denoted herein by SEQ ID NO. 28, the amino acid sequence of the synaptic vesicle glycoprotein 2 type B (SV2B, *Mus musculus*, NCBI Reference Sequence: NP_001347503.1) is denoted herein by SEQ ID NO. 29 and the amino acid sequence of the synaptic vesicle glycoprotein 2 type C (SV2C, *Mus musculus*, GenBank: AAI37862.1) is denoted herein by SEQ ID NO. 30. The above amino acid sequences are listed in Table 8 below.

In specific embodiments, the present invention relates to SV2C. In other specific embodiments, the present invention relates to SV2A. In specific embodiments, the present invention relates to SV2B. In other words, in some embodiments the method as herein defined is wherein said receptor is synaptic vesicle glycoprotein 2C (SV2C).

The present invention further provides a method as herein defined for identifying an agent that reduces binding of a tetanus neurotoxin to synaptic vesicle glycoprotein 2 (SV2).

Furthermore, in the above and other embodiments the method according to the present invention is wherein said method is for identifying an agent that reduces binding of BoNT/A to the BoNT receptor SV2C.

In other words, the present invention further provides a method for identifying an agent that reduces binding of Botulinum neurotoxin A (BoNT/A) to synaptic vesicle glycoprotein 2C (SV2C), wherein said method comprises the following steps:

(a) bringing into contact a first fusion protein, said first fusion protein comprising a receptor binding domain of Botulinum neurotoxin A (BoNT/A Hc fragment) fused to a reporter protein, with a second protein, said second protein comprising the fourth luminal loop of the synaptic vesicle glycoprotein 2C (SV2C) or fragment thereof optionally fused to an expression facilitating domain;

(b) measuring the binding of said first fusion protein to said second protein in the presence of a sample potentially comprising said agent; and (c) comparing the measured binding to the binding performed in a control measurement in the absence of said sample, wherein a lower binding than that of the control measurement indicates that said agent reduces binding of BoNT/A to SV2C.

By the term "agent" in the context of the present invention (i.e., an agent that reduces binding of a clostridial neurotoxin to SV2), it is referred to any molecule. In specific embodiments the term "agent" as used herein relates to a small molecule, a polypeptide (e.g., an antibody) or to a nucleic acid or to any combination thereof. In further specific embodiments the agent as herein defined is a small molecule. In still further embodiments the agent as herein defined is a polypeptide. In other specific embodiments the agent as herein defined is an antibody.

By the term "identifying" as used herein it is meant to determine, find, select, or establish an agent that reduces binding of a clostridial neurotoxin to synaptic vesicle glycoprotein 2 (SV2).

The binding (or engagement, or association) of a clostridial neurotoxin to its SV2 receptor may be monitored by any method known to a person of skill in the art, inter alia as exemplified in the present invention. By the term "reduce" binding it is referred to any reduction, diminishing, inhibition, lessening in the binding of a clostridial neurotoxin to its SV2 receptor, by at least about 1%-100%, about 5%-95%, about 10%-90%, about 15%-85%, about 20%-80%, about 25%-75%, about 30%-70%, about 35%-65%, about 40%-60% or about 45%-55%. Said reduction, diminishing, inhibition, lessening in the binding of a clostridial neurotoxin to its SV2 receptor may also be by at least about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or about 100%.

As detailed above, the present invention provides a method for identifying an agent that reduces binding of a clostridial neurotoxin to SV2, wherein said method comprises, among others, the step of bringing into contact (contacting) a first fusion protein, said first fusion protein comprising a receptor binding domain of Botulinum neurotoxin (BoNT $H_C$ fragment) fused to a reporter protein, with a second protein, said second protein comprising the fourth luminal loop of the synaptic vesicle glycoprotein 2 (SV2) or fragment thereof fused to an expression facilitating domain.

By the term "fusion protein" it is meant that at least two protein (polypeptide) fragments of the same or different origin are connected, combined, or integrated by a peptide bond. The terms "polypeptide" and "protein" are used interchangeably.

The first fusion protein according to the present invention comprises a receptor binding domain of Botulinum neurotoxin (BoNT Hc fragment) fused to a reporter protein.

The present invention encompasses a first fusion protein that comprises an Hc fragment of Botulinum neurotoxin of any serotype, for example the receptor binding domain of Botulinum neurotoxin A, B, C, D, E, F, G and H. In specific embodiments the present invention relates to a first fusion protein comprising a receptor binding domain of Botulinum neurotoxin A (BoNT/A Hc fragment). In further specific embodiments the present invention relates to a first fusion protein comprising a receptor binding domain of Botulinum neurotoxin A (BoNT/A Hc fragment) having the amino acid sequence which is at least 70%, 75%, 80%, 85%, 905, 95%, 96%, 97%, 98%, 99% or 100% identical to the amino acid sequence as denoted by SEQ ID NO. 2.

By the term "reporter protein" it is referred to any protein or polypeptide that allows determining, analyzing, or monitoring the binding of a clostridial neurotoxin to its SV2 receptor. Examples of reporter proteins include but are not limited to the beta-galactosidase domain, green fluorescent protein (GFP), luciferase, or a protein tag that can be detected with antibodies, such as FLAG-tag, HA-tag.

In some embodiments the method according to the present invention is wherein said reporter protein is situated N-terminal to said BoNT $H_C$ fragment. In certain specific embodiments the method according to the present invention is wherein said reporter protein is a beta-galactosidase domain.

As known in the art, by the term "beta-galactosidase domain" as used herein it is referred to β-galactosidase, also called lactase, beta-gal, or β-gal, which is a glycoside hydrolase enzyme that catalyzes the hydrolysis of β-galactosides into monosaccharides through the breaking of a glycosidic bond. Substrates of different β-galactosidases include ganglioside GM1, lactosylceramides, lactose, and various glycoproteins.

In specific embodiments the beta-galactosidase domain is derived from *E. coli.*

In further specific embodiments the reporter protein according to the present invention is a beta-galactosidase domain which is at least 70%, 75%, 80%, 85%, 90%, 95%, 96%, 97%, 98%, 99% or 100% identical to the amino acid sequence having an amino acid sequence denoted by SEQ ID NO. 1.

In some embodiments, the first fusion protein according to the present invention comprises, from an amino-terminal position to a carboxyl-terminal position, a reporter protein (e.g., a beta-galactosidase domain) and a receptor binding domain of Botulinum neurotoxin (e.g., BoNT/A $H_C$ fragment).

In further specific embodiments, the first fusion protein according to the present invention comprises, from an amino-terminal position to a carboxyl-terminal position, a beta-galactosidase domain which is at least 70%, 75%, 80%, 85%, 90%, 95%, 96%, 97%, 98%, 99% or 100% identical to the amino acid sequence having the amino acid sequence as denoted by SEQ ID NO. 1 and a receptor binding domain of Botulinum neurotoxin A having the amino acid sequence which is at least 70%, 75%, 80%, 85%, 90%, 95%, 96%, 97%, 98%, 99% or 100% identical to the amino acid sequence as denoted by SEQ ID NO. 2.

The first fusion protein according to the present invention may further comprise additional amino acid sequences, domains, or fragments. In some embodiments the method according to the present invention is wherein said first fusion protein further comprises a linker situated between said reporter protein and said BoNT $H_C$ fragment.

By the term "linker" it is meant to refer to a chain of at least one, two, three, four, five, six, seven, eight, nine, ten or more amino acid residues, such as 2-15, 3-12, 4-10, 5-10 amino acid residue-long fragment, comprising for example flexible amino acids, such as Glycine (Gly, G), Alanine (Ala, A), Glutamic acid (Glu, E), Lysine (Lys, K) to name but few. The linker can be flexible, having, for example, a sequence such as $(GGGGS)_4$ denoted by SEQ ID NO. 31 or $G_n$ (n=5-10). The linker can also be rigid, with a defined structure, having, for example, a sequence of $(EAAAK)_n$ (n=1-3) wherein the sequence of the monomeric unit EAAAK is denoted herein by SEQ ID NO. 32, or for example $A(EAAAK)_4ALEA(EAAAK)_4A$ denoted by SEQ ID NO. 33.

In specific embodiments the present invention relates to a linker which has the amino acid sequence of GGGGSGGGGSGGGGS as denoted herein by SEQ ID NO. 3.

TABLE 1 amino acid sequences of exemplary linkers

| SEQ ID NO. | Sequence | Comment |
|---|---|---|
| 3 | GGGGSGGGGSGGGGS | Linker 1 |
| 31 | GGGGS GGGGS GGGGS GGGGS | Linker 2 |
| 32 | EAAAK | Linker 3 |

TABLE 1-continued

| amino acid sequences of exemplary linkers | | |
|---|---|---|
| SEQ ID NO. | Sequence | Comment |
| 33 | AEAAAKEAAAKEAAAKEAAAKALEAEAAAKEA AAKEAAAKEAAAKA | Linker 4 |

In additional embodiments the first fusion protein according to the present invention further comprises at least one heterologous amino acid sequence at its N- and/or C-terminus. By the term "heterologous amino acid sequence" it is meant to refer to an amino acid sequence that is non-native to either one of the protein components of the first fusion protein of the present invention.

In some embodiments the method according to the present invention is wherein said first fusion protein further comprises at least one heterologous amino acid sequence at its N- and/or C-terminus. In other specific embodiments the method according to the present invention is wherein said first fusion protein comprises a His tag sequence at its C-terminus. In the above and other embodiments, the present invention relates to a heterologous amino acid sequence which has the amino acid sequence of HHHHHH as denoted herein by SEQ ID NO. 4.

By the term "at least one" it is referred to one, two, three, four, five, six, seven, eight, nine, ten or more amino acid residues.

In further specific embodiments the first fusion protein according to the present invention comprises an amino acid sequence having at least 70%, 75%, 80%, 85%, 90%, 95%, 96%, 97%, 98%, 99% or 100% identity with the sequence denoted by 5.

In certain specific embodiments the method according to the present invention is wherein said first fusion protein comprises a receptor binding domain of Botulinum neurotoxin A (BoNT/A $H_C$ fragment) having an amino acid sequence which is at least 70%, 75%, 80%, 85%, 90%, 95%, 96%, 97%, 98%, 99% or 100% identical to the sequence denoted by SEQ ID NO. 2 and a reporter protein which is a beta-galactosidase domain having an amino acid sequence which is at least 70%, 75%, 80%, 85%, 90%, 95%, 96%, 97%, 98%, 99% or 100% identical to the sequence denoted by SEQ ID NO. 1.

In some specific embodiments the method according to the present invention is wherein said first fusion protein comprises a receptor binding domain of Botulinum neurotoxin A (BoNT/A Hc fragment) having the amino acid sequence denoted by SEQ ID NO. 2 and a reporter protein which is a beta-galactosidase domain having the amino acid sequence denoted by SEQ ID NO. 1.

In other specific embodiments the method according to the present invention is wherein said first fusion protein comprises from an amino-terminal position to a carboxyl-terminal position a reporter protein which is a beta-galactosidase domain having the amino acid sequence denoted by SEQ ID NO. 1, a linker having the amino acid sequence denoted by SEQ ID NO. 3, a receptor binding domain of Botulinum neurotoxin A (BoNT/A Hc fragment) having the amino acid sequence denoted by SEQ ID NO. 2 and a His tag having the amino acid sequence denoted by SEQ ID NO. 4.

In further embodiments the method according to the present invention is wherein said first fusion protein comprises an amino acid sequence which is at least 70%, 75%, 80%, 85%, 90%, 95%, 96%, 97%, 98%, 99% or 100% identical to the sequence denoted by SEQ ID NO. 5.

In the above and other embodiments, the method according to the present invention is wherein said first fusion protein comprises or consists of the amino acid sequence denoted by SEQ ID NO. 5.

As detailed above, the method for identifying an agent that reduces binding of a clostridial neurotoxin to SV2 provided by the present invention, comprises bringing into contact a first fusion protein as herein described with a second protein. The second protein comprises the fourth luminal loop of the synaptic vesicle glycoprotein 2 (SV2) or fragment thereof optionally fused to an expression facilitating domain.

As detailed above, the term receptor synaptic vesicle glycoprotein 2 (SV2) refers to a family of transporter-like proteins located in synaptic neurotransmitter-containing vesicles, of the three isoforms SV2A, SV2B, and SV2C. In specific embodiments the second protein according to the present invention comprises SV2C, SV2A or SV2B or a fragment thereof. In other specific embodiments the second protein according to the present invention comprises the receptor SV2C or a fragment thereof.

As detailed below, a fusion protein comprising the SV2C fragment referred to as the "fourth luminal loop of the synaptic vesicle glycoprotein 2C ((SV2C)" was prepared by the inventors.

By the term, the "fourth luminal loop of the synaptic vesicle glycoprotein 2 (SV2)" it is referred to the binding site of BoNT/A and/or BoNT/E on SV2, which was shown to be located on amino acids 529-566 of SV2C. Therefore, the term "fourth luminal loop of SV2" is defined as comprising a contiguous sequence of amino acids in SV2 encompassing the binding site of BoNT/A and BoNT/E, or any fragments of said fourth luminal loop of SV2 that maintain the binding ability to the toxin. Preparation of a fusion protein comprising the fourth luminal loop of SV2C is known to a person of skill in the art, for example based on the examples below.

In still further specific embodiments, the present invention relates to a second protein comprising the fourth luminal loop of the synaptic vesicle glycoprotein 2. In other specific embodiments the present invention relates to a second protein comprising the fourth luminal loop of the synaptic vesicle glycoprotein 2C. In still further specific embodiments, the second protein as herein defined comprises the fourth luminal loop of the synaptic vesicle glycoprotein 2C (SV2C) having the amino acid sequence which is at least 70%, 75%, 80%, 85%, 90%, 95%, 96%, 97%, 98%, 99% or 100% identical to the amino acid sequence denoted by SEQ ID NO. 13.

In specific embodiments the method according to the present invention is wherein said second protein comprises the fourth luminal loop of the BoNT receptor SV2C having the amino acid sequence denoted by SEQ ID NO. 13.

As indicated above the second protein comprises the fourth luminal loop of the synaptic vesicle glycoprotein 2 (SV2) or fragment thereof optionally fused to an expression facilitating protein. In certain embodiments, said second protein is a fusion protein comprising the fourth luminal loop of the synaptic vesicle glycoprotein 2 (SV2) or fragment thereof fused to an expression facilitating protein. The term "expression facilitating protein" or "expression facilitating domain" refers to any protein that facilitates the recombinant expression and/or purification of the fourth luminal loop of the synaptic vesicle glycoprotein 2 (SV2) or fragment thereof. Any expression facilitating protein known in the art is encompassed by the present invention. Commonly used expression facilitating proteins include but are not limited to glutathione-s-transferase domain (GST), Thioredoxin (Trx), maltose binding protein (MBP) and poly (NANP). The preparation of such fusion proteins is within the skills of a person of ordinary skill in the art.

As exemplified herein the second protein as herein defined comprises the synaptic vesicle glycoprotein 2 (SV2) or fragment thereof fused to an expression facilitating protein which is a glutathione-s-transferase domain (GST).

Therefore, in specific embodiments the expression facilitating protein according to the present invention is a glutathione-s-transferase (GST).

By the term glutathione-s-transferase domain (GST) as known in the art and as herein defined it is referred to a family of eukaryotic and prokaryotic phase II metabolic isozymes best known for their ability to catalyze the conjugation of the reduced form of glutathione (GSH) to xenobiotic substrates for the purpose of detoxification.

In some embodiments the second protein as herein defined is a fusion protein which comprises GST having the amino acid sequence which is at least 70%, 75%, 80%, 85%, 90%, 95%, 96%, 97%, 98%, 99% or 100% identical to the amino acid sequence denoted herein by SEQ ID NO. 12.

In further specific embodiments the method according to the present invention is wherein said second protein is a fusion protein that comprises an amino acid sequence which is at least 70%, 75%, 80%, 85%, 90%, 95%, 96%, 97%, 98%, 99% or 100% identical to the sequence denoted by SEQ ID NO. 15.

In still further embodiments the method as herein defined is wherein said second protein is a fusion protein that comprises or consists of the amino acid sequence denoted by SEQ ID NO. 15.

The term "protein" or "polypeptide" as used interchangeably herein and as known in the art refers to a molecular chain of amino acid residues, which can be optionally modified at one or more of its amino acid residues, for example by manosylation, glycosylation, amidation (for example C-terminal amides), carboxylation or phosphorylation. The polypeptide of the present disclosure may be obtained synthetically, through genetic engineering methods, expression in a host cell, or through any other suitable means as known to those of skill in the art. Methods for producing peptides or polypeptides are well known in the art, for example as exemplified below.

Amino acids as used herein, encompass both naturally occurring and synthetic amino acid residues, as well as amino acid analogs and amino acid mimetics. Naturally occurring amino acids are those encoded by the genetic code, as well as those amino acids that are later modified, e.g., hydroxyproline, γ-carboxyglutamate and O-phosphoserine. The term amino acid encompasses L-amino acids and D-amino acids, which are mirror images of L-amino acids, where the chirality at carbon alpha has been inverted.

The terms "amino acid sequence" or "polypeptide sequence" also relate to the order in which amino acid residues, connected by peptide bonds, lie in the chain in peptides and proteins. The sequence is generally reported from the N-terminal end containing free amino group to the C-terminal end containing free carboxyl group.

As indicated above the present invention encompasses sequences which is at least 70% identical to a reference indicated sequence by at least 70%, 75%, 80%, 85%, 90%, 95%, 96%, 97%, 98%, 99% or 100% identity to the sequence indicated as a reference sequence.

Thus, the present invention encompasses derivatives of the amino acid and nucleic acid disclosed herein namely fusion proteins, polypeptides or nucleic acid sequences which comprise any one of the amino acid sequences denoted herein but differ in one or more amino acid or nucleic acid residues in their overall sequence, namely, which have deletions, substitutions (e.g., replacement of at least one amino acid by another amino acid), inversions or additions within the overall sequence. This also encompasses the replacement of at least one amino acid residue in the overall sequence by its respective D amino acid residue.

By way of example, amino acid "substitutions" are the result of replacing one amino acid with another amino acid, for example with another amino acid that has similar structural and/or chemical properties (conservative amino acid replacements). Amino acid substitutions may be made based on similarity in polarity, charge, solubility, hydrophobicity, hydrophilicity, and/or the amphipathic nature of the residues involved. For example, each of the following eight groups contains amino acids that are conservative substitutions for one another:

1) Alanine (A), Glycine (G);
2) Aspartic acid (D), Glutamic acid (E);
3) Asparagine (N), Glutamine (Q);
4) Arginine (R), Lysine (K);
5) Isoleucine (I), Leucine (L), Methionine (M), Valine (V);
6) Phenylalanine (F), Tyrosine (Y), Tryptophan (W);
7) Serine (S), Threonine (T); and
8) Cysteine (C), Methionine (M).

Measuring the binding between the first fusion protein to the second protein as herein defined may be performed by any method known in the art, for example as exemplified below. Particularly, measuring the binding between the first fusion protein to the second protein as herein defined may be performed by exposure to an appropriate substrate, in such a manner as to produce a chemical moiety which can be detected, for example, by spectrophotometric, fluorometric or by visual means.

For example, according to the method provided by the present disclosure, the resulting binding measured between the first fusion protein to the second protein as herein defined is compared to the binding performed in a control measurement in the absence of the sample as herein defined, wherein a lower binding than that of the control measurement indicates that said agent reduces binding of a clostridial neurotoxin to SV2.

By the term "control measurement" it is meant that the method is performed in the absence of the sample. In other words, the control measurement relates to measuring the binding between the first fusion protein and the second protein as herein defined under such conditions that allow binding to occur between the two fusion proteins.

In some embodiments the method according to the present invention is wherein at least one of said first fusion protein and said second protein is immobilized onto a solid surface.

By the term "solid surface" it is meant to refer to a solid phase support, solid phase carrier, solid support, solid carrier, support, or carrier namely any support or carrier capable of binding at least one of said first fusion protein and said second protein. Well-known supports or carriers include glass, polystyrene, polypropylene, polyethylene, dextran, nylon amylases, natural and modified celluloses, polyacrylamides, and magnetite. The nature of the carrier can be either soluble to some extent or insoluble for the purposes of the present invention. The support material may have virtually any possible structural configuration so long as the coupled molecule is capable of binding to an antigen or antibody. Thus, the support or carrier configuration may be spherical, as in a bead, cylindrical, as in the inside surface of a test tube, or the external surface of a rod. Alternatively, the surface may be flat such as a sheet, test strip, etc. Preferred supports or carriers include polystyrene beads. Those skilled in the art will know many other suitable carriers for binding at least one of said first fusion protein and said second protein or will be able to ascertain the same by use of routine experimentation.

In further embodiments the method according to the present invention is wherein said second protein is immobilized onto a solid surface.

As detailed above, measuring the binding between the first fusion protein to the second protein as herein defined may be performed by any method known in the art. In certain embodiments the method according to the present invention is wherein said step of measuring the binding comprises adding at least one substrate of the reporter protein of said first fusion protein.

By the term "substrate" in the context of the present invention it is meant to include any molecule which will react with the reporter protein in such a manner to produce a chemical moiety which can be detected, for example, by spectrophotometric, fluorometric, luminometric, or by visual means.

As detailed above, when the reporter protein is a beta-galactosidase domain, detection of receptor-bound $H_C$ fragment may be accomplished by the addition of beta-galactosidase substrates, namely the chromogenic substrate ortho-nitrophenyl-ß-galactoside (oNPG) or the fluorogenic substrate 4-methylumbelliferyl-ß-galactoside (4-MUG).

Therefore, if the reporter protein used is a beta-galactosidase domain, the substrate may be any molecule cleaved thereby, for example but not limited to ortho-nitrophenyl-ß-galactoside (oNPG), 4-methylumbelliferyl-ß-galactoside (4-MUG), fluorescein Di-ß-D-Galactopyranoside or naphthofluorescein di-(beta-D-galactopyranoside).

In other exemplary embodiments, the reporter protein is Beta-galactosidase and the substrate(s) thereof is oNPG/4-MUG, in further exemplary embodiments, the reporter protein is Luciferase and the substrate thereof is luciferin, in still further embodiments the reporter protein is FLAG-tag/HA-tag and the substrate is detected using as anti-FLAG/anti HA antibodies and in further exemplary embodiments, the reporter protein is GFP without requiring any substrate.

In specific embodiments the method as herein defined is wherein the reporter protein is beta-galactosidase domain and the at least one substrate is 4-methylumbellyferyl-galactopyranoside (4-MUG) or ortho-nitrophenyl-galactopyranoside (oNPG).

In an additional aspect, the present invention provides a method for identifying at least one agent that reduces binding of Botulinum neurotoxin A (BoNT/A) to the synaptic vesicle glycoprotein 2C (SV2C), wherein said method comprises the following steps:

(a) contacting a first fusion protein, said first fusion protein comprising BoNT/A Hc fragment and a beta-galactosidase domain with at least one sample potentially comprising said agent, thereby obtaining a mixture;
(b) contacting said mixture obtained in step (a) with a second protein optionally attached to a surface, said second protein comprising the fourth luminal loop of the synaptic vesicle glycoprotein 2C (SV2C) and optionally a glutathione-s-transferase domain (GST);
(c) adding at least one substrate of the beta-galactosidase domain of said first fusion protein; and
(d) determining the signal;

wherein a signal lower than a threshold signal indicates that said agent reduces binding of BoNT/A to SV2C.

By the term "signal" as used herein it is meant to encompass any detectable indication or sign for the activity of the reporter protein (or residual activity as termed in the examples below), resulting from the metabolites formed during activity of the reporter protein on the substrate thereof. The signal may be, for example, a fluorescent signal or colorimetric signal depending on the nature of the substrate and resulting metabolite.

The signal obtained upon adding at least one substrate of the reporter protein, for example of the beta-galactosidase domain, may be determined or measured by any method known in the art (e.g., using a spectrophotometer) based on the type of substrate (and resulting metabolite) used. For example, when the product of the substrate is fluorescent (e.g., as in the case of the substrate 4-MUG) the signal is fluorescence and when the metabolite of the substrate is colorimetric (e.g., as in the case of the substrate oNPG), the signal is colorimetric.

The term "threshold signal" as herein defined refers to a positive control signal or residual activity of the reporter protein, namely to a signal obtained in the absence of an agent, under conditions that allow binding of the first fusion protein as herein defined, which comprises a BoNT Hc fragment to the second protein as herein defined, which comprises SV2 or any fragment thereof. Threshold signal (or positive control) may be determined under the conditions described herein, based on the signal obtained upon adding at least one substrate of the reporter protein (e.g., a beta-galactosidase domain).

As detailed above, by using the method defined herein the inventors were able to screen a compound library and discover several compounds that inhibited BoNT/A binding to its receptor SV2C. As shown below, for these compounds a signal lower than the threshold signal was obtained. Briefly, as shown in Table 4 below, wells in column 12 (E-H) were all positive control ("no-compound" wells or threshold signal). While in most of the wells a similar signal (also termed "residual activity value" in the examples below) was obtained, a substantially lower signal (residual activity) was present in well F5, and therefore it contained a potential inhibitor of the binding between the ß-gal-$H_C$/A fusion protein and the SV2C fusion receptor protein, namely a potential inhibitor of botulinum toxin A binding to the SV2C receptor.

The term "lower" or "lower signal" in the context of the present invention means a signal decreased, reduced, lessened, or diminished by at least about 1%-100%, about 5%-95%, about 10%-90%, about 15%-85%, about 20%-80%, about 25%-75%, about 30%-70%, about 35%-65%, about 40%-60% or about 45%-55%. Said decreased, reduced, lessened or diminished signal may also be by at least about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or about 100%.

When performing the method as herein described, a signal lower than a threshold signal indicates that said agent reduces binding of a clostridial neurotoxin (e.g., BoNT/A) to SV2 (e.g., SV2C). In other words, when a signal (e.g., fluorescence or colorimetric) lower than a threshold signal (e.g., fluorescence or colorimetric, respectively) indicates that said agent reduces binding of a clostridial neurotoxin to SV2 (e.g., BoNT/A to SV2C).

In some embodiments the method according to the present invention further comprises at least one washing step with a wash solution between steps (b) and (c). The preparation of a wash solution may be determined by a person of skill in the art, for example based on the examples below.

In other embodiments the method according to the present invention further comprises adding a stop solution after step (c). The preparation of a stop solution may be determined by a person of skill in the art, for example based on the examples below.

In certain embodiments the method according to the present invention is wherein said first fusion protein is contacted with at least one sample for one hour at room temperature. In other embodiments the method according to the present invention is wherein said second protein is contacted with said mixture obtained in step (a) for one hour at 37° C.

As detailed herein, by using the method described herein the inventors were able to screen a compound library in a high-throughput screening (HTS) approach and discover several compounds that inhibited BoNT/A binding to its receptor SV2C. Therefore, in some embodiments the method according to the present invention is wherein said method is used for high-throughput screening (HTS).

By the term "high-throughput screening (HTS)" it is referred to rapid, robust, reliable, and miniaturized methods to test thousands of compounds on a target in a short period, in an attempt to find active drugs. HTS relates to the identification of active compounds within large compound libraries.

As detailed above measuring the binding between the first fusion protein to the second protein as herein defined is performed according to the method provide by the present invention in the presence of a sample potentially comprising an agent.

The term "sample" is used in its broadest sense. In one sense it can refer to a culture obtained from any source, as well as biological and environmental samples. Biological samples may be obtained from plants or animals (including humans) and encompass fluids, solids, tissues, and gases. These examples are not to be construed as limiting the sample types applicable to the present invention. In specific embodiment the sample as used herein is a solution comprising an agent or a biological sample obtained from a subject.

In certain embodiments, the method of the invention may be particularly suitable for examination of a biological sample obtained from a subject, such as blood, lymph, serum, milk, plasma, plural effusion, urine, faeces, semen, saliva, brain extracts, spinal cord fluid (SCF), appendix, spleen, and tonsillar tissue extracts.

In some non-limiting examples, the sample encompassed by the present invention may be a blood, fractionated blood or plasma sample obtained from a subject that has been previously administered with a Botulinum neurotoxin A.

As known in the art, injections of Botulinum neurotoxin A (also referred to as "BOTOX") are available for cosmetic and medical purposes (such as uncontrolled muscle spasms). Botox is used for three main purposes: muscle spasm control, severe underarm sweating, and cosmetic improvement. Injection of BOTOX (BoNT/A) during a cosmetic or medical procedure may result in generating neutralizing antibodies in the subject's body, such that will eventually neutralize the action of further injections of BoNT/A and render the cosmetic or medical procedure comprising thereof non-useful to the subject being treated.

By specifically applying the method as herein defined on a sample obtained from a subject that has been previously administered with BOTOX (Botulinum neurotoxin A), the method herein defined may be used for diagnosis of neutralizing antibodies in samples obtained from a subject that has been previously administered with a botulinum neurotoxin A.

Therefore, in some embodiments the method as herein defined is for identifying a neutralizing antibody directed against BoNT/A in a biological sample.

In certain embodiments the method according to the present invention is wherein said sample is a biological sample obtained from a subject and wherein said agent is an antibody.

By the term "subject" as used herein it is referred to warm-blooded animals, such as for example rats, mice, dogs, cats, guinea pigs, primates, and humans. In certain embodiments, the subject as referred by the present invention is a subject that has been previously administered with BOTOX (Botulinum neurotoxin A) for at least one of muscle spasm control, severe underarm sweating, and cosmetic improvement.

The present invention therefore encompasses a method for selecting a subject suitable for repeated BoNT/A injection. By the term "selecting" it is meant applying the methods as herein defined to identify a neutralizing antibody directed against BoNT/A in a biological sample obtained from the subject, wherein such neutralizing antibody is detected, the subject is considered not suitable for repeated BoNT/A injection.

The term "antibody" refers to a polypeptide encoded by an immunoglobulin gene or functional fragments thereof that specifically binds and recognizes an antigen, namely botulinum toxin. Methods for identifying antibodies are known to those of skill in the art.

By another one of its aspects the present invention provides a kit comprising:

(a) a first fusion protein, said first fusion protein comprising a receptor binding domain of Botulinum neurotoxin (BoNT Hc fragment) fused to a reporter protein or a composition comprising said first fusion protein and a suitable carrier or excipient;

(b) a second protein, said second protein comprising the fourth luminal loop of the synaptic vesicle glycoprotein 2 (SV2) or fragment thereof optionally fused to an expression facilitating domain or a composition comprising said second protein and a suitable carrier or excipient; optionally, said second protein is attached to a solid surface; and optionally (c) instructions for use.

In certain embodiments the kit according to the invention is for use in identifying an agent that reduces binding of a clostridial neurotoxin (for example Botulinum neurotoxin A, E, D, F, or tetanus neurotoxin) to synaptic vesicle glycoprotein 2 (SV2).

In some embodiments the kit according to the present invention is wherein said reporter protein is a beta-galactosidase domain.

In other embodiments the kit according to the present invention further comprises at least one substrate as herein defined for said beta-galactosidase domain.

In further embodiments the kit according to the present invention is wherein said first fusion protein comprises a receptor binding domain of Botulinum neurotoxin A (BoNT/A Hc fragment).

In still further embodiments the kit according to the present invention is wherein said second protein comprises the BoNT receptor synaptic vesicle glycoprotein 2C (SV2C).

In specific embodiments the kit according to the present invention is wherein said expression facilitating domain is a glutathione-s-transferase (GST).

In certain embodiments the kit according to the present invention is wherein said first fusion protein comprises an amino acid sequence which is at least 70% identical to the sequence denoted by SEQ ID NO. 5.

In some embodiments the kit according to the present invention is wherein said first fusion protein comprises or consists of the amino acid sequence as denoted by SEQ ID NO. 5.

In other embodiments the kit according to the present invention is wherein said second protein comprises the fourth luminal loop of SV2C having the amino acid sequence denoted by SEQ ID NO. 13.

In further embodiments the kit according to the present invention is wherein said second protein is a fusion protein comprising an amino acid sequence which is at least 70% identical to the sequence denoted by SEQ ID NO. 15.

In still further embodiments the kit according to the present invention is wherein said second protein is a fusion protein comprising or consisting of the amino acid sequence denoted by SEQ ID NO. 15.

In certain embodiments the kit according to the present invention is wherein said at least one substrate is 4-methylumbellyferyl-galactopyranoside (4-MUG) or ortho-nitrophenyl-galactopyranoside (oNPG).

By another one of its aspects the present invention provides an isolated fusion protein comprising the receptor binding domain of Botulinum neurotoxin and a reporter protein as herein defined.

The term "isolated" refers to molecules, such as the amino acid sequences described herein, peptides or polypeptides that are removed from their natural environment, isolated, or separated.

In certain embodiments the isolated fusion protein according to the present invention comprises the receptor binding domain of Botulinum neurotoxin A (BoNT/A Hc fragment), Botulinum neurotoxin E (BoNT/E Hc fragment), Botulinum neurotoxin D (BoNT/D $H_C$ fragment) or of Botulinum neurotoxin F (BoNT/F $H_C$ fragment).

In specific embodiments the isolated fusion protein according to the present invention is wherein said isolated fusion protein comprises the receptor binding domain of Botulinum neurotoxin A (BoNT/A $H_C$ fragment).

In other embodiments the isolated fusion protein according to the present invention is wherein said reporter protein is a beta-galactosidase domain as herein defined.

In further embodiments the isolated fusion protein according to the present invention is wherein said beta-galactosidase domain is situated N-terminal to said BoNT/A $H_C$ fragment.

In still further embodiments the isolated fusion protein according to the present invention is wherein said isolated fusion protein further comprises a linker as herein defined situated between said beta-galactosidase domain and said BoNT $H_C$ fragment.

In certain embodiments the isolated fusion protein according to the present invention is wherein said isolated fusion protein further comprises at least one heterologous amino acid sequence as herein defined at its N- and/or C-terminus.

In specific embodiments the isolated fusion protein according to the present invention is wherein said isolated fusion protein comprises a His tag sequence as herein defined at its C-terminus.

In certain embodiments the isolated fusion protein according to the present invention is wherein said isolated fusion protein comprises the BoNT/A $H_C$ fragment having an amino acid sequence which is at least 70% identical to the sequence denoted by SEQ ID NO. 2 and wherein said reporter protein is a beta-galactosidase domain having the amino acid sequence which is at least 70% identical to the sequence denoted by SEQ ID NO. 1.

In certain embodiments the isolated fusion protein according to the present invention is wherein said isolated fusion protein comprises the BoNT/A $H_C$ fragment having the amino acid sequence denoted by SEQ ID NO. 2 and wherein said reporter protein is a beta-galactosidase domain has the amino acid sequence denoted by SEQ ID NO. 1.

In specific embodiments the isolated fusion protein according to the present invention is wherein said isolated fusion protein comprises from an amino-terminal position to a carboxyl-terminal position a beta-galactosidase domain having the amino acid sequence denoted by SEQ ID NO. 1, a linker having the amino acid denoted by SEQ ID NO. 3, a receptor binding domain of Botulinum neurotoxin A (BoNT/A $H_C$ fragment) having the amino acid sequence denoted by SEQ ID NO. 2 and a His tag having the amino acid sequence denoted by SEQ ID NO. 4.

In some embodiments the isolated fusion protein according to the present invention is wherein said isolated fusion protein comprises an amino acid sequence which is at least 70% identical to the sequence denoted by SEQ ID NO. 5.

In other embodiments the isolated fusion protein according to the present invention is wherein said isolated polypeptide comprises or consists of the amino acid sequence denoted by SEQ ID NO. 5.

The present invention further provides an isolated nucleic acid sequence encoding the fusion protein as herein defined.

The term "nucleic acid" or "nucleic acid molecule" as herein defined refers to polymer of nucleotides, which may be either single- or double-stranded, which is a polynucleotide such as deoxyribonucleic acid (DNA), and, where appropriate, ribonucleic acid (RNA). The terms should also be understood to include, as equivalents, analogs of either RNA or DNA made from nucleotide analogs, and, as applicable to the embodiment being described, single-stranded (such as sense or antisense) and double-stranded polynucleotides. The term DNA used herein also encompasses cDNA, i.e. complementary or copy DNA produced from an RNA template by the action of reverse transcriptase (RNA-dependent DNA polymerase).

Still further the present invention provides a vector comprising the nucleic acid sequence as herein defined.

The term "vector" sometimes referred to as "expression vehicle", "expression construct", or "expression vector" as used herein, encompasses vectors such as plasmids, viruses, bacteriophage, DNA fragments capable of being integrated, and other vehicles, which enable the integration of DNA fragments into the genome of the host. Expression vectors are typically self-replicating DNA or RNA constructs containing the desired gene or its fragments, and operably linked genetic control elements that are recognized in a suitable host cell and effect expression of the desired genes. These control elements are capable of effecting expression within a suitable host. The expression vector in accordance with the invention may be competent with expression in bacterial, yeast, or mammalian host cells, to name but few.

The present invention further provides a host cell comprising the vector as herein defined.

The term "host cell" or the term "host cells" as used herein refers to cells which are susceptible to the introduction of the isolated nucleic acid molecule according to the present invention or with the expression vector according to the invention. Preferably, said cells are cells used in the present disclosure. Transfection of the isolated nucleic acid molecule or the expression vector according to the invention to the host cell may be performed by any method known in the art.

By still another one of its aspects the present invention provides a composition comprising the isolated fusion protein as herein defined and a suitable carrier or excipient.

The composition of the present invention generally comprises the first fusion protein and/or or the second protein as herein defined and a buffering agent, an agent which adjusts the osmolarity of the composition and optionally, one or more pharmaceutically acceptable carriers, excipients and/or diluents as known in the art. Supplementary active ingredients can also be incorporated into the compositions, e.g., antibiotics.

As used herein the term "suitable carrier or excipient" includes any solvents, dispersion media, coatings, antibacterial and antifungal agents and the like, as known in the art. The carrier can be solvent or dispersion medium containing, for example, water, ethanol, polyol (for example, glycerol, propylene glycol, and liquid polyethylene glycol, and the like), suitable mixtures thereof, and vegetable oils.

The term "about" as used herein indicates values that may deviate up to 1%, more specifically 5%, more specifically 10%, more specifically 15%, and in some cases up to 20% higher or lower than the value referred to, the deviation range including integer values, and, if applicable, non-integer values as well, constituting a continuous range.

It must be noted that, as used in this specification and the appended claims, the singular forms "a", "an" and "the" include plural referents unless the content clearly dictates otherwise.

Throughout this specification and the Examples and claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

Without further elaboration, it is believed that one skilled in the art can, using the preceding description, utilize the present disclosure to its fullest extent. The following preferred specific embodiments are, therefore, to be construed as merely illustrative, and not limitative of the claimed invention in any way.

EXAMPLES

Reference is now made to the following examples, which together with the above descriptions illustrate some embodiments of the invention in a non-limiting fashion.

Experimental Procedures

β-Gal-$H_C$/A Chimeric Protein Design

A chimeric (fusion) protein construct was prepared as described below, consisting of two proteins: (1) beta-galactosidase from *Escherichia coli*; and (2) the receptor binding domain of BoNT/A, also designated the "$H_C$ fragment" (or the C-terminal fragment of BoNT/A heavy chain). The fusion protein construct is referred to herein inter alia as the "ß-gal-$H_C$/A". The sequence of the beta-galactosidase protein originating from *E. coli* BL21 is publicly available, for example as detailed in gene bank code CAQ30819 and is denoted herein by SEQ ID NO. 1. The sequence of the $H_C$ fragment protein of BoNT/A originating from *Clostridium botulinum* strain 62A is publicly available, for example as detailed in gene bank code M30196, amino acids 872-1296, and is denoted herein by SEQ ID NO. 2. Beta-galactosidase (also referred herein as beta-gal or β-gal) was set (i.e. positioned) on the N-terminus of the chimeric protein construct and the $H_C$-fragment on its C-terminus. The two proteins were connected by a flexible linker with the sequence $(GGGGS)_3$, denoted herein by SEQ ID NO. 3, and a Hisx6 tag (denoted herein by SEQ ID NO. 4) was added to the C-terminus of the chimeric protein construct (namely C-terminal to the $H_C$-fragment) in order to facilitate its purification thereof using a nickel (Ni) column. The amino acid sequence of the chimeric protein construct prepared as described above is denoted by SEQ ID NO. 5 and a schematic presentation of the chimeric protein construct is shown in FIG. 1.

Genes of clostridial origin are AT rich and their codon usage is different from that of *E. coli*. Therefore, a synthetic gene with optimized codon usage for protein expression in *E. coli* was prepared (GenScript). The gene was cloned into the expression vector pET-9a to obtain the plasmid pET-9a-ß-gal-$H_C$/A. The nucleic acid sequence encoding the chimeric protein construct prepared as described above, which was inserted into the plasmid pET-9a-ß-gal-$H_C$/A, is denoted herein by SEQ ID NO. 9.

An *E. coli* nucleic acid sequence encoding the beta-galactosidase protein is denoted herein by SEQ ID NO. 6. A nucleic acid sequence encoding the beta-galactosidase protein with optimized codon usage for protein expression in *E. coli* is denoted herein by SEQ ID NO. 7 and a nucleic acid sequence encoding the $H_C$ fragment of BoNT/A is denoted herein by SEQ ID NO. 8.

The sequences detailed herein in connection with the preparation of the ß-gal-$H_C$/A fusion protein construct are detailed in Table 2 below.

TABLE 2

Sequences for the preparation of the β-gal-$H_C$/A polypeptide construct

| SEQ ID NO. | Sequence | Sequence name |
|---|---|---|
| 1 | MTMITDSLAVVLQRRDWENPGVTQLNRLAAHPPFAS<br>WRNSEEARTDRPSQQLRSLNGEWRFAWFPAPEAVPE<br>SWLECDLPEADTVVVPSNWQMHGYDAPIYTNVTYPI | Amino acid sequence of *E. coli* β-gal |

TABLE 2-continued

| Sequences for the preparation of the β-gal-$H_C$/A polypeptide construct | | |
|---|---|---|
| SEQ ID NO. | Sequence | Sequence name |
| | TVNPPFVPTENPTGCYSLTFNVDESWLQEGQTRIIFDG VNSAFHLWCNGRWVGYGQDSRLPSEFDLSAFLRAGE NRLAVMVLRWSDGSYLEDQDMWRMSGIFRDVSLLH KPTTQISDFHVATRFNDDFSRAVLEAEVQMCGELRDY LRVTVSLWQGETQVASGTAPFGGEIIDERGGYADRVT LRLNVENPKLWSAEIPNLYRAVVELHTADGTLIEAEA CDVGFREVRIENGLLLLNGKPLLIRGVNRHEHHPLHG QVMDEQTMVQDILLMKQNNFNAVRCSHYPNHPLWY TLCDRYGLYVVDEANIETHGMVPMNRLTDDPRWLPA MSERVTRMVQRDRNHPSVIIWSLGNESGHGANHDAL YRWIKSVDPSRPVQYEGGGADTTATDIICPMYARVDE DQPFPAVPKWSIKKWLSLPGETRPLILCEYAHAMGNS LGGFAKYWQAFRQYPRLQGGFVWDWVDQSLIKYDE NGNPWSAYGGDFGDTPNDRQFCMNGLVFADRTPHP ALTEAKHQQQFFQFRLSGQTIEVTSEYLFRHSDNELLH WMVALDGKPLASGEVPLDVAPQGKQLIELPELPQPES AGQLWLTVRVVQPNATAWSEAGHISAWQQWRLAEN LSVTLPAASHAIPHLTTSEMDFCIELGNKRWQFNRQS GFLSQMWIGDKKQLLTPLRDQFTRAPLDNDIGVSEAT RIDPNAWVERWKAAGHYQAEAALLQCTADTLADAV LITTAHAWQHQGKTLFISRKTYRIDGSGQMAITVDVE VASDTPHPARIGLNCQLAQVAERVNWLGLGPQENYP DRLTAACFDRWDLPLSDMYTPYVFPSENGLRCGTRE LNYGPHQWRGDFQFNISRYSQQQLMETSHRHLLHAE EGTWLNIDGFHMGIGGDDSWSPSVSAEFQLSAGRYH YQLVWCQK | protein |
| 2 | NIINTSILNLRYESNHLIDLSRYASKINIGSKVNFDPIDK NQIQLFNLESSKIEVILKNAIVYNSMYENFSTSFWIRIP KYFNSISLNNEYTIINCMENNSGWKVSLNYGEIIWTLQ DTQEIKQRVVFKYSQMINISDYINRWIFVTITNNRLNN SKIYINGRLIDQKPISNLGNIHASNNIMFKLDGCRDTH RYIWIKYFNLFDKELNEKEIKDLYDNQSNSGILKDFW GDYLQYDKPYYMLNLYDPNKYVDVNNVGIRGYMYL KGPRGSVMTTNIYLNSSLYRGTKFIIKKYASGNKDNIV RNNDRVYINVVVKNKEYRLATNASQAGVEKILSALEI PDVGNLSQVVVMKSKNDQGITNKCKMNLQDNNGND IGFIGFHQFNNIAKLVASNWYNRQIERSSRTLGCSWEF IPVDDGWGERPL | Amino acid sequence of *C. botulinum* BoNT/A $H_C$ fragment |
| 3 | GGGGSGGGGSGGGGS | Linker 1 |
| 4 | HHHHHH | 6His tag |
| 5 | MKTMITDSLAVVLQRRDWENPGVTQLNRLAAHPPFA SWRNSEEARTDRPSQQLRSLNGEWRFAWFPAPEAVP ESWLECDLPEADTVVVPSNWQMHGYDAPIYTNVTYP ITVNPPFVPTENPTGCYSLTFNVDESWLQEGQTRIIFD GVNSAFHLWCNGRWVGYGQDSRLPSEFDLSAFLRAG ENRLAVMVLRWSDGSYLEDQDMWRMSGIFRDVSLL HKPTTQISDFHVATRFNDDFSRAVLEAEVQMCGELRD YLRVTVSLWQGETQVASGTAPFGGEIIDERGGYADRV TLRLNVENPKLWSAEIPNLYRAVVELHTADGTLIEAE ACDVGFREVRIENGLLLLNGKPLLIRGVNRHEHHPLH GQVMDEQTMVQDILLMKQNNFNAVRCSHYPNHPLW YTLCDRYGLYVVDEANIETHGMVPMNRLTDDPRWLP AMSERVTRMVQRDRNHPSVIIWSLGNESGHGANHDA LYRWIKSVDPSRPVQYEGGGADTTATDIICPMYARVD EDQPFPAVPKWSIKKWLSLPGETRPLILCEYAHAMGN SLGGFAKYWQAFRQYPRLQGGFVWDWVDQSLIKYD ENGNPWSAYGGDFGDTPNDRQFCMNGLVFADRTPHP ALTEAKHQQQFFQFRLSGQTIEVTSEYLFRHSDNELLH WMVALDGKPLASGEVPLDVAPQGKQLIELPELPQPES AGQLWLTVRVVQPNATAWSEAGHISAWQQWRLAEN LSVTLPAASHAIPHLTTSEMDFCIELGNKRWQFNRQS GFLSQMWIGDKKQLLTPLRDQFTRAPLDNDIGVSEAT RIDPNAWVERWKAAGHYQAEAALLQCTADTLADAV LITTAHAWQHQGKTLFISRKTYRIDGSGQMAITVDVE VASDTPHPARIGLNCQLAQVAERVNWLGLGPQENYP DRLTAACFDRWDLPLSDMYTPYVFPSENGLRCGTRE LNYGPHQWRGDFQFNISRYSQQQLMETSHRHLLHAE EGTWLNIDGFHMGIGGDDSWSPSVSAEFQLSAGRYH YQLVWCQKGGGGSGGGGSGGGGSMNIINTSILNLRY ESNHLIDLSRYASKINIGSKVNFDPIDKNQIQLFNLESS KIEVILKNAIVYNSMYENFSTSFWIRIPKYFNSISLNNE | Amino acid sequences of the β-gal-$H_C$/A fusion protein construct |

TABLE 2-continued

Sequences for the preparation of the β-gal-$H_C$/A polypeptide construct

| SEQ ID NO. | Sequence | Sequence name |
|---|---|---|
| | YTIINCMENNSGWKVSLNYGEIIWTLQDTQEIKQRVV<br>FKYSQMINISDYINRWIFVTITNNRLNNSKIYINGRLID<br>QKPISNLGNIHASNNIMFKLDGCRDTHRYIWIKYFNLF<br>DKELNEKEIKDLYDNQSNSGILKDFWGDYLQYDKPY<br>YMLNLYDPNKYVDVNNVGIRGYMYLKGPRGSVMTT<br>NIYLNSSLYRGTKFIIKKYASGNKDNIVRNNDRVYINV<br>VVKNKEYRLATNASQAGVEKILSALEIPDVGNLSQVV<br>VMKSKNDQGITNKCKMNLQDNNGNDIGFIGFHQFNN<br>IAKLVASNWYNRQIERSSRTLGCSWEFIPVDDGWGER<br>PLHHHHHH | |
| 6 | atgaccatgattacggattcactggccgtcgttttacaacgtcgtgactgggaaaaccc<br>tggcgttacccaacttaatcgccttgcagcacatccccctttcgccagctggcgtaata<br>gcgaagaggcccgcaccgatcgcccttcccaacagttgcgcagcctgaatggcga<br>atggcgctttgcctggtttccggcaccagaagcggtgccggaaagctggctggagt<br>gcgatcttcctgaggccgatactgtcgtcgtcccctcaaactggcagatgcacggtta<br>cgatgcgcccatctacaccaacgtgacctatcccattacggtcaatccgccgtttgttc<br>ccacggagaatccgacgggttgttactcgctcacatttaatgttgatgaaagctggcta<br>caggaaggccagacgcgaattatttttgatggcgttaactcggcgtttcatctgtggtg<br>caacgggcgctgggtcggttacggccaggacagtcgtttgccgtctgaatttgacct<br>gagcgcatttttacgcgccggagaaaaccgcetcgcggtgatggtgctgcgctgga<br>gtgacggcagttatctggaagatcaggatatgtggcggatgagcggcattttccgtga<br>cgtctcgttgctgcataaaccgactacacaaatcagcgatttccatgttgccactcgctt<br>taatgatgatttcagccgcgctgtactggaggctgaagttcagatgtgcggcgagttg<br>cgtgactacctacgggtaacagtttctttatggcagggtgaaacgcaggtcgccagc<br>ggcaccgcgcctttcggcggtgaaattatcgatgagcgtggtggttatgccgatcgc<br>gtcacactacgtctgaacgtcgaaaacccgaaactgtggagcgccgaaatcccgaa<br>tctctatcgtgcggtggttgaactgcacaccgccgacggcacgctgattgaagcaga<br>agcctgcgatgtcggtttccgcgaggtgcggattgaaaatggtctgctgctgctgaac<br>ggcaagccgttgctgattcgaggcgttaaccgtcacgagcatcatcctctgcatggtc<br>aggtcatggatgagcagacgatggtgcaggatatcctgctgatgaagcagaacaact<br>ttaacgccgtgcgctgttcgcattatccgaaccatccgctgtggtacacgctgtgcga<br>ccgctacggcctgtatgtggtggatgaagccaatattgaaacccacggcatggtgcc<br>aatgaatcgtctgaccgatgatccgcgctggctaccggcgatgagcgaacgcgtaa<br>cgcgaatggtgcagcgcgatcgtaatcacccgagtgtgatcatctggtcgctgggga<br>atgaatcaggccacggcgctaatcacgacgcgctgtatogctggatcaaatctgtcg<br>atccttcccgcccggtgcagtatgaaggcggcggagccgacaccacggccaccga<br>tattatttgcccgatgtacgcgcgcgtggatgaagaccagcccttcccggctgtgccg<br>aaatggtccatcaaaaaatggctttcgctacctggagagacgcgcccgctgatccttt<br>gcgaatacgcccacgcgatgggtaacagtcttggcggtttcgctaaatactggcagg<br>cgtttcgtcagtatccccgtttacagggcggcttcgtctgggactgggtggatcagtcg<br>ctgattaaatatgatgaaaacggcaacccgtggtcggcttacggcggtgattttggcg<br>atacgccgaacgatcgccagttctgtatgaacggtctggtctttgccgaccgcacgcc<br>gcatccagcgctgacggaagcaaaacaccagcagcagtttttccagttccgtttatcc<br>gggcaaaccatcgaagtgaccagcgaatacctgttccgtcatagcgataacgagctc<br>ctgcactggatggtggcgctggatggtaagccgctggcaagcggtgaagtgcctct<br>ggatgtcgctccacaaggtaaacagttgattgaactgcctgaactaccgcagccgga<br>gagcgccgggcaactctggctcacagtacgcgtagtgcaaccgaacgcgaccgca<br>tggtcagaagccggacacatcagcgcctggcagcagtggcgtctggctgaaaacct<br>cagcgtgacactccecgccgcgtcccacgccatcccgcatctgaccaccagcgaaa<br>tggatttttgcatcgagctgggtaataagcgttggcaatttaaccgccagtcaggctttc<br>tttcacagatgtggattggcgataaaaaacaactgctgacgccgctgcgcgatcagtt<br>cacccgtgcaccgctggataacgacattggcgtaagtgaagcgacccgcattgacc<br>ctaacgcctgggtcgaacgctggaaggcggcgggccattaccaggccgaagcag<br>cgttgttgcagtgcacggcagatacacttgctgatgcggtgctgattacgaccgctca<br>cgcgtggcagcatcaggggaaaaccttatttatcagccggaaaacctaccggattga<br>tggtagtggtcaaatggcgattaccgttgatgttgaagtggcgagcgatacaccgcat<br>ccggcgcggattggcctgaactgccagctggcgcaggtagcagagcgggtaaact<br>ggctcggattagggccgcaagaaaactatcccgaccgccttactgccgcctgttttga<br>ccgctgggatctgccattgtcagacatgtataccccgtacgtcttcccgagcgaaaac<br>ggtctgcgctgcgggacgcgcgaattgaattatggcccacaccagtggcgcggcg<br>acttccagttcaacatcagccgctacagtcaacagcaactgatggaaaccagccatc<br>gccatctgctgcacgcggaagaaggcacatggctgaatatcgacggtttccatatgg<br>ggattggtggcgacgactcctggagcccgtcagtatcggcggaattccagctgagc<br>gccggtcgctaccattaccagttggtctggtgtcaaaaataa | Nucleic acid sequence encoding *E. coli* β-gal |
| 7 | catatgaaaaccatgattacggatagcctggccgtggttctgcaacgtcgcgactgg<br>gaaaatccgggtgtgacccagctgaaccgtctggccgcacatccgccgtttgctagtt<br>ggcgcaactccgaagaagcgcgtacggatcgcccgagccagcaactgcgttctctg<br>aatggcgaatggcgctttgcctggtttccggccccggaagccgttccggaaagctgg<br>ctggaatgcgatctgccggaagctgacaccgtcgtggttccgtctaactggcagatg<br>catggttatgatgcgccgatctacaccaatgtgacgtatccgattacggtgaacccgc<br>cgttcgttccgaccgaaaatccgacgggctgctatagcctgacctttaatgttgatgaa<br>tcttggctgcaggaaggtcaaacgcgtattatcttcgacggcgttaacagtgcctttca<br>cctgtggtgtaatggtcgttgggtcggttacggccaggattcacgcctgccgtcggaa | Optimized nucleic acid sequence encoding *E. coli* β-gal |

TABLE 2-continued

Sequences for the preparation of the β-gal-$H_C$/A polypeptide construct

| SEQ ID NO. | Sequence | Sequence name |
|---|---|---|
| | tttgacctgtccgcttttctgcgtgcgggcgaaaaccgcctggcagttatggtcctgcg<br>ctggtcagatggttcgtatctggaagatcaggacatgtggcgtatgtcaggcatcttcc<br>gcgatgtgtcgctgctgcataaaccgaccacgcagatttcagactttcacgttgcgac<br>ccgtttcaatgatgacttttcgcgcgccgtcctggaagcagaagtgcagatgtgcggt<br>gaactgcgtgattatctgcgcgtgacggtttcactgtggcagggtgaaacccaggtg<br>gctagcggcacggccccgtttggcggtgaaattatcgatgaacgtggcggttacgcg<br>gaccgtgtgaccctgcgtctgaacgttgaaaatccgaaactgtggagcgcagaaatt<br>ccgaacctgtatcgcgctgtcgtggaactgcataccgcggatggtacgctgatcgaa<br>gcagaagcttgtgacgttggcttccgtgaagtccgcattgaaaatggtctgctgctgct<br>gaacggcaaaccgctgctgatccgtggtgtgaatcgccatgaacatcacccgctgca<br>cggccaggtgatggatgaacagacgatggtgcaagacattctgctgatgaaacaga<br>acaattttaacgcggttcgttgcagtcattacccgaatcacccgctgtggtataccctgt<br>gtgatcgctatggtctgtacgttgtcgacgaagcgaacatcgaaacccacggcatgg<br>tgccgatgaatcgtctgaccgatgacccgcgctggctgccggcaatgagcgaacgt<br>gttacccgcatggtccagcgtgatcgcaaccacccgagtgttattatctggtccctgg<br>gcaatgaatcaggtcatggcgccaaccacgatgcactgtaccgttggattaaaagcg<br>tcgacccgtctcgcccggtgcagtatgaaggcggtggcgctgataccaccgccacc<br>gacattatctgcccgatgtacgctcgtgttgatgaagaccagccgtttccggcggtcc<br>cgaaatggtcaatcaaaaaatggctgagcctgccgggtgaaacccgtccgctgatcc<br>tgtgtgaatatgcgcatgcgatgggcaacagcctgggtggcttcgccaaatactggc<br>aggcatttcgtcaatatccgcgcctgcaaggtggcttcgtgtgggattgggttgacca<br>gagtctgattaaatacgatgaaaacggtaatccgtggtccgcgtatggcggcgatttt<br>ggcgacaccccgaatgatcgtcagttctgcatgaacggtctggtgtttgccgaccgta<br>ccccgcatccggcactgaccgaagcaaaacaccagcaacagtttttccagttccgtct<br>gtctggccaaaccattgaagtgacgagcgaatacctgttcgccattctgataacgaa<br>ctgctgcactggatggttgccctggacggtaaaccgctggcatcaggcgaagtccc<br>gctggatgtggctccgcagggtaaacaactgattgaactgccggaactgccgcagc<br>cggaaagcgcaggccaactgtggctgaccgtgcgtgtggttcagccgaacgcaac<br>ggcttggagcgaagctggtcatatctctgcgtggcaacagtggcgcctggccgaaa<br>atctgagtgttaccctgccggcagcttcccatgcaatcccgcacctgaccacgagcg<br>aaatggatttctgtattgaactgggcaataaacgttggcagttcaaccgccaaagtggt<br>tttctgtcccagatgtggattggcgataaaaaacaactgctgaccccgctgcgtgacc<br>agtttacccgtgccccgctggataacgacatcggtgtgtctgaagctacccgtattgat<br>ccgaatgcgtgggttgaacgctggaaagcggccggccattaccaggccgaagcag<br>ctctgctgcaatgtaccgcagataccctggccgatgcggtgctgattaccacggcac<br>atgcttggcagcaccaaggtaaaaccctgtttatcagccgtaaaacgtatcgcattgat<br>ggttctggccagatggcgattaccgtcgatgtggaagttgcaagcgacacgccgca<br>cccggcacgtattggtctgaattgtcagctggcacaagttgctgaacgtgtcaactgg<br>ctgggtctgggtccgcaggaaaattatccggatcgtctgaccgccgcatgctttgatc<br>gttgggacctgccgctgagcgatatgtataccccgtacgtgtttccgtctgaaaacggt<br>ctgcgttgtggcacgcgcgaactgaattacggtccgcatcagtggcgtggcgatttc<br>aattcaacattagccgctattctcaacagcaactgatggaaaccagccatcgtcacct<br>gctgcatgcggaagaaggtacgtggctgaatatcgatggtttccacatgggcattggt<br>ggcgatgacagctggtctccgagtgtttccgccgaatttcagctgtctgcaggccgct<br>atcattaccagctggtctggtgtcaaaaa | |
| 8 | aacattatcaataccagtatcctgaatctgcgttacgaatccaaccacctgattgatctg<br>tcacgctatgcctcgaaaatcaacatcggttcaaaagtgaacttcgatccgatcgaca<br>aaaatcagattcaactgtttaacctggaaagctctaaaattgaagtcatcctgaaaaac<br>gcgattgtgtataattccatgtacgaaaacttctcaacctcgttttggattcgtatcccg<br>aaatactttaacagcatctctctgaacaacgaatacacgatcatcaactgcatggaaaac<br>aatagtggttggaaagtgtccctgaactatggcgaaattatctggaccctgcaggata<br>cgcaagaaattaaacaacgtgtcgtgttcaaatacagtcagatgatcaacatctccgat<br>tacatcaaccgttggatctttgttaccattacgaacaatcgcctgaacaacagcaaaat<br>ctacatcaacggtcgcctgatcgatcagaaaccgatttcaaacctgggcaatatccat<br>gcgtcgaacaatattatgttcaaactggatggctgtcgtgacacccaccgctacatttg<br>gatcaaatacttcaacctgtttgataaagaactgaacgaaaaagaaatcaaagatctgt<br>atgacaaccagagtaattccggtattctgaaagatttttggggcgactatctgcagtac<br>gataaaccgtattacatgctgaatctgtacgatccgaacaaatatgtcgacgtgaacaa<br>tgtcggtattcgtggctatatgtacctgaaaggtccgcgcggcagcgtgatgaccacg<br>aacatctacctgaatagttccctgtaccgtggcaccaaattcatcatcaaaaaatacgc<br>ctctggcaacaaagataatatcgttcgtaacaatgaccgcgtctacatcaacgttgtcg<br>tgaaaaacaaagaataccgcctggcgaccaacgccagtcaggcaggtgtcgaaaa<br>aatcctgtccgcgctggaaattccggatgtgggcaacctgtcacaagttgtcgtgatg<br>aaatcgaaaaatgatcagggtattaccaataaatgcaaaatgaacctgcaggataaca<br>atggcaatgacattggttttatcggcttccatcagtttaacaatatcgctaaactggtgg<br>cgagtaactggtataatcgtcagattgaacgttcatcgcgcaccctgggctgttcctggg<br>aatttatcccggttgatgacggttggggcgaacgcccgctgcatcaccatcaccatca<br>ctaa | Nucleic acid sequence encoding BoNT/A $H_C$ fragment |
| 9 | catatgaaaaccatgattacggatagcctggccgtggttctgcaacgtcgcgactgg<br>gaaaatccgggtgtgacccagctgaaccgtctggccgcacatccgccgtttgctagtt<br>ggcgcaactccgaagaagcgcgtacggatcgcccgagccagcaactgcgttctctg<br>aatggcgaatggcgctttgcctggtttccggccccggaagccgttccggaaagctgg<br>ctggaatgcgatctgccggaagctgacaccgtcgtggttccgtctaactggcagatg | Nucleic acid sequence encoding the β-gal- |

TABLE 2-continued

Sequences for the preparation of the β-gal-$H_C$/A polypeptide construct

| SEQ ID NO. | Sequence | Sequence name |
|---|---|---|
| | catggttatgatgcgccgatctacaccaatgtgacgtatccgattacggtgaacccgc<br>cgttcgttccgaccgaaaatccgacgggctgctatagcctgacctttaatgttgatgaa<br>tcttggctgcaggaaggtcaaacgcgtattatcttcgacggcgttaacagtgcctttca<br>cctgtggtgtaatggtcgttgggtcggttacggccaggattcacgcctgccgtcggaa<br>tttgacctgtccgcttttctgcgtgcgggcgaaaaccgcctggcagttatggtcctgcg<br>ctggtcagatggttcgtatctggaagatcaggacatgtggcgtatgtcaggcatcttcc<br>gcgatgtgtcgctgctgcataaaccgaccacgcagatttcagactttcacgttgcgac<br>ccgtttcaatgatgacttttcgcgcgccgtcctggaagcagaagtgcagatgtgcggt<br>gaactgcgtgattatctgcgcgtgacggtttcactgtggcagggtgaaacccaggtg<br>gctagcggcacggccccgtttggcggtgaaattatcgatgaacgtggcggttacgcg<br>gaccgtgtgaccctgcgtctgaacgttgaaaatccgaaactgtggagcgcagaaatt<br>ccgaacctgtatcgcgctgtcgtggaactgcataccgcggatggtacgctgatcgaa<br>gcagaagcttgtgacgttggcttccgtgaagtccgcattgaaaatggtctgctgctgct<br>gaacggcaaaccgctgctgatccgtggtgtgaatcgccatgaacatcacccgctgca<br>cggccaggtgatggatgaacagacgatggtgcaagacattctgctgatgaaacaga<br>acaattttaacgcggttcgttgcagtcattacccgaatcacccgctgtggtataccctgt<br>gtgatcgctatggtctgtacgttgtcgacgaagcgaacatcgaaacccacggcatgg<br>tgccgatgaatcgtctgaccgatgacccgcgctggctgccggcaatgagcgaacgt<br>gttacccgcatggtccagcgtgatcgcaaccacccgagtgttattatctggtccctgg<br>gcaatgaatcaggtcatggcgccaaccacgatgcactgtaccgttggattaaaagcg<br>tcgacccgtctcgcccggtgcagtatgaaggcggtggcgctgataccaccgccacc<br>gacattatctgcccgatgtacgctcgtgttgatgaagaccagccgtttccggcggtcc<br>cgaaatggtcaatcaaaaaatggctgagcctgccgggtgaaacccgtccgctgatcc<br>tgtgtgaatatgcgcatgcgatgggcaacagcctgggtggcttcgccaaatactggc<br>aggcatttcgtcaatatccgcgcctgcaaggtggcttcgtgtgggattgggttgacca<br>gagtctgattaaatacgatgaaaacggtaatccgtggtccgcgtatggcggcgatttt<br>ggcgacaccccgaatgatcgtcagttctgcatgaacggtctggtgtttgccgaccgta<br>ccccgcatccggcactgaccgaagcaaaacaccagcaacagtttttccagttccgtct<br>gtctggccaaaccattgaagtgacgagcgaatacctgtttcgccattctgataacgaa<br>ctgctgcactggatggttgccctggacggtaaaccgctggcatcaggcgaagtccc<br>gctggatgtggctccgcagggtaaacaactgattgaactgccggaactgccgcagc<br>cggaaagcgcaggccaactgtggctgaccgtgcgtgtggttcagccgaacgcaac<br>ggcttggagcgaagctggtcatatctctgcgtggcaacagtggcgcctggccgaaa<br>atctgagtgttaccctgccggcagcttcccatgcaatcccgcacctgaccacgagcg<br>aaatggatttctgtattgaactgggcaataaacgttggcagttcaaccgccaaagtggt<br>tttctgtcccagatgtggattggcgataaaaaacaactgctgaccccgctgcgtgacc<br>agtttacccgtgccccgctggataacgacatcggtgtgtctgaagctacccgtattgat<br>ccgaatgcgtgggttgaacgctggaaagcggccggccattaccaggccgaagcag<br>ctctgctgcaatgtaccgcagataccctggccgatgcggtgctgattaccacggcac<br>atgcttggcagcaccaaggtaaaaccctgtttatcagccgtaaaacgtatcgcattgat<br>ggttctggccagatggcgattaccgtcgatgtggaagttgcaagcgacacgccgca<br>cccggcacgtattggtctgaattgtcagctggcacaagttgctgaacgtgtcaactgg<br>ctgggtctgggtccgcaggaaaattatccggatcgtctgaccgccgcatgctttgatc<br>gttgggacctgccgctgagcgatatgtataccccgtacgtgtttccgtctgaaaacggt<br>ctgcgttgtggcacgcgcgaactgaattacggtccgcatcagtggcgtggcgatttc<br>aattcaacattagccgctattctcaacagcaactgatggaaaccagccatcgtcacct<br>gctgcatgcggaagaaggtacgtggctgaatatcgatggtttccacatgggcattggt<br>ggcgatgacagctggtctccgagtgtttccgccgaatttcagctgtctgcaggccgct<br>atcattaccagctggtctggtgtcaaaaaggtggcggtggctcgggtggcggtggca<br>gcggtggcggtggctctatgaacattatcaataccagtatcctgaatctgcgttacgaa<br>tccaaccacctgattgatctgtcacgctatgcctcgaaaatcaacatcggttcaaaagt<br>gaacttcgatccgatcgacaaaaatcagattcaactgtttaacctggaaagctctaaaa<br>ttgaagtcatcctgaaaaacgcgattgtgtataattccatgtacgaaaacttctcaacct<br>cgttttggattcgtatcccgaaatactttaacagcatctctctgaacaacgaatacacga<br>tcatcaactgcatggaaaacaatagtggttggaaagtgtccctgaactatggcgaaatt<br>atctggaccctgcaggatacgcaagaaattaaacaacgtgtcgtgttcaaatacagtc<br>agatgatcaacatctccgattacatcaaccgttggatctttgttaccattacgaacaatc<br>gcctgaacaacagcaaaatctacatcaacggtcgcctgatcgatcagaaaccgatttc<br>aaacctgggcaatatccatgcgtcgaacaatattatgttcaaactggatggctgtcgtg<br>acacccaccgctacatttggatcaaatacttcaacctgtttgataaagaactgaacgaa<br>aaagaaatcaaagatctgtatgacaaccagagtaattccggtattctgaaagatttttgg<br>ggcgactatctgcagtacgataaaccgtattacatgctgaatctgtacgatccgaaca<br>aatatgtcgacgtgaacaatgtcggtattcgtggctatatgtacctgaaaggtccgcgc<br>ggcagcgtgatgaccacgaacatctacctgaatagttccctgtaccgtggcaccaaat<br>tcatcatcaaaaaatacgcctctggcaacaaagataatatcgttcgtaacaatgaccgc<br>gtctacatcaacgttgtcgtgaaaaacaaagaataccgcctggcgaccaacgccagt<br>caggcaggtgtcgaaaaaatcctgtccgcgctggaaattccggatgtgggcaacctg<br>tcacaagttgtcgtgatgaaatcgaaaaatgatcagggtattaccaataaatgcaaaat<br>gaacctgcaggataacaatggcaatgacattggttttatcggcttccatcagtttaacaa<br>tatcgctaaactggtggcgagtaactggtataatcgtcagattgaacgttcatcgcgca<br>ccctgggctgttcctgggaatttatcccggttgatgacggttggggcgaacgcccgct<br>gcatcaccatcaccatcactaaggatcc | $H_C$/A fusion protein construct |

Protein Purification

The plasmid pET-9a-ß-gal-$H_C$/A was transformed into *E. coli* BL21(DE3). A starter culture was prepared by inoculating a colony into 40 ml of TB media (comprising 24 g/l yeast extract; 12 g/l tryptone; 4 g/l glycerol; 89 mM potassium phosphate) with kanamycin (30 μg/ml) in an Ultra Yield 250 ml (Thomson Instrument Company) shake flask, and the flasks were incubated at 37° C., 250 rounds per minute (rpm). After 8 hours the starter culture was used to inoculate 1 liter of TB media with kanamycin, in two Ultra Yield 2.5 liter shake flasks, and the flasks were incubated at 18° C., 250 rpm for 40 hours. The culture was harvested by centrifugation.

The cell pellet was re-suspended in 100 ml binding buffer (20 mM imidazole; 20 mM sodium phosphate; 0.5 M NaCl; pH 7.4) and the cells were disrupted by sonication (Cole Parmer ultrasonic processor; 60% amplitude, 15 minutes). The cell extract was clarified by centrifugation (14,000 g, 30 min) and loaded onto a HisTrap FF 1 ml column (GE Healthcare) mounted on an AKTA Explorer FPLC system (GE Healthcare). The column was washed with 10 column volumes (CV) of binding buffer and 10 CV of binding buffer containing 40 mM imidazole. The protein was eluted from the column with elution buffer (20 mM sodium phosphate, 0.5 M NaCl, 500 mM Imidazole, pH 7.4). The pure protein was dialyzed against 50 mM sodium citrate buffer, pH 5.5, and stored at −70° C.).

Expression and Purification of the GST-SV2C Fusion Receptor Protein Construct

The protein receptor for BoNT/A is Synaptic vesicle glycoprotein 2C (SV2C). Specifically, the toxin binds the fourth luminal loop of SV2C (6). A fusion receptor protein comprising SV2C and glutathione-s-transferase (GST) was prepared as follows. The gene encoding the fourth luminal loop of sv2c (having a nucleic acid sequence denoted herein as SEQ ID NO. 10) was fused to glutathione-s-transferase (gst) gene (having a nucleic acid sequence denoted herein as SEQ ID NO. 11) to facilitate purification and enhance its solubility. The amino acid (protein) sequence of GST was taken from pET-41a vector and has a sequence denoted herein as SEQ ID NO. 12. The amino acid (protein) sequence for the fourth luminal loop of SV2C was taken from *Mus musculus* and has a sequence denoted herein as SEQ ID NO. 13. The resulting fusion receptor polypeptide consists of GST on its N-terminus and the fourth luminal loop of SV2C on its C-terminus (GST-SV2C). Next, a synthetic gene with optimized codon usage for expression in *E. coli* was prepared for optimal expression. The gene encoding for the fusion receptor protein GST-SV2C, having a sequence denoted herein as SEQ ID NO. 14, was cloned into the expression vector pET-9a.

The plasmid pET-9a-gst-sv2c was transformed into *E. coli* BL21(DE3). A starter culture was prepared by inoculating a colony into 40 ml of TB media with kanamycin in an Ultra Yield 250 ml shake flask, and the flasks were incubated at 37° C., 250 rpm. After 8 hours the starter culture was used to inoculate 1 liter of TB media with kanamycin, in two Ultra Yield 2.5 liter shake flasks, and the flasks were incubated at 18° C., 250 rpm for 40 hours. The culture was harvested by centrifugation.

The cell pellet was re-suspended in 100 ml PBS and the cells were disrupted by sonication. The cell extract was clarified by centrifugation (14,000 g, 30 min) and loaded onto a GSTrap FF 5 ml column (GE Healthcare) mounted on an AKTA Explorer FPLC system (GE Healthcare). The column was washed with 15 CV of binding buffer to remove unbound proteins. The protein was eluted from the column with elution buffer (50 mM tris-HCl; 10 mM reduced glutathione, pH 8.0). The amino acid sequence of the GST-SV2C fusion receptor protein obtained is denoted herein as SEQ ID NO. 15.

The sequences detailed herein in connection with the preparation of the fusion receptor protein GST-SV2C are detailed in Table 3 below.

TABLE 3

Sequences for the preparation of the fusion receptor protein GST-SV2C

| SEQ ID NO. | Sequence | Sequence name |
|---|---|---|
| 10 | ttccctgatgtcattaaacatctccagtctgatgagtatgcactgctaactaggaatgtg<br>caaaaggataaatatgcaaacttcagcattaactttaccatggagaaccagatccaca<br>ctggaatggaatacgagaacggcagattcctcggagtcaagttcaaatcggtaacctt<br>caaagattcagtgtttaagtcctgcacctttgacgacgtgacctcagtcaacacctactt<br>caagaactgcacgtttattgatacccttttgataacacagattttgagccctataaattc<br>atagacagtgaatttcagaactgctcatttcttcacaataagacggggtgccagattactt<br>ttgatgacgactatagtgcctac | *M. musculus* nucleic acid sequence of the fourth luminal loop of sv2c gene |
| 11 | atgtcgccgatcctgggctactggaaaatcaaaggcctggtgcaaccgacccgtctg<br>ctgctggaatacctggaagaaaaatacgaagaacatctgtatgaacgtgatgaaggc<br>gacaaatggcgcaacaaaaaattcgaactgggtctggaatttccgaatctgccgtatt<br>acatcgatggcgacgtgaaactgacccagagcatggctattatccgttacattgcgga<br>taaacacaacatgctgggcggttgcccgaaagaacgcgccgaaatctctatgctgga<br>aggcgcagtgctggatattcgttatggtgttagtcgcattgcgtactccaaagatttcga<br>aaccctgaaagttgactttctgagcaaactgccggaaatgctgaaaatgttcgaagat<br>cgtctgtgtcataaaacctatctgaatggtgatcatgtcacgcacccggactttatgctg<br>tatgatgccctggacgtggttctgtacatggacccgatgtgcctggacgccttcccga<br>aactggtgtgttttaaaaaacgcattgaagcaatcccgcaaatcgataaatacctgaaa<br>agctctaaatacattgcgtggccgctgcagggttggcaagccacctttggcggtggc<br>gatcacccgccgaaaagtgacggtagtacgtccggttcaggctcggcgggtctggtt<br>ccgcgtggctccaccgcaatcggtatgaaagaaacggcggcggcaaaattcgaac<br>gccagcacatggatagcccggacctgggcacc | Nucleic acid sequence of Schistosoma japonicum gst gene |
| 12 | MSPILGYWKIKGLVQPTRLLLEYLEEKYEEHLYERDE<br>GDKWRNKKFELGLEFPNLPYYIDGDVKLTQSMAIIRY<br>IADKHNMLGGCPKERAEISMLEGAVLDIRYGVSRIAY<br>SKDFETLKVDFLSKLPEMLKMFEDRLCHKTYLNGDH | Amino acid sequence of Schistosoma japonicum |

TABLE 3-continued

Sequences for the preparation of the fusion receptor protein GST-SV2C

| SEQ ID NO. | Sequence | Sequence name |
|---|---|---|
| | VTHPDFMLYDALDVVLYMDPMCLDAFPKLVCFKKRI<br>EAIPQIDKYLKSSKYIAWPLQGWQATFGGGDHPPKSD<br>GSTSGSGSAGLVPRGSTAIGMKETAAAKFERQHMDSP<br>DLGT | GST |
| 13 | FPDVIKHLQSDEYALLTRNVQKDKYANFSINFTMENQ<br>IHTGMEYENGRFLGVKFKSVTFKDSVFKSCTFDDVTS<br>VNTYFKNCTFIDTLFDNTDFEPYKFIDSEFQNCSFLHN<br>KTGCQITFDDDYSAY | Amino acid sequence of the fourth luminal loop of SV2C |
| 14 | catatgtcgccgatcctgggctactggaaaatcaaaggcctggtgcaaccgacccgt<br>ctgctgctggaatacctggaagaaaaatacgaagaacatctgtatgaacgtgatgaa<br>ggcgacaaatggcgcaacaaaaaattcgaactgggtctggaatttccgaatctgccg<br>tattacatcgatggcgacgtgaaactgacccagagcatggctattatccgttacattgc<br>ggataaacacaacatgctgggcggttgcccgaaagaacgcgccgaaatctctatgct<br>ggaaggcgcagtgctggatattcgttatggtgttagtcgcattgcgtactccaaagattt<br>cgaaaccctgaaagttgactttctgagcaaactgccggaaatgctgaaaatgttcgaa<br>gatcgtctgtgtcataaaacctatctgaatggtgatcatgtcacgcacccggactttatg<br>ctgtatgatgccctggacgtggttctgtacatggacccgatgtgcctggacgccttccc<br>gaaactggtgtgttttaaaaaacgcattgaagcaatcccgcaaatcgataaatacctga<br>aaagctctaaatacattgcgtggccgctgcagggttggcaagccacctttggcggtg<br>gcgatcacccgccgaaaagtgacggtagtacgtccggttcaggctcggcgggtctg<br>gttccgcgtggctccaccgcaatcggtatgaaagaaacggcggcggcaaaattcga<br>acgccagcacatggatagcccggacctgggcacctttccggatgtcattaaacacct<br>gcagtctgacgaatatgctctgctgacgcgtaacgtgcaaaaagataaatacgcgaa<br>ctttagcatcaatttcacgatggaaaaccaaattcatacgggtatggaatatgaaaatg<br>gtcgctttctgggcgttaaattcaaatcagtcaccttcaaagatagcgttttcaaatctt<br>gcacgtttgatgacgtcacctcggtgaacacgtacttcaaaaactgtaccttcatcgata<br>cgctgttcgataacaccgactttgaaccgtacaaattcatcgactcagaatttcagaact<br>gctcgttcctgcacaataaaacgggctgccagattacctttgacgatgattactccgca<br>tactaaggatcc | Nucleic acid sequence encoding the fusion receptor protein GST-SV2C |
| 15 | MSPILGYWKIKGLVQPTRLLLEYLEEKYEEHLYERDE<br>GDKWRNKKFELGLEFPNLPYYIDGDVKLTQSMAIIRY<br>IADKHNMLGGCPKERAEISMLEGAVLDIRYGVSRIAY<br>SKDFETLKVDFLSKLPEMLKMFEDRLCHKTYLNGDH<br>VTHPDFMLYDALDVVLYMDPMCLDAFPKLVCFKKRI<br>EAIPQIDKYLKSSKYIAWPLQGWQATFGGGDHPPKSD<br>GSTSGSGSAGLVPRGSTAIGMKETAAAKFERQHMDSP<br>DLGTFPDVIKHLQSDEYALLTRNVQKDKYANFSINFT<br>MENQIHTGMEYENGRFLGVKFKSVTFKDSVFKSCTFD<br>DVTSVNTYFKNCTFIDTLFDNTDFEPYKFIDSEFQNCS<br>FLHNKTGCQITFDDDYSAY | Amino acid sequence of the fusion receptor protein GST-SV2C |

Binding Analysis of β-gal-$H_C$/A to GST-SV2C

Analysis of binding of the fusion proteins ß-gal-$H_C$/A to GST-SV2C was performed as follows: a 96-well plate was coated with 50 μl per well of the fusion receptor protein GST-SV2C diluted 1:200 in coating buffer (50 mM $Na_2CO_3$, pH 9.6) and incubated overnight at 4° C. GST-SV2C was immobilized to the plate (using $Na_2CO_3$). The plate was then washed with wash solution (NaCl 0.9%, Tween 20 0.05%) and blocked for one hour at 37° C. with TSTA buffer (50 mM Tris, 0.9% NaCl, 0.05% Tween, 2% BSA, 200 μl per well). After washing, the plates were incubated for one hour at 37° C. with serial dilutions (from 200 to 204800) of the fusion protein ß-gal-$H_C$/A in TSTA, 50 μl per well. The plate was then washed and incubated with ortho-nitrophenyl-galacto-pyranoside (oNPG, sigma) solution (1 mg/ml) in Z-buffer (100 mM sodium phosphate, 10 mM KCl, 1 mM $MgSO_4$, 50 mM ß-mercaptoethanol, pH 7.0) for one hour at 37° C. The reaction was stopped with stop solution (1 M sodium carbonate), and absorbance was measured at 420 nm. Alternatively, the fluorogenic substrate 4-methylumbellyferyl-galactopyranoside (4-MUG, sigma) (0.5 mg/ml; excitation 355 nm, emission 455 nm) was used.

Binding Assay in the Presence of Anti BoNT Antibodies

A 96-well plate was coated with the GST-SV2C fusion receptor protein as detailed above and incubated overnight at 4° C. The plate was then washed with wash solution and blocked for one hour at 37° C. with TSTA buffer. In a different (separate) 96-wells polypropylene plate, the ß-gal-$H_C$ /A fusion protein diluted 1:6000 with TSTA was incubated for one hour at room temperature with one type of the following horse antibodies (prepared by the inventors): anti BoNT/A, BoNT/B, BoNT/E or naive serum, diluted 1:1650 with TSTA. The ß-gal-$H_C$ /A fusion protein—antitoxins mixtures were then transferred into the GST-SV2C coated plate, 50 μl per well, and the plate was incubated for one hour at 37° C. The plate was then washed and incubated with oNPG solution in Z-buffer (prepared as detailed above) for one hour at 37° C. The reaction was stopped with stop solution, and absorbance was measured at 420 nm. The residual activity of ß-gal was calculated by dividing the absorbance obtained in each one of the wells by the absorbance in a control well that did not contain antitoxin.

Binding Assay in the Presence of Neutralizing Antibodies

The assay described above was also performed in the presence of several monoclonal antibodies (A-1-A-8)

directed against the receptor binding domain of BoNT/A, as well as in the presence of monoclonal antibodies directed against PA (anthrax protective antigen), BoNT/B and antibodies directed against BoNT/E. The monoclonal antibodies were produced in the Israel Institute for Biological Research (IIBR). The preparation of the antibodies is described in Diamant et al. (10).

Pharmacopoeial Mouse Neutralization Assay

Determination of neutralizing antibody concentration (NAC) was performed by incubating serial dilutions of a neutralizing antibody (directed against BoNT/A) sample for one hour with a test dose of botulinum toxin (type A), and then injecting the mixture to groups of four mice (CD-1, Charles River). The survival order of the injected groups was compared to that of groups injected with serial dilutions of a World Health Organization (WHO) standard with known NAC. One international unit (IU) of antitoxin neutralizes at least $10^4$ $LD_{50}$ toxin.

ELISA Titers for $H_C$ /A Fragment Binding

Plates (96-well) were coated with the $H_C$ fragment of BoNTA ($H_C$/A, having the amino acid sequence denoted herein by SEQ ID NO. 2) solution (10 μg/ml in coating buffer, 50 μl per well) and incubated overnight at 4° C. Following washing, the plates were blocked with TSTA (200 μl per well). The plates were then washed and loaded with serial dilution of plasma samples containing horse anti BoNT/A antibodies (50 μl per well). Following incubation (37° C., 1 hour) the plates were washed and incubated with alkaline phosphatase conjugated goat anti horse IgG (Jackson ImmunoResearch). Finally, the plates were washed with wash solution, and the colorimetric reaction was developed using the substrate p-nitrophenyl phosphate (1 mg/ml in 0.2 M Tris buffer). Following 15 minutes of incubation (37° C.) absorbance was measured at 405 nm. The titers were defined as the highest dilution of the samples for which the signal was above 0.4.

High Throughput Screening Assay for Toxin-Receptor Binding Inhibitors

High throughput screening (HTS) was conducted for the Library Of Pharmacologically Active Compounds (LOPAC1280, Sigma), which contains 1280 active compounds in DMSO (10 mM solutions). The screening procedure was performed as follows: first, a dilution plate of the tested compounds was prepared by 10-fold dilution to 1 mM with a solution of 50% DMSO and 50% PBS. Next, a polypropylene 96-wells plate was filled (90 μl per well) with the fusion protein ß-gal-$H_C$ /A (diluted 1:90,000 in TSTA). The diluted compounds (10 μl per well) were then mixed with the ß-gal-$H_C$ /A fusion protein solution and the plate was incubated for 1 hour at 25° C. with shaking (200 rpm). Control wells were prepared as follows: 1. No compound—100% activity; 2. No ß-gal-$H_C$/A fusion protein—zero activity. The mixtures of ß-gal-$H_C$/A fusion protein with the tested compounds were then transferred (50 μl per well) into 96-wells polystyrene plates coated with the fusion receptor protein GST-SV2C, and the plate was incubated one hour at 37° C. The wells were washed with a wash solution and a substrate solution (50 μl per well of 4-MUG 0.5 mg/ml in buffer Z) was next added, and the plate was further incubated one hour at 37° C. The reaction was stopped with stop solution (50 μl per well) and the fluorescence was measured. For each one of the wells the residual ß-gal activity was calculated using the following equation:

$$\text{Residual activity}=100\times(WF-BF)/PCF$$

Where WF is the fluorescence of the well, BF is the fluorescence of the blank, and PCF is the fluorescence of the positive control 100% activity.

Example 1

Design and Calibration of the In-Vitro ß-Gal-$H_C$ /A-GST-SV2C Binding Assay

A ß-gal-$H_C$ /A chimeric (fusion) protein construct was designed, composed of the receptor binding domain of BoNT/A (also termed herein the "$H_C$-fragment") fused to the reporter enzyme beta-galactosidase derived from *Escherichia coli*, as detailed above. The amino acid sequence of the chimeric ß-gal-$H_C$/A protein construct comprising the receptor binding domain of BoNT/A and *Escherichia coli* beta-galactosidase is denoted herein by SEQ ID NO. 5 and is detailed in Table 2 above.

In addition, the inventors have used a GST-SV2C fusion receptor protein construct, namely a receptor construct based on the fourth luminal loop of the synaptic vesicle protein (SV2C) conjugated to a GST protein. The amino acid sequence of the GST-SV2C receptor construct is denoted herein by SEQ ID NO. 15 and is detailed in Table 3 above.

Figure 2:
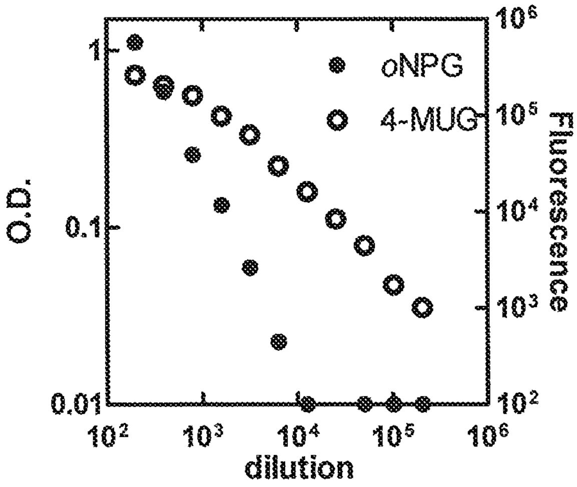
FIG. 2: A graph showing the binding of ß-gal-Hc/A to GST-SV2C. A 96-wells plate was coated with GST-SV2C and the plate was loaded with serial dilutions of ß-gal-$H_C$/A. Detection of bound ß-gal-Hc/A was performed with the chromogenic substrate ortho-nitrophenyl-galactopyranoside (oNPG) and measured by O.D. (optical density) or the substrate 4-methylumbellyferyl-galactopyranoside (4-MUG) measured by fluorescence.

Detection of receptor-bound $H_C$ fragment was accomplished with the addition of the chromogenic substrate ortho-nitrophenyl-ß-galactoside (oNPG) or the fluorogenic substrate 4-methylumbelliferyl-ß-galactoside (4-MUG) as detailed above. When the colorimetric substrate oNPG was used for measuring the presence and activity of the ß-gal-$H_C$/A construct, the recorded absorbance was proportional to the ß-gal-$H_C$ /A fusion protein dilution from a dilution of 1:200 to 1:6400. Above a dilution of 1:6400 the absorbance was similar to blank wells with TSTA buffer alone, as shown in FIG. 2. In order to obtain higher sensitivity, the fluorogenic substrate 4-MUG was used instead of the colorimetric substrate oNPG. As shown in FIG. 2, when 4-MUG was used, the fluorescence signal was proportional to the ß-gal-$H_C$/A fusion protein dilution in a broad dilution range, from a dilution of 1:200 to 1:204800.

Example 2

Specificity of Anti-BoNT Antibodies in Prevention of ß-Gal-$H_C$ /A Binding to GST-SV2C The neutralizing mechanism of BoNTs by antitoxins (namely by antibodies) is mainly based on prevention of binding of the toxins to their receptors (2, 7). According to the definition of BoNT serotypes, antibodies generated towards a single serotype are able to neutralize only this specific serotype, and not different serotypes. Therefore, as a means for evaluating the binding assay described herein, as well as the specificity thereof, the ability of the following horse-derived antibodies, anti BoNT/A, anti BoNT/B and anti BoNT/E antibodies to prevent binding of ß-gal-H/A to GST-SV2C was evaluated.

Figure 3:
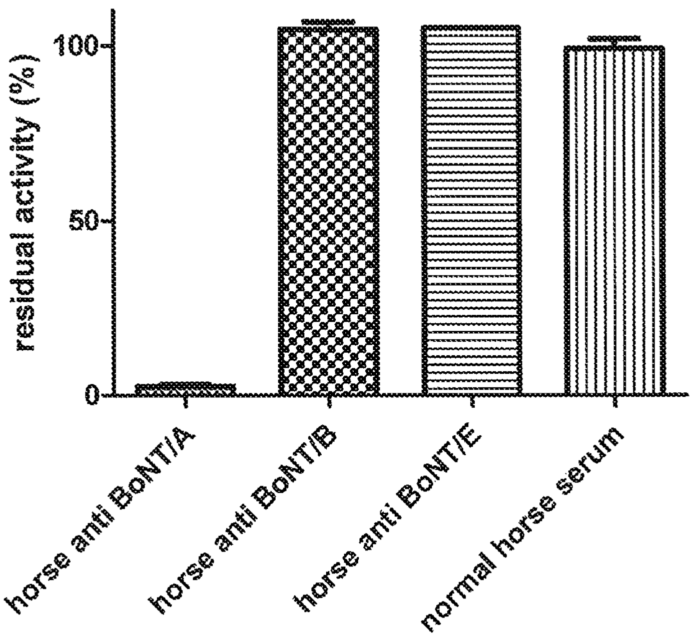
FIG. 3: A bar graph showing the specificity of BoNT antitoxin antibodies for preventing ß-gal-Hc/A binding to GST-SV2C. ß-gal-H/A was incubated with horse anti BoNT/A, B, or E antibodies or with naïve (normal horse) serum and then the mixtures were transferred to 96-well plates coated with GST-SV2C. Following incubation and washing of unbound ß-gal-$H_C$/A, the bound ß-gal-$H_C$/A was detected by addition of the substrate oNPG. The graph shows percent residual activity for each of the tested mixtures Abbreviations: BoNT/A, BoNT/B, BoNT/E, botulinum neurotoxin A, B and E, respectively.

The binding assay in the presence of horse anti BoNT/A, anti BoNT/B and anti BoNT/E antibodies was conducted as described above. As demonstrated in FIG. 3, while for wells containing horse anti BoNT/B or BoNT/E the residual activity of ß-gal (calculated as described above) was 100%, the residual activity of ß-gal in wells containing horse anti BoNT/A was only 3%. Hence, horse anti BoNT/A specifically prevented the ß-gal-$H_C$/A fusion protein from binding to the GST-SV2C fusion receptor protein.

Example 3

Determination of Neutralizing Antibody Concentration (NAC)

As an additional means for evaluating the binding assay described herein, the inventors determined the neutralizing antibody concentration (NAC) of antibodies specific to BoNT/A using the binding assay, as described below, and compared the results obtained thereby to results obtained by other acceptable evaluation methods.

First, the potency of botulinum antitoxin (antibodies) preparation was determined using a pharmacopoeial mouse neutralization assay (MNA, (8)), as detailed above. The MNA assay suffers from several drawbacks, as follows: use of high toxin doses dictates stringent safety restriction, the assay raises ethical issues as it uses numerous laboratory animals, assays conducted in animals are generally characterized by high variability and finally, the duration of the mouse neutralization assay is very lengthy (i.e. four days).

In the currently available in vitro antibody evaluation method, the ELISA titers of antibodies which bind BoNTs do not correlate with NAC and therefore no simple in vitro assay is available in the prior art to determine NAC. Without wishing to be bound by theory, the reason for the poor correlation is that binding of antibodies alone is not enough for toxin neutralization. ELISA measures binding of any antibody to any epitope of BoNT. It is currently known that not any antibody-epitope binding event eventually results in neutralization of BoNT. Most of the neutralizing antibodies directed against BoNTs bind the $H_C$ fragment and thereby prevent binding of the toxin to its receptor. Since the ß-gal-$H_C$/A assay specifically measures the binding of the receptor binding domain of BoNT/A to the receptor SV2C, it may be used to identify neutralizing antibodies and determine neutralizing antibody concentration.

Thus in order to evaluate the in vitro method described herein, plasma samples of horse vaccinated against BoNT/A and antitoxin standard (namely antibodies) of known potency (330 IU/ml) were serially diluted (dilution factor of 1.5) in TSTA and mixed in 1:1 ratio with the fusion protein ß-gal-$H_C$/A solution (diluted 1:1000 with TSTA). The mixtures were incubated for one hour at room temperature, then transferred to 96-wells plates coated with the fusion receptor protein GST-SV2C and the plate was incubated one hour at 37° C. After incubation, the plate was washed with wash solution and a substrate solution (oNPG 1 mg/ml in buffer Z) was added. Following incubation for one hour at 37° C. the reaction was stopped by addition of stop solution and absorbance at 420 nm was measured. The NAC in the unknown samples (horse vaccinated samples) were determined based on interpolation from the standard curve prepared for the antitoxin (antibodies) of known potency.

Figure 4A:
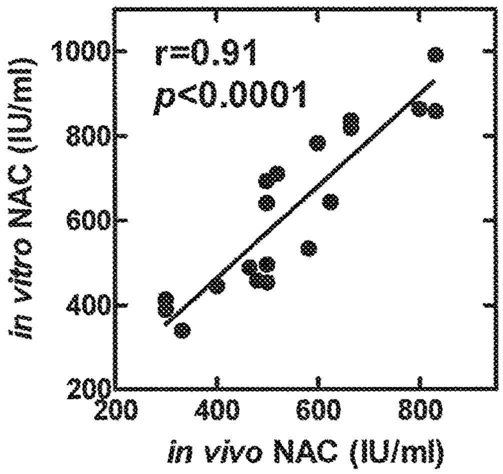
FIG. 4A-FIG. 4B.
Figure 4B:
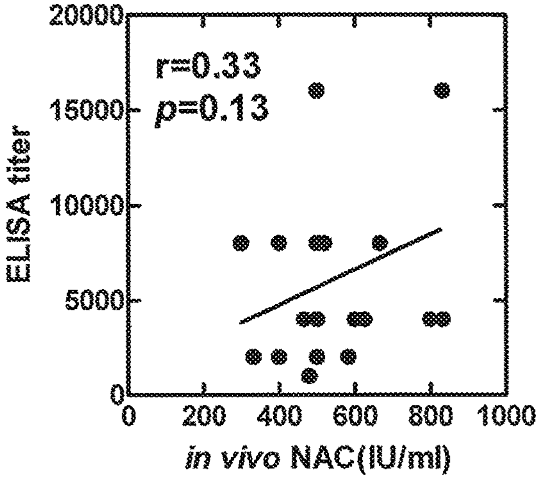

FIG. 4A shows the correlation between the NAC as determined by the ß-gal-$H_C$/A assay described herein and by a pharmacopoeial MNA (mouse neutralization assay). A significant correlation ($P<0.0001$) with high correlation coefficient ($r=0.91$) was obtained between the NAC determined using MNA in-vivo assay and the ß-gal-$H_C$/A-GST-SV2C in-vitro assay. On the other hand, as shown in FIG. 4B, a poor correlation was obtained between the titers of the same plasma samples for binding the $H_C$ fragment, based on an ELISA assay performed as described above, and the NAC determined using the MNA in-vivo assay (FIG. 4B, $P=0.13$, $r=0.33$).

Example 4

High Throughput Screening Assay for Identifying Toxin-Receptor Binding Inhibitors The chimeric (fusion) protein ß-gal-$H_C$/A prepared as described above allows fast and simple detection and quantitation of the binding between the receptor binding domain of BoNT/A and its receptor SV2C, while using standard equipment (e.g. a plate reader) and without use of toxic substances. The above characteristics enabled the development of a high-throughput screening (HTS) assay for identifying binding inhibitors from a compound library. In other words, the HTS assay described herein may be used inter alia for screening of agents that interfere with binding of botulinum toxin A to the SV2C receptor. Briefly, the ß-gal-$H_C$/A fusion protein was mixed with the examined compounds and then incubated with the GST-SV2C fusion receptor protein. Following removal of unbound ß-gal-$H_C$/A the activity of ß-galactosidase was determined. Inhibitors of toxin-receptor binding will decrease ß-gal activity in comparison to a positive control.

Since in most compound libraries the compounds are dissolved in DMSO, the susceptibility of the ß-gal-$H_C$/A fusion protein to DMSO was first examined. The ß-gal-$H_C$/A fusion protein was diluted 1:100,000 with TSTA and then mixed 1:1 with PBS and DMSO solutions to obtain final DMSO concentrations in the range of 0-50%. The mixtures were incubated one hour at room temperature, afterwards the content was transferred into 96-wells plate coated with the GST-SV2C fusion receptor protein and the plate was incubated one hour at 37° C. Following washing of the plate with wash solution, a substrate solution (4-MUG, 0.5 mg/ml) was added to the wells. The plate was incubated for one hour at 37° C., afterwards the stop solution was added and fluorescence was measured. Reduction in fluorescence was obtained for DMSO concentration higher than 8%, and for 5% DMSO the fluorescence intensity was similar to a control sample without DMSO.

Next, the HTS was conducted for the Library Of Pharmacologically Active Compounds (LOPAC1280, Sigma), as detailed above.

Table 4 below shows the results of exemplary residual activity obtained for plate 1 of LOPAC1280. Wells in column 1 (A-H) were all blank wells. Wells in column 12 (E-H) were all positive control ("no-compound" wells). In most of the wells similar residual activity values were obtained. Interestingly, a substantially lower residual activity was present in well F5, and therefore it contained a potential inhibitor of the binding between the ß-gal-$H_C$/A fusion protein and the SV2C fusion receptor protein, namely a potential inhibitor of botulinum toxin A binding to the SV2C receptor.

TABLE 4

Residual activity for a representative plate of LOPAC1280

| | 1 | 2 | 3 | 4 | 5 | 6 | 7 | 8 | 9 | 10 | 11 | 12 |
|---|---|---|---|---|---|---|---|---|---|---|---|---|
| A | 0.1 | 91.0 | 94.5 | 92.6 | 90.4 | 98.7 | 97.0 | 100.7 | 99.8 | 103.1 | 110.1 | — |
| B | 0.1 | 86.2 | 86.9 | 72.2 | 86.8 | 87.5 | 88.3 | 92.7 | 90.2 | 93.7 | 96.5 | — |
| C | 0.0 | 85.0 | 80.4 | 83.9 | 86.8 | 81.4 | 82.8 | 88.5 | 88.4 | 93.4 | 95.0 | — |

TABLE 4-continued

| Residual activity for a representative plate of LOPAC1280 | | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| D | −0.1 | 87.5 | 83.8 | 84.5 | 80.4 | 81.8 | 90.1 | 90.2 | 90.0 | 80.7 | 92.4 | — |
| E | 0.0 | 88.1 | 83.7 | 84.9 | 84.0 | 82.6 | 86.3 | 88.3 | 87.7 | 92.8 | 93.5 | 101.3 |
| F | 0.0 | 84.9 | 83.5 | 90.7 | 2.3 | 82.9 | 82.8 | 87.2 | 83.3 | 90.5 | 90.5 | 102.1 |
| G | 0.1 | 89.1 | 83.1 | 84.6 | 84.5 | 87.3 | 86.4 | 87.4 | 87.0 | 87.3 | 87.1 | 86.4 |
| H | −0.2 | 104.4 | 101.3 | 83.0 | 99.0 | 96.8 | 116.3 | 98.6 | 99.8 | 96.6 | 107.2 | 110.2 |

Additional results of exemplary residual activities obtained for compounds of the LOPAC1280 library are shown below in tables 5 and 6. As shown both in Table 4 and in table 5, substantially lower residual activity was present in well H4 of both plates, therefore these wells measured the activity of potential inhibitors of the binding between the ß-gal-$H_C$/A fusion protein and the SV2C fusion receptor protein, namely further potential inhibitors of botulinum toxin A binding to the SV2C receptor.

TABLE 5

| Residual activity for a representative plate of LOPAC1280 | | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| A | 0 | 94 | 86 | 88 | 88 | 92 | 92 | 94 | 98 | 97 | 108 | — |
| B | 0 | 91 | 86 | 89 | 91 | 86 | 85 | 87 | 89 | 90 | 98 | — |
| C | 0 | 87 | 92 | 85 | 93 | 86 | 103 | 92 | 91 | 93 | 94 | — |
| D | 0 | 86 | 87 | 80 | 86 | 85 | 93 | 91 | 87 | 93 | 92 | — |
| E | 0 | 85 | 89 | 83 | 86 | 85 | 88 | 86 | 87 | 95 | 93 | 100 |
| F | 0 | 89 | 90 | 87 | 85 | 87 | 86 | 87 | 89 | 93 | 92 | 97 |
| G | 0 | 86 | 87 | 84 | 80 | 85 | 86 | 83 | 87 | 90 | 89 | 97 |
| H | 0 | 100 | 100 | 0 | 103 | 98 | 100 | 97 | 104 | 99 | 106 | 106 |

TABLE 6

| Residual activity for a representative plate of LOPAC1280 | | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| A | 1 | 111 | 106 | 110 | 109 | 105 | 109 | 118 | 117 | 111 | 117 | — |
| B | −1 | 102 | 100 | 100 | 100 | 89 | 100 | 101 | 107 | 103 | 104 | — |
| C | 0 | 102 | 96 | 104 | 94 | 92 | 96 | 93 | 95 | 104 | 101 | — |
| D | 0 | 99 | 98 | 98 | 93 | 90 | 96 | 99 | 99 | 103 | 99 | — |
| E | 1 | 96 | 93 | 97 | 91 | 80 | 91 | 99 | 102 | 103 | 111 | 99 |
| F | 0 | 97 | 90 | 97 | 90 | 96 | 91 | 99 | 94 | 96 | 100 | 99 |
| G | 0 | 91 | 94 | 99 | 92 | 92 | 95 | 102 | 100 | 97 | 97 | 98 |
| H | −1 | 100 | 91 | 10 | 103 | 91 | 105 | 107 | 120 | 110 | 117 | 104 |

Example 5

Determination of Neutralizing Antibodies

Most neutralizing antibodies of BoNT are directed towards the receptor binding domain of the toxin. Since the assay presented in this invention measures the binding of BoNT/A to its receptor SV2C, it can be applied to evaluate neutralizing antibodies.

Figure 5A:
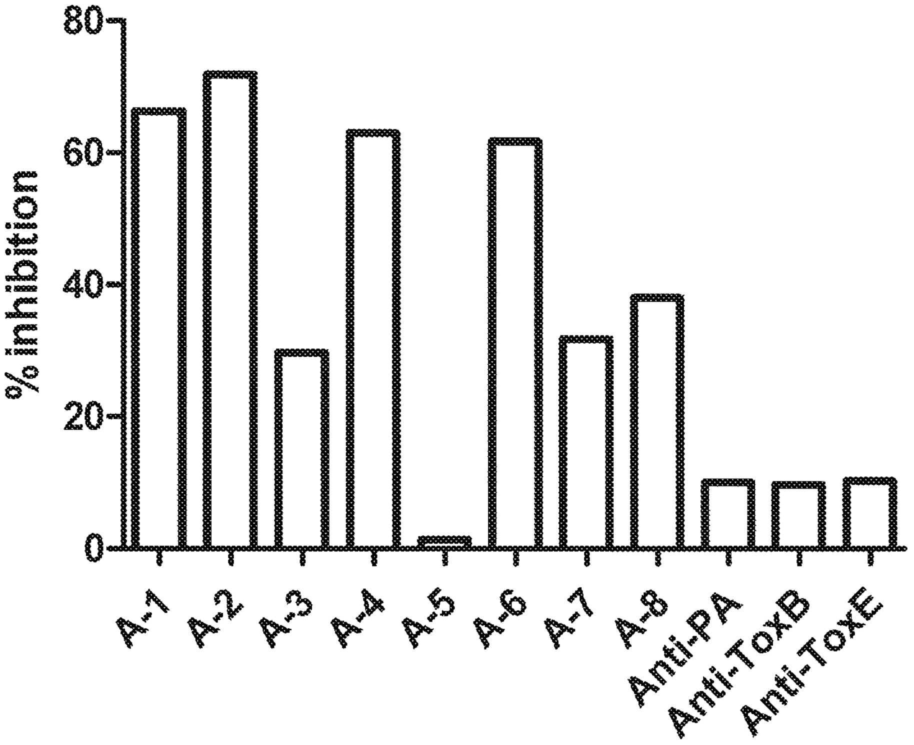
FIG. 5A-FIG. 5B.
Figure 5B:
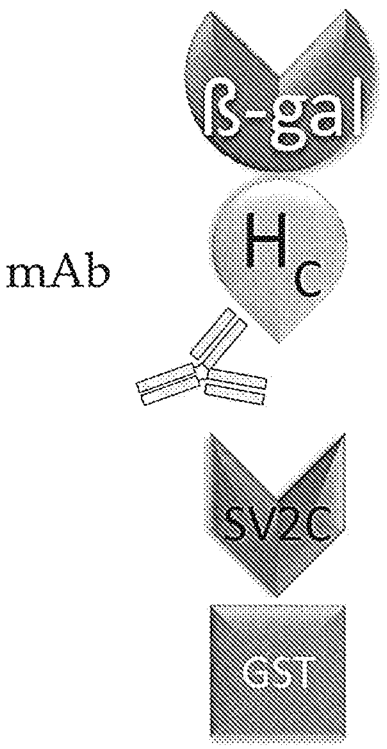

The assay presented above was next used to determine the inhibition potential of BoNT/A binding to its receptor SV2C by several monoclonal antibodies, as shown in FIG. 5A.

As demonstrated in FIG. 5A, for some of the murine monoclonal antibodies directed against the receptor binding domain of BoNT/A (namely A-3, A-5, A-7, and A-8) only a minor or modest inhibitory effect was obtained. As described by Diamant et al. (10), these antibodies failed to neutralize BoNT/A in-vivo. However, for Mabs A-1, A-2, A-4, and A-6 that were previously shown to neutralize BoNT/A in-vivo, over 40 percent inhibition of binding was presented. This example demonstrates the high correlation between the ß-gal-$H_C$/A-GST-SV2C binding assay, and in-vivo mice bioassay.

In contrast, only a minor interference to ß-gal-$H_C$/A-GST-SV2C interaction was observed for antibodies directed against PA (anthrax protective antigen), BoNT/B or BoNT/E, demonstrating the assay specificity.

To evaluate neutralizing antibodies in patients, samples (such as human serum or plasma) is serially diluted with TSTA buffer in 96-well plate. Afterwards, ß-gal-$H_C$/A is added to the wells and the plate is incubated for one hour at 25° C. This step allows the neutralizing antibodies to bind their epitopes on the $H_C$/A fragment. Then, the mixtures of the serum (or plasma) with ß-gal-$H_C$/A are transferred to another 96-well plate previously coated with GST-SV2C, and the plate is incubated for one hour at 37° C. This step allows non-neutralized $H_C$/A fragment to bind SV2C. Following removal of unbound ß-gal-$H_C$/A, by washing the plate with wash solution as described above, a synthetic substrate for ß-galactosidase, such as 4-MUG or oNPG, is added to the plate and the plate is incubated for one hour at 37° C. The reactions are stopped by addition of stop solution and absorbance or fluorescence are measured, using a plate reader, as described above. To translate absorbance (or fluorescence) values to neutralizing antibody concentration the assay includes a standard curve. The standard sample consists of a well-characterized serum, having a known neutralizing antibody concentration, and it is serially diluted in a similar manner to the samples.

TABLE 7

Sequences
Amino and nucleic acid sequences of neurotoxin receptor binding domains

| SEQ ID NO. | sequence | comments |
|---|---|---|
| 16 | ILNNIILNLRYKDNNLIDLSGYGAKVEVYDGVELN<br>DKNQFKLTSSANSKIRVTQNQNIIFNSVFLDFSVSF<br>WIRIPKYKNDGIQNYIHNEYTIINCMKNNSGWKISI<br>RGNRIIWTLIDINGKTKSVFFEYNIREDISEYINRWF<br>FVTITNNLNNAKIYINGKLESNTDIKDIREVIANGEI<br>IFKLDGDIDRTQFIWMKYFSIFNTELSQSNIEERYKI<br>QSYSEYLKDFWGNPLMYNKEYYMFNAGNKNSYI<br>KLKKDSPVGEILTRSKYNQNSKYINYRDLYIGEKF<br>IIRRKSNSQSINDDIVRKEDYIYLDFFNLNQEWRV<br>YTYKYFKKEEEKLFLAPISDSDEFYNTIQIKEYDEQ<br>PTYSCQLLFKKDEESTDEIGLIGIHRFYESGIVFEEY<br>KDYFCISKWYLKEVKRKPYNLKLGCNWQFIPKDE<br>GWTE | Amino acid seq. of *C. botulinum* B gene bank code M81186, amino acids 860-1291. |
| 17 | atttaaataatattatcttaaatttaagatataaggataataatttaatagatttatcaggata<br>tggggcaaaggtagaggtatatgatggagtcgagcttaatgataaaaatcaatttaaatt<br>aactagttcagcaaatagtaagattagagtgactcaaaatcagaatatcatatttaatagt<br>gtgttccttgattttagcgttagcttttggataagaatacctaaatataagaatgatggtata<br>caaaattatattcataatgaatatacaataattaattgtatgaaaaataattcgggctggaa<br>aatatctattaggggtaataggataatatggactttaattgatataaatggaaaaaccaaa<br>tcggtatttttgaatataacataagagaagatatatcagagtatataaatagatggtttttt<br>gtaactattactaataatttgaataacgctaaaatttatattaatggtaagctagaatcaaat<br>acagatattaaagatataagagaagttattgctaatggtgaaataatatttaaattagatg<br>gtgatatagatagaacacaatttatttggatgaaatatttcagtatttttaatacggaattaa<br>gtcaatcaaatattgaagaaagatataaaattcaatcatatagcgaatatttaaaagatttt<br>tggggaaatcctttaatgtacaataaagaatattatatgtttaatgcggggaataaaaatt<br>catatattaaactaaagaaagattcacctgtaggtgaaattttaacacgtagcaaatataa<br>tcaaaattctaaatatataaattatagagatttatatattggagaaaaatttattataagaag<br>aaagtcaaattctcaatctataaatgatgatatagttagaaaagaagattatatatatctag<br>atttttttaatttaaatcaagagtggagagtatatacctataaatattttaagaaagaggaa<br>gaaaaattgtttttagctcctataagtgattctgatgagttttacaatactatacaaataaaa<br>gaatatgatgaacagccaacatatagttgtcagttgctttttaaaaaagatgaagaaagt<br>actgatgagataggattgattggtattcatcgtttctacgaatctggaattgtatttgaaga<br>gtataaagattattttgtataagtaaatggtacttaaaagaggtaaaaaggaaaccatat<br>aatttaaaattgggatgtaattggcagtttattcctaaagatgaagggtggactgaataat<br>ataactatatgctcagcaaacctattttatataagaaaagtttaagtttataaaatcttaagtt<br>taaggatgtagctaaattttgaatattagataaactacatgttt | Nucleic acid seq. of *C. botulinum* B gene bank code M81186, amino acids 860-1291. |
| 18 | TIPFNIFSYTNNSLLKDIINEYFNNINDSKILSLQNR<br>KNTLVDTSGYNAEVSEEGDVQLNPIFPFDFKLGSS<br>GEDRGKVIVTQNENIVYNSMYESFSISFWIRINKW<br>VSNLPGYTIIDSVKNNSGWSIGIISNFLVFTLKQNE<br>DSEQSINFSYDISNNAPGYNKWFFVTVTNNMMGN<br>MKIYINGKLIDTIKVKELTGINFSKTITFEINKIPDT<br>GLITSDSDNINMWIRDFYIFAKELDGKDINILFNSL<br>QYTNVVKDYWGNDLRYNKEYYMVNIDYLNRYM<br>YANSRQIVFNTRRNNNDFNEGYKIIIKRIRGNTND<br>TRVRGGDILYFDMTINNKAYNLFMKNETMYADN<br>HSTEDIYAIGLREQTKDINDNIIFQIQPMNNTYYYA<br>SQIFKSNFNGENISGICSIGTYRFRLGGDWYRHNY<br>LVPTVKQGNYASLLESTSTHWGFVPVSE | Amino acid seq. of *C. botulinum* C gene bank code AB745658.1, amino acids 843-1291. |
| 19 | acaataccctttaatatttttcatatactaataattctttattaaaagatataattaatgaatat<br>ttcaataatattaatgattcaaaaattttgagcctacaaaacagaaaaatactttagtgga<br>tacatcaggatataatgcagaagtgagtgaagaaggcgatgttcagcttaatccaatatt<br>tccatttgactttaaattaggtagttcaggggaggatagaggtaaagttatagtaaccca<br>gaatgaaaatattgtatataattctatgtatgaaagttttagcattagtttttggattagaata<br>aataaatgggtaagtaatttacctggatatactataattgatagtgttaaaaataactcag<br>gttggagtataggtattattagtaatttttagtatttactttaaaacaaaatgaagatagtga<br>acaaagtataaattttagttatgatatatcaaataatgctcctggatacaataaatggtttttt<br>gtaactgttactaacaatatgatgggaaatatgaagatttatataaatggaaaattaatag<br>atactataaaagttaaagaactaactggaattaattttagcaaaactataacatttgaaata<br>aataaaattccagataccggtttgattacttcagattctgataacatcaatatgtggataag<br>agatttttatatatttgctaaagaattagatggtaaagatattaatatattatttaatagcttgc | Nucleic acid seq. of *C. botulinum* C gene bank code AB745658.1, amino acids 843-1291. |

TABLE 7-continued

Sequences
Amino and nucleic acid sequences of neurotoxin receptor binding domains

| SEQ ID NO. | sequence | comments |
|---|---|---|
| | aatatactaatgttgtaaaagattattggggaaatgatttaagatataataaagaatattat<br>atggttaatatagattatttaaatagatatatgtatgcgaactcacgacaaattgtttttaata<br>cacgtagaaataataatgacttcaatgaaggatataaaattataataaaaagaatcaga<br>ggaaatacaaatgatactagagtacgaggaggagatattttatattttgatatgacaatta<br>ataacaaagcatataatttgtttatgaagaatgaaactatgtatgcagataatcatagtact<br>gaagatatatatgctataggtttaagagaacaaacaaaggatataaatgataatattatat<br>ttcaaatacaaccaatgaataatacttattattacgcatctcaaatatttaaatcaaattttaa<br>tggagaaaatatttctggaatatgttcaataggtacttatcgttttagacttggaggtgatt<br>ggtatagacacaattatttggtgcctactgtgaagcaaggaaattatgcttcattattaga<br>atcaacatcaactcattggggttttgtacctgtaagtgaa | |
| 20 | FNSINDSKILSLQNKKNALVDTSGYNAEVRVGDN<br>VQLNTIYTNDFKLSSSGDKIIVNLNNNILYSAIYEN<br>SSVSFWIKISKDLTNSHNEYTIINSIEQNSGWKLCIR<br>NGNIEWILQDVNRKYKSLIFDYSESLSHTGYTNK<br>WFFVTITNNIMGYMKLYINGELKQSQKIEDLDEV<br>KLDKTIVFGIDENIDENQMLWIRDFNIFSKELSNED<br>INIVYEGQILRNVIKDYWGNPLKFDTEYYIINDNYI<br>DRYIAPESNVLVLVQYPDRSKLYTGNPITIKSVSD<br>KNPYSRILNGDNIILHMLYNSRKYMIIRDTDTIYAT<br>QGGECSQNCVYALKLQSNLGNYGIGIFSIKNIVSK<br>NKYCSQIFSSFRENTMLLADIYKPWRFSFKNAYTP<br>VAVTNYETKLLSTSSFWKFISRDPGWVE | Amino acid seq. of *C. botulinum* D gene bank code X54254.1, amino acids 861-1276. |
| 21 | ttcaatagtattaatgattcaaaaattttgagcttacaaaacaaaaaaaatgctttagtgga<br>tacatcaggatataatgcagaagtgagggtaggagataatgttcaacttaatacgatata<br>tacaaatgactttaaattaagtagttcaggagataaaattatagtaaatttaaataataatat<br>tttatatagcgctatttatgagaactctagtgttagtttttggattaagatatctaaagattta<br>actaattctcataatgaatatacaataattaacagtatagaacaaaattctgggtggaaat<br>tatgtattaggaatggcaatatagaatggattttacaagatgttaatagaaagtataaaag<br>tttaatttttgattatagtgaatcattaagtcatacaggatatacaaataaatggtttttttgtta<br>ctataactaataatataatggggtatatgaaactttatataaatggagaattaaagcagag<br>tcaaaaaattgaagatttagatgaggttaagttagataaaaccatagtatttggaatagat<br>gagaatatagatgagaatcagatgctttggattagagattttaatatttttttctaaagaatta<br>agtaatgaagatattaatattgtatatgagggacaaatattaagaaatgttattaaagatta<br>ttggggaaatcctttgaagtttgatacagaatattatattattaatgataattatatagatag<br>gtatatagcacctgaaagtaatgtacttgtacttgttcagtatccagatagatctaaattat<br>atactggaaatcctattactattaaatcagtatctgataagaatccttatagtagaattttaa<br>atggagataatataattcttcatatgttatataatagtaggaaatatatgataataagagat<br>actgatacaatatatgcaacacaaggaggagagtgttcacaaaattgtgtatatgcatta<br>aaattacagagtaatttaggtaattatggtataggtatatttagtataaaaaatattgtatct<br>aaaaataaatattgtagtcaaattttctctagttttagggaaaatacaatgcttctagcaga<br>tatatataaaccttggagattttcttttaaaaatgcatacacgccagttgcagtaactaatta<br>tgaaacaaaactattatcaacttcatctttttggaaatttatttctagggatccaggatgggt<br>agag | Nucleic acid seq. of *C. botulinum* D gene bank code X54254.1, amino acids 861-1276. |
| 22 | KRIKSSSVLNMRYKNDKYVDTSGYDSNININGDV<br>YKYPTNKNQFGIYNDKLSEVNISQNDYIIYDNKYK<br>NFSISFWVRIPNYDNKIVNVNNEYTIINCMRDNNS<br>GWKVSLNHNEIIWTLQDNAGINQKLAFNYGNAN<br>GISDYINKWIFVTITNDRLGDSKLYINGNLIDQKSI<br>LNLGNIHVSDNILFKIVNCSYTRYIGIRYFNIFDKEL<br>DETEIQTLYSNEPNTNILKDFWGNYLLYDKEYYL<br>LNVLKPNNFIDRRKDSTLSINNIRSTILLANRLYSGI<br>KVKIQRVNNSSTNDNLVRKNDQVYINFVASKTHL<br>FPLYADTATTNKEKTIKISSSGNRFNQVVVMNSV<br>GNNCTMNFKNNNGNNIGLLGFKADTVVASTWYY<br>THMRDHTNSNGCFWNFISEEHGWQEK | Amino acid seq. of *C. botulinum* E gene bank code X62683.1, amino acids 845-1252. |
| 23 | aagagaattaaaagtagttcagttttaaatatgagatataaaaatgataaatacgtagata<br>cttcaggatatgattcaaatataaatattaatggagatgtatataaatatccaactaataaa<br>aatcaatttggaatatataatgataaacttagtgaagttaatatatctcaaaatgattacatt<br>atatatgataataaatataaaaatttagtattagtttttgggtaagaattcctaactatgata<br>ataagatagtaaatgttaataatgaatacactataataaattgtatgagagataataattca<br>ggatggaaagtatctcttaatcataatgaaataatttggacattgcaagataatgcagga<br>attaatcaaaaattagcatttaactatggtaacgcaaatggtatttctgattatataaataag<br>tggatttttgtaactataactaatgatagattaggagattctaaactttatattaatggaaatt<br>taatagatcaaaaatcaattttaaatttaggtaatattcatgttagtgacaatatattatttaa<br>aatagttaattgtagttatacaagatatattggtattagatattttaatatttttgataaagaat<br>tagatgaaacagaaattcaaactttatatagcaatgaacctaatacaaatattttgaagga<br>tttttggggaaattatttgctttatgacaaagaatactatttattaaatgtgttaaaaccaaat<br>aactttattgataggagaaaagattctactttaagcattaataatataagaagcactattctt<br>ttagctaatagattatatagtggaataaaagttaaaatacaaagagttaataatagtagta<br>ctaacgataatcttgttagaaagaatgatcaggtatatattaattttgtagccagcaaaact | Nucleic acid seq. of *C. botulinum* E gene bank code X62683.1, amino acids 845-1252. |

TABLE 7-continued

| Sequences<br>Amino and nucleic acid sequences of neurotoxin receptor binding domains | | |
|---|---|---|
| SEQ ID NO. | sequence | comments |
| | cacttatttccattatatgctgatacagctaccacaaataaagagaaaacaataaaaatat<br>catcatctggcaatagatttaatcaagtagtagttatgaattcagtaggaaataattgtac<br>aatgaattttaaaaataataatggaaataatattgggttgttaggtttcaaggcagatactg<br>tagttgctagtacttggtattatacacatatgagagatcatacaaacagcaatggatgtttt<br>tggaactttatttctgaagaacatggatggcaagaaaaataaaaattagattaaacggct<br>aaagtcataaattccaaaggacttag | |
| 24 | NKLYKKIKDNSILDMRYENNKFIDISGYGSNISING<br>DVYIYSTNRNQFGIYSSKPSEVNIAQNNDIIYNGRY<br>QNFSISFWVRIPKYFNKVNLNNEYTIIDCIRNNNSG<br>WKISLNYNKIIWTLQDTAGNNQKLVFNYTQMISIS<br>DYINKWIFVTITNNRLGNSRIYINGNLIDEKSISNL<br>GDIHVSDNILFKIVGCNDTRYVGIRYFKVFDTELG<br>KTEIETLYSDEPDPSILKDFWGNYLLYNKRYYLLN<br>LLRTDKSITQNSNFLNINQQRGVYQKPNIFSNTRL<br>YTGVEVIIRKNGSTDISNTDNFVRKNDLAYINVVD<br>RDVEYRLYADISIAKPEKIIKLIRTSNSNNSLGQIIV<br>MDSIGNNCTMNFQNNNGGNIGLLGFHSNNLVASS<br>WYYNNIRKNTSSNGCFWSFISKEHGWQEN | Amino acid seq. of *C. botulinum* F gene bank code GU213203.1, amino acids 860-1278. |
| 25 | aataaattatataaaaaaattaaagataactctatttagatatgcgatatgaaaataataa<br>atttatagatatctctggatatggttcaaatataagcattaatggagatgtatatatttattca<br>acaaatagaaatcaatttggaatatatagtagtaagcctagtgaagttaatatagctcaa<br>aataatgatattatatacaatggtagatatcaaaatttagtattagtttctgggtaaggatt<br>cctaaatacttcaataaagtgaatcttaataatgaatatactataatagattgtataaggaa<br>taataattcaggatggaaaatatcacttaattataataaaataatttggactttacaagata<br>ctgctggaaataatcaaaaactagtttttaattatacacaaatgattagtatatctgattata<br>taaataaatggatttttgtaactattactaataatagattaggcaattctagaatttacatca<br>atggaaatttaatagatgaaaaatcaatttcgaatttaggtgatattcatgttagtgataata<br>tattatttaaaattgttggttgtaatgatacaagatatgttggtataagatattttaaagttttt<br>gatacggaattaggtaaaacagaaattgagactttatatagtgatgagccagatccaag<br>tatcttaaaagacttttggggaaattatttgttatataataaaagatattatttattgaatttac<br>taagaacagataagtctattactcagaattcaaactttctaaatattaatcaacaaagaggt<br>gtttatcagaaaccaaatatttttttccaacactagattatatacaggagtagaagttattata<br>agaaaaaatggatctacagatatatctaatacagataattttgttagaaaaaatgatctgg<br>catatattaatgtagtagatcgtgatgtagaatatcggctatatgctgatatatcaattgca<br>aaaccagagaaaataataaaattaataagaacatctaattcaaacaatagcttaggtca<br>aattatagttatggattcaataggaaataattgcacaatgaattttcaaaacaataatggg<br>ggcaatataggattactaggttttcattcaaataatttggttgctagtagttggtattataac<br>aatatacgaaaaaatactagcagtaatggatgcttttggagttttatttctaaagagcatg<br>gatggcaagaaaac | Nucleic acid seq. of *C. botulinum* F gene bank code GU213203.1, amino acids 860-1278. |
| 26 | NYISNISSNAILSLSYRGGRLIDSSGYGATMNVGSD<br>VIFNDIGNGQFKLNNSENSNITAHQSKFVVYDSMF<br>DNFSINFWVRTPKYNNNDIQTYLQNEYTIISCIKN<br>DSGWKVSIKGNRIIWTLIDVNAKSKSIFFEYSIKDN<br>ISDYINKWFSITITNDRLGNANIYINGSLKKSEKILN<br>LDRINSSNDIDFKLINCTDTTKFVWIKDFNIFGREL<br>NATEVSSLYWIQSSTNTLKDFWGNPLRYDTQYYL<br>FNQGMQNIYIKYFSKASMGETAPRTNFNNAAINY<br>QNLYLGLRFIIKKASNSRNINNDNIVREGDYIYLNI<br>DNISDESYRVYVLVNSKEIQTQLFLAPINDDPTFY<br>DVLQIKKYYEKTTYNCQILCEKDTKTFGLFGIGKF<br>VKDYGYVWDTYDNYFCISQWYLRRISENINKLRL<br>GCNWQFIPVDEGWTE | Amino acid seq. of *C. botulinum* G gene bank code X74162.1, amino acids 860-1297. |
| 27 | aattatattagtaatattagtagtaatgctattttaagtttaagttatagaggtgggcgtttaa<br>tagattcatctggatatggtgcaactatgaatgtaggttcagatgttatctttaatgatatag<br>gaaatggtcaatttaaattaaataattctgaaaatagtaatattacggcacatcaaagtaa<br>attcgttgtatatgatagtatgtttgataattttagcattaacttttgggtaaggactcctaaa<br>tataataataatgatatacaaacttatcttcaaaatgagtatacaataattagttgtataaaa<br>aatgactcaggatggaaagtatctattaagggaaatagaataatatggacattaatagat<br>gttaatgcaaaatctaaatcaatatttttcgaatatagtataaaagataatatatcagattat<br>ataaataaatggttttccataactattactaatgatagattaggtaacgcaaatatttatata<br>aatggaagtttgaaaaaaagtgaaaaaattttaaacttagatagaattaattctagtaatg<br>atatagacttcaaattaattaattgtacagatactactaaatttgtttggattaaggattttaa<br>tatttttggtagagaattaaatgctacagaagtatcttcactatattggattcaatcatctac<br>aaatactttaaaagatttttggggggaatcctttaagatacgatacacaatactatctgttta<br>atcaaggtatgcaaaatatctatataaagtatttttagtaaagcttctatgggggaaactgc<br>accacgtacaaactttaataatgcagcaataaattatcaaaatttatatcttggtttacgatt<br>tattataaaaaaagcatcaaattctcggaatataaataatgataatatagtcagagaagg<br>agattatatatatcttaatattgataatatttctgatgaatcttacagagtatatgttttggtga<br>attctaaagaaattcaaactcaattatttttagcacccataaatgatgatcctacgttctatg<br>atgtactacaaataaaaaaatattatgaaaaaacaacatataattgtcagatactttgcga | Nucleic acid seq. of *C. botulinum* G gene bank code X74162.1, amino acids 860-1297. |

TABLE 7-continued

| Sequences<br>Amino and nucleic acid sequences of neurotoxin receptor binding domains | | |
|---|---|---|
| SEQ ID NO. | sequence | comments |
| | aaaagatactaaaacatttgggctgtttggaattggtaaatttgttaaagattatggatatg tttgggatacctatgataattatttttgcataagtcagtggtatctcagaagaatatctgaa aatataaataaattaaggttgggatgtaattggcaattcattcccgtggatgaaggatgg acagaa | |

TABLE 8

| Amino acid sequences of synaptic vesicle glycoproteins | | |
|---|---|---|
| SEQ ID NO. | sequence | comments |
| 28 | MEEGFRDRAAFIRGAKDIAKEVKKHAAKKVVKG LDRVQDEYSRRSYSRFEEEDDDDFPAPADGYYR GEGAQDEEEGGASSDATEGHDEDDEIYEGEYQGI PRAESGGKGERMADGAPLAGVRGGLSDGEGPPG GRGEAQRRKDREELAQQYETILRECGHGRFQWTL YFVLGLALMADGVEVFVVGFVLPSAEKDMCLSD SNKGMLGLIVYLGMMVGAFLWGGLADRLGRRQ CLLISLSVNSVFAFFSSFVQGYGTFLFCRLLSGVGI GGSIPIVFSYFSEFLAQEKRGEHLSWLCMFWMIGG VYAAAMAWAIIPHYGWSFQMGSAYQFHSWRVF VLVCAFPSVFAIGALTTQPESPRFFLENGKHDEAW MVLKQVHDTNMRAKGHPERVFSVTHIKTIHQEDE LIEIQSDTGTWYQRWGVRALSLGGQVWGNFLSCF SPEYRRITLMMMGVWFTMSFSYYGLTVWFPDMI RHLQAVDYAARTKVFPGERVEHVTFNFTLENQIH RGGQYFNDKFIGLRLKSVSFEDSLFEECYFEDVTS SNTFFRNCTFINTVFYNTDLFEYKFVNSRLVNSTF LHNKEGCPLDVTGTGEGAYMVYFVSFLGTLAVLP GNIVSALLMDKIGRLRMLAGSSVLSCVSCFFLSFG NSESAMIALLCLFGGVSIASWNALDVLTVELYPSD KRTTAFGFLNALCKLAAVLGISIFTSFVGITKAAPI LFASAALALGSSLALKLPETRGQVLQ | synaptic vesicle glycoprotein 2A(*Mus musculus*) NCBI Reference Sequence: NP_071313.1 |
| 29 | MDDYRYRDNYEGYAPSDGYYRSNEQNQEEDAQS DVTEGHDEEDEIYEGEYQGIPHPDDVKSKQTKMA PSRADGLGGQADLMAERMEDEEELAHQYETIIDE CGHGRFQWTLFFVLGLALMADGVEIFVVSFALPS AEKDMCLSSSKKGMLGLIVYLGMMAGAFILGGL ADKLGRKKVLSMSLAINASFASLSSFVQGYGAFL FCRLISGIGIGGSLPIVFAYFSEFLSREKRGEHLSWL GIFWMTGGIYASAMAWSIIPHYGWGFSMGTNYH FHSWRVFVIVCALPATVSMVALKFMPESPRFLLE MGKHDEAWMILKQVHDTNMRAKGTPEKVFTVS HIKTPKQMDEFIEIQSSTGTWYQRWLVRFMTIFKQ VWDNALYCVMGPYRMNTLILAVVWFTMALSYY GLTVWFPDMIRYFQDEEYKSKMKVFFGEHVHGA TINFTMENQIHQHGKLVNDKFIKMYFKHVLFEDT FFDKCYFEDVTSTDTYFKNCTIESTTFYNTDLYKH KFINCRFINSTFLEQKEGCHMDFEEDNDFLIYLVSF LGSLSVLPGNIISALLMDRIGRLKMIGGSMLISAVC CFFLFFGNSESAMIGWQCLFCGTSIAAWNALDVIT VELYPTNQRATAFGILNGLCKFGAILGNTIFASFV GITKVVPILLAAASLVGGGLIALRLPETREQVLM | synaptic vesicle glycoprotein 2B(*Mus musculus*) NCBI Reference Sequence: NP_001347503.1 |
| 30 | MEDSYKDRTSLMKGAKDIAKEVKKQTVKKVNQ AVDRAQDEYTQRSYSRFQDEEDDDYYPPGETYS GEVNDDEGSSEATEGHDEEDEIYEGEYQGIPSTNQ GKDSIVSVGQPKGDEYKDRRELESERRADEEELA QQYELIIQECGHGRFQWALFFVLGMALMADGVE VFVVGFVLPSAETDLCIPNSGSGWLGSIVYLGMM VGAFFWGGLADKVGRKQSLLICMSVNGFFAFLSS FVQGYGFFLVCRLLSGFGIGGAIPTVFSYFAEVLA REKRGEHLSWLCMFWMIGGIYASAMAWAIIPHY GWSFSMGSAYQFHSWRVFVIVCALPCVSSVVALT FMPESPRFLLEVGKHDEAWMILKLIHDTNMRARG QPEKVFTVNKIKTPKQIDELIEIESDTGTWYRRCFV RIRTELYGIWLTFMRCFNYPVRENTIKLTIVWFTLS FGYYGLSVWFPDVIKHLQSDEYALLTRNVQKDK YANFSINFTMENQIHTGMEYENGRFLGVKFKSVT | SV2C protein (*Mus musculus*) GenBank: AAI37862.1 |

TABLE 8-continued

| Amino acid sequences of synaptic vesicle glycoproteins | | |
|---|---|---|
| SEQ ID NO. | sequence | comments |
| | FKDSVFKSCTFDDVTSVNTYFKNCTFIDTLFDNTD FEPYKFIDSEFQNCSFLHNKTGCQITFDDDYSAYW IYFVNFLGTLAVLPGNIVSALLMDRIGRLTMLGGS MVLSGISCFFLWFGTSESMMIGMLCLYNGLTISA WNSLDVVTVELYPTDRR | |

The invention claimed is:

1. A method for identifying an agent that reduces binding of a clostridial neurotoxin to synaptic vesicle glycoprotein 2 (SV2), wherein said method comprises the following steps:

(a) bringing into contact a first fusion protein, said first fusion protein comprising a receptor binding domain of Botulinum neurotoxin (BoNT $H_C$ fragment) fused to a reporter protein, with a second protein, said second protein comprising the fourth luminal loop of the synaptic vesicle glycoprotein 2 (SV2) or fragment thereof optionally fused to an expression facilitating domain;

(b) measuring the binding of said first fusion protein to said second protein in the presence of a sample; and (c) comparing the measured binding to the binding performed in a control measurement in the absence of said sample, wherein a lower binding than that of the control measurement indicates that said agent reduces binding of said clostridial neurotoxin to SV2.

2. The method according to claim 1, wherein said agent is a small molecule, or a polypeptide, or an antibody.

3. The method according to claim 1, wherein said first fusion protein further comprises a linker situated between said reporter protein and said BoNT $H_C$ fragment.

4. The method according to claim 1, wherein said first fusion protein further comprises at least one heterologous amino acid sequence at its N- and/or C-terminus.

5. The method according to claim 1, wherein said reporter protein is a beta-galactosidase domain.

6. The method according to claim 1, wherein said first fusion protein comprises a receptor binding domain of at least one of Botulinum neurotoxin A (BoNT/A $H_C$ fragment), or Botulinum neurotoxin E (BoNT/E $H_C$ fragment), or Botulinum neurotoxin D (BoNT/D $H_C$ fragment) or Botulinum neurotoxin F (BoNT/F $H_C$ fragment) or tetanus neurotoxin.

7. The method according to claim 1, wherein said clostridial neurotoxin is a botulinum neurotoxin or a tetanus neurotoxin.

8. The method according to claim 1, wherein said synaptic vesicle glycoprotein 2 is synaptic vesicle glycoprotein 2C (SV2C).

9. The method according to claim 1, wherein said expression facilitating domain is a glutathione-s-transferase (GST).

10. The method according to claim 1, wherein said method is for identifying an agent that reduces binding of BoNT/A to the BoNT receptor SV2C.

11. The method according to claim 1, wherein said first fusion protein comprises a receptor binding domain of Botulinum neurotoxin A (BoNT/A $H_C$ fragment) having an amino acid sequence which is at least 70% identical to the sequence denoted by SEQ ID NO. 2 and a reporter protein which is a beta-galactosidase domain having an amino acid sequence which is at least 70% identical to the sequence denoted by SEQ ID NO. 1, or the amino acid sequence denoted by SEQ ID NO. 2 and a reporter protein which is a beta-galactosidase domain having the amino acid sequence denoted by SEQ ID NO. 1.

12. The method according to claim 1, wherein said first fusion protein comprises from an amino-terminal position to a carboxyl-terminal position a reporter protein which is a beta-galactosidase domain having the amino acid sequence denoted by SEQ ID NO. 1, a linker having the amino acid sequence denoted by SEQ ID NO. 3, a receptor binding domain of Botulinum neurotoxin A (BoNT/A $H_C$ fragment) having the amino acid sequence denoted by SEQ ID NO. 2 and a His tag having the amino acid sequence denoted by SEQ ID NO. 4.

13. The method according to claim 1, wherein said first fusion protein comprises an amino acid sequence which is at least 70% identical to the sequence denoted by SEQ ID NO. 5, or wherein said first fusion protein comprises or consists of the amino acid sequence denoted by SEQ ID NO. 5.

14. The method according to claim 1, wherein said second protein comprises the fourth luminal loop of the BoNT receptor SV2C having the amino acid sequence denoted by SEQ ID NO. 13.

15. The method according to claim 1, wherein said second protein is a fusion protein comprising an amino acid sequence which is at least 70% identical to the sequence denoted by SEQ ID NO. 15, or a fusion protein comprising or consisting of the amino acid sequence denoted by SEQ ID NO. 15.

16. The method according to claim 1, wherein at least one of said first fusion protein or said second protein is immobilized onto a solid surface.

17. The method according to claim 1, wherein said step of measuring the binding comprises adding at least one substrate of the reporter protein of said first fusion protein.

18. A method for identifying at least one agent that reduces binding of Botulinum neurotoxin A (BoNT/A) to the synaptic vesicle glycoprotein 2C (SV2C), wherein said method comprises the following steps:

(a) contacting a first fusion protein, said first fusion protein comprising BoNT/A $H_C$ fragment and a beta-galactosidase domain with at least one sample, thereby obtaining a mixture;

(b) contacting said mixture obtained in step (a) with a second protein optionally attached to a surface, said second protein being a fusion protein comprising the fourth luminal loop of the synaptic vesicle glycoprotein 2C (SV2C) and a glutathione-s-transferase domain (GST);

(c) adding at least one substrate of the beta-galactosidase domain of said first fusion protein; and (d) determining the signal;

wherein a signal lower than a threshold signal indicates that said agent reduces binding of BoNT/A to SV2C.

19. A kit comprising:

(a) a first fusion protein, said first fusion protein comprising a receptor binding domain of Botulinum neurotoxin A (BoNT/A $H_C$ fragment) fused to a reporter protein or a composition comprising said first fusion protein and a suitable carrier or excipient;

(b) a second protein, said second protein comprising the fourth luminal loop of the synaptic vesicle glycoprotein 2 (SV2) or fragment thereof optionally fused to an expression facilitating domain or a composition comprising said second protein and a suitable carrier or excipient; optionally, said second protein is attached to a solid surface, wherein said second protein comprises a BoNT receptor which is synaptic vesicle glycoprotein 2C (SV2C); and optionally (c) instructions for use.

20. An isolated fusion protein comprising the receptor binding domain of Botulinum neurotoxin (BoNT $H_C$ fragment) and a reporter protein, wherein said isolated fusion protein comprises the BoNT/A $H_C$ fragment having an amino acid sequence which is at least 70% identical to the sequence denoted by SEQ ID NO. 2 and wherein said reporter protein is a beta-galactosidase domain having the amino acid sequence which is at least 70% identical to the sequence denoted by SEQ ID NO. 1.

* * * * *